United States Patent
Saimen

(10) Patent No.: US 9,684,197 B2
(45) Date of Patent: Jun. 20, 2017

(54) ELECTRO-OPTIC DEVICE AND ELECTRONIC APPARATUS

(71) Applicant: Seiko Epson Corporation, Tokyo (JP)

(72) Inventor: Munehide Saimen, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 261 days.

(21) Appl. No.: 14/559,124

(22) Filed: Dec. 3, 2014

(65) Prior Publication Data

US 2015/0160505 A1  Jun. 11, 2015

(30) Foreign Application Priority Data

Dec. 10, 2013  (JP) ................. 2013-254759
Dec. 10, 2013  (JP) ................. 2013-254760
Dec. 10, 2013  (JP) ................. 2013-254762
Dec. 10, 2013  (JP) ................. 2013-254763
Dec. 10, 2013  (JP) ................. 2013-254764

(51) Int. Cl.
  *G02F 1/1333* (2006.01)
  *G02F 1/1339* (2006.01)

(52) U.S. Cl.
  CPC ...... *G02F 1/133308* (2013.01); *G02F 1/1339* (2013.01); *G02F 2001/133311* (2013.01)

(58) Field of Classification Search
  CPC ....... G02F 1/133308; G02F 2001/1339; G02F 2001/133311
  See application file for complete search history.

(56) References Cited

U.S. PATENT DOCUMENTS

| 7,936,417 | B2 * | 5/2011 | Park ................. G02F 1/133308 349/58 |
| 2001/0030730 | A1 | 10/2001 | Iwanaga et al. |
| 2004/0136146 | A1 * | 7/2004 | Saitoh ............... G02F 1/133308 361/600 |
| 2004/0160548 | A1 * | 8/2004 | Kojima ................ H04N 9/3144 349/58 |
| 2004/0169784 | A1 * | 9/2004 | Miyashita ......... G02F 1/133308 349/58 |

(Continued)

FOREIGN PATENT DOCUMENTS

| JP | 08-278502 A | 10/1996 |
| JP | 09-222610 A | 8/1997 |

(Continued)

*Primary Examiner* — Joseph L Williams
*Assistant Examiner* — Jose M Diaz
(74) *Attorney, Agent, or Firm* — ALG Intellectual Property, LLC

(57) ABSTRACT

An electro-optic device includes: a liquid crystal panel which includes an element substrate, a facing substrate arranged so as to face the element substrate with a sealing material interposed therebetween, and a liquid crystal layer sealed in a region surrounded by the sealing material; and a mold which covers an outer circumference of the liquid crystal panel and functions as a mold, in which the mold covers a region, which is overlapped with at least a part of the sealing material in a plan view, from an end of the element substrate and an end of the facing substrate on a surface of the element substrate on an opposite side to the liquid crystal layer and a surface of the facing substrate on an opposite side to the liquid crystal layer, and in which a surface of the mold has liquid repellency.

24 Claims, 22 Drawing Sheets

(56) References Cited

U.S. PATENT DOCUMENTS

| | | | |
|---|---|---|---|
| 2007/0030436 A1 | 2/2007 | Sasabayashi | |
| 2008/0143949 A1 | 6/2008 | Ino | |
| 2010/0245707 A1* | 9/2010 | Harada | G02F 1/133308 349/58 |
| 2010/0283935 A1* | 11/2010 | Park | G02F 1/133308 349/58 |
| 2011/0181937 A1* | 7/2011 | Miyashita | G02F 1/133308 359/263 |
| 2011/0194037 A1* | 8/2011 | Hirabayashi | G02F 1/133308 349/5 |
| 2013/0050632 A1 | 2/2013 | Yoneya et al. | |
| 2013/0077058 A1* | 3/2013 | Miyashita | H04N 9/3105 353/52 |
| 2013/0114046 A1* | 5/2013 | Miyashita | G03B 21/16 353/52 |
| 2013/0194749 A1* | 8/2013 | Choi | H05K 5/0239 361/695 |
| 2013/0200763 A1* | 8/2013 | Yu | G02F 1/133308 312/223.1 |
| 2013/0265511 A1* | 10/2013 | Poix | B32B 17/10045 349/33 |
| 2014/0176847 A1* | 6/2014 | Sung | H01L 51/5246 349/58 |
| 2014/0204275 A1* | 7/2014 | Shimizu | G02F 1/133611 348/725 |
| 2014/0253845 A1* | 9/2014 | Shibata | G02B 6/0038 349/65 |
| 2014/0267974 A1* | 9/2014 | Kawano | G02F 1/133308 349/58 |
| 2015/0049424 A1* | 2/2015 | Wu | G02F 1/133308 361/679.21 |
| 2015/0131026 A1* | 5/2015 | Chen | G02F 1/133308 349/60 |
| 2015/0205166 A1* | 7/2015 | Kageyama | G02F 1/133608 349/58 |
| 2015/0219954 A1* | 8/2015 | Kubo | G02F 1/133308 348/794 |
| 2015/0257270 A1* | 9/2015 | Kondo | H05K 1/11 343/700 MS |
| 2016/0037655 A1* | 2/2016 | Im | G02B 5/3033 359/483.01 |

FOREIGN PATENT DOCUMENTS

| | | |
|---|---|---|
| JP | 11-064862 A | 3/1999 |
| JP | 2001-183670 A | 7/2001 |
| JP | 2001-264777 A | 9/2001 |
| JP | 2004-333986 A | 11/2004 |
| JP | 2007-065619 A | 3/2007 |
| JP | 2007-248634 A | 9/2007 |
| JP | 2008-197672 A | 8/2008 |
| JP | 2008-209561 A | 9/2008 |
| JP | 2009-204958 A | 9/2009 |
| JP | 2012-220524 A | 11/2012 |
| JP | 2013-044860 A | 3/2013 |

* cited by examiner

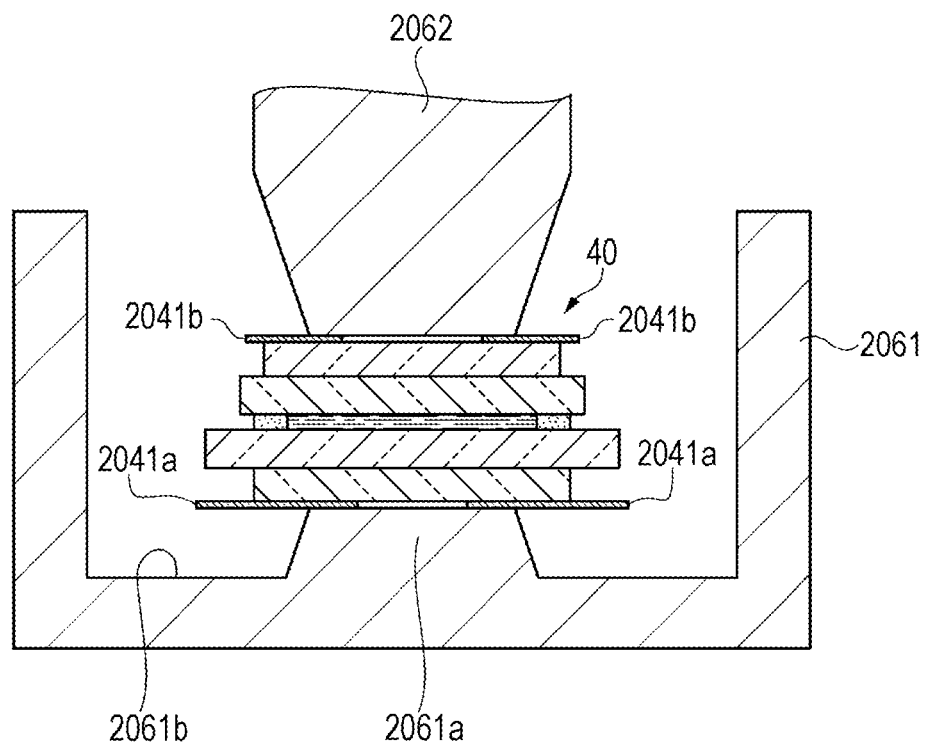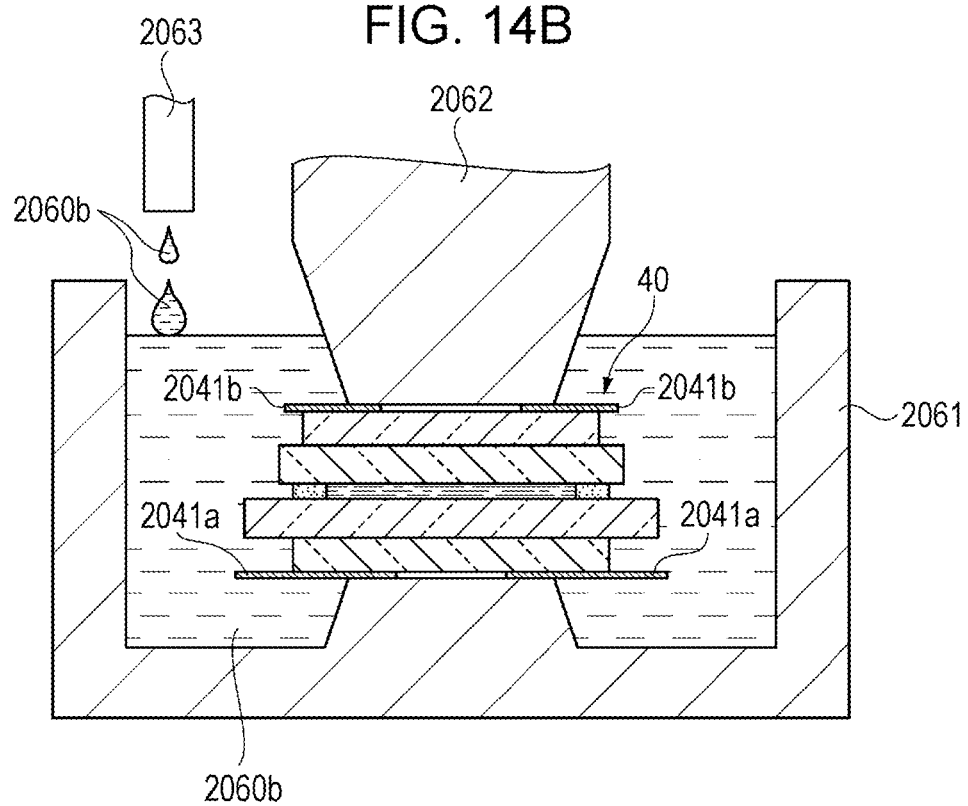

ELECTRO-OPTIC DEVICE AND ELECTRONIC APPARATUS

BACKGROUND

1. Technical Field

The present invention relates to an electro-optic device and an electronic apparatus.

2. Related Art

As an electronic apparatus, an active drive-type liquid crystal device which includes, for each pixel, a transistor as an element for switching control of a pixel electrode, for example, is known. The liquid crystal device is used in a direct-view-type display or a light valve, for example.

The liquid crystal device includes a liquid crystal panel in which a sealing material is disposed at a peripheral edge portion between a pair of substrates and a liquid crystal layer is sealed in a space surrounded by the sealing material. Furthermore, the liquid crystal panel is accommodated in a frame and is fixed with an adhesive agent between the liquid crystal panel and the frame. According to such a liquid crystal device, there is a case where moisture enters the liquid crystal layer via the sealing member, which brings about deterioration in display quality or a decrease in lifetime of the liquid crystal layer.

For example, JP-A-2007-65619 thus discloses a method of reducing entry of moisture into the liquid crystal layer by providing a mold material on an outer circumferential side of the sealing material.

However, a further improvement in quality has been required with a longer lifetime and higher definition of the liquid crystal device, and the method disclosed in JP-A-2007-65619 has a problem in that moisture resistance is not sufficient.

SUMMARY

The present invention can be realized in the following forms or application examples.

Application Example 1

According to this application example, there is provided an electro-optic device according to this application example including: an electro-optic panel which includes a first substrate, a second substrate arranged so as to face the first substrate with a sealing material interposed therebetween, and an electro-optic layer sealed in a region surrounded by the sealing material; and a mold which covers an outer circumference of the electro-optic panel and functions as a frame, in which the mold covers a region, which is overlapped with at least a part of the sealing material in a plan view, from an end of the first substrate and an end of the second substrate on a surface of the first substrate on an opposite side to the electro-optic layer and a surface of the second substrate on an opposite side to the electro-optic layer, and in which a surface of the mold has liquid repellency.

Since the mold covers the region from the sealing material pinched between the pair of substrates, namely the first substrate and the second substrate to the surfaces of the substrates on the opposite side to the sealing material in this application example, it is possible to extend a length of an interface between the substrates and the mold. Accordingly, it is possible to suppress entry of moisture into the electro-optic layer via the interface and the sealing material.

Application Example 2

In the electro-optic device according to the above application example, it is preferable that a coating agent with liquid repellency be arranged on the surface of the mold.

Since the coating agent is provided on the surface of the mold in this application example, it is possible to suppress transmittance of moisture through the mold and entry of the moisture into the electro-optic layer.

Application Example 3

In the electro-optic device according to the above application example, it is preferable that a light-blocking hook which includes an opening hole overlapped with a display region surrounded by the mold be provided so as to be in contact with the mold.

Since the light-blocking hook is arranged so as to surround the display region in this application example, it is possible to limit a range of light which is incident on the display region.

Application Example 4

In the electro-optic device according to the above application example, it is preferable that a frame body be provided so as to be in direct contact with the first substrate or the second substrate or in indirect contact with the first substrate or the second substrate via a third substrate.

Since the frame body is arranged so as to be in direct or indirect contact with the first substrate or the second substrate in this application example, it is possible to release heat of the substrates (electro-optic panel) via the frame body.

Application Example 5

According to this application example, there is provided a method of manufacturing an electro-optic device including: arranging a lower mold die in a circumference of an electro-optic panel which includes a first substrate, a second substrate arranged so as to face the first substrate with a sealing material interposed therebetween and an electro-optic layer arranged between the first substrate and the second substrate; arranging an upper mold die on the electro-optic panel; and forming a mold in an outer circumference of the electro-optic panel by supplying softened resin to the lower mold die.

Since the mold is formed in the outer circumference of the electro-optic panel by using the upper mold die and the lower mold die in this application example, it is possible to extend the length of the interface between the substrates and the mold from the sealing material which is pinched between the pair of substrates, namely the first substrate and the second substrate to the surfaces of the substrates on the opposite side to the sealing material. Accordingly, it is possible to suppress entry of moisture into the electro-optic layer via the interface and the sealing material.

Application Example 6

In the method of manufacturing an electro-optic device according to the above application example, it is preferable to further include performing coating processing on the surface of the mold to provide liquid repellency thereto after forming the mold.

Since the coating processing is performed on the mold in this application example, it is possible to suppress transmittance of moisture through the mold and entry of the moisture into the electro-optic layer.

Application Example 7

In the method of manufacturing an electro-optic device according to the above application example, it is preferable to further include forming Teflon (registered trademark) on surfaces of the upper mold die and the lower mold die.

Since Teflon is formed on the mold dies in this application example, it is possible to facilitate separation of the mold, which is supplied to the mold dies, from the mold dies.

Application Example 8

In the method of manufacturing an electro-optic device according to the above application example, it is preferable to further include fixing a light-blocking hook, which includes an opening hole in a display region surrounded by the mold in the electro-optic panel, to the mold.

Since the light-blocking hook which includes an opening hole in the display region is fixed to the mold in this application example, it is possible to limit the range of the light which is incident on the display region.

Application Example 9

In the method of manufacturing an electro-optic device according to the above application method, it is preferable to further include fixing a frame body to the mold so as to be in direct contact with the first substrate or the second substrate or in indirect contact with the first substrate or the second substrate via a third substrate.

Since the frame body is fixed so as to be in direct or indirect contact with the first substrate or the second substrate in this application example, it is possible to release the heat of the substrates (electro-optic panel) via the frame body.

Application Example 10

According to this application example, there is provided an electronic apparatus including the electro-optic device as described in the above application examples.

Since the electronic apparatus includes the electro-optic device as described in the above application examples according to this application example, it is possible to supply an electronic apparatus capable of improving display quality and suppressing deterioration in the electro-optic layer.

Application Example 11

According to this application example, there is provided an electro-optic device including: an electro-optic panel which includes a first substrate, a second substrate arranged so as to face the first substrate with a sealing material interposed therebetween, and an electro-optic layer sealed in a region surrounded by the sealing material; a mold which covers an outer circumference of the electro-optic panel and functions as a frame; a first hook which is arranged between the first substrate and the mold, includes an opening overlapped with a display region of the electro-optic panel, and blocks light; and a second hook which is arranged between the second substrate and the mold, includes an opening overlapped with the display region, and blocks light, in which the mold covers a region, which is overlapped with at least a part of the sealing material in a plan view, from an end of the first hook and an end of the second hook on a surface of the first hook and a surface of the second hook.

Since the mold covers the region from the sealing material which is pinched between the pair of substrates, namely the first substrate and the second substrate to the surface of the first hook at the first substrate on the opposite side to the sealing material and the surface of the second hook at the second substrate on the opposite side to the sealing material in this application example, it is possible to extend the length of the interface between the substrates and the mold. Accordingly, it is possible to suppress entry of moisture into the electro-optic layer via the interface and the sealing material.

In addition, since the first hook and the second hook made of a metal material are arranged so as to be in contact with the electro-optic panel, it is possible to release heat accumulated in the electro-optic panel. Moreover, since the hooks with a parting function are arranged near the electro-optic panel, it is possible to improve parting accuracy.

Application Example 12

In the electro-optic device according to the above application example, it is preferable that a coating agent with liquid repellency be arranged on the surface of the mold.

Since the coating agent is provided on the surface of the mold in this application example, it is possible to suppress transmittance of moisture through the mold and entry of the moisture into the electro-optic layer.

Application Example 13

In the electro-optic device according to the above application example, it is preferable to further include a third hook which is arranged so as to be in contact with a surface of the mold, includes an opening overlapped with the display region, and blocks light.

Since the light-blocking third hook is arranged so as to surround the display region in this application example, it is possible to limit the range of the light, which is incident on the display region, along with the first hook and the second hook.

Application Example 14

In the electro-optic device according to the above application example, it is preferable that a third substrate be provided between the first substrate and the first hook and between the second substrate and the second hook.

Since the third panel (a dust proofing glass, for example) is provided in the electro-optic panel in this application example, it is possible to prevent dust and the like from adhering to the surface of the first substrate and the surface of the second substrate. Therefore, even if dust adheres to the third substrate, the dust is distantly away from the electro-optic layer. Accordingly, in a case of using the electro-optic device in a projection-type display apparatus, for example, the dust is in a defocused state, and it is possible to suppress appearance of the dust as an image on a projected image.

Application Example 15

In the electro-optic device according to the above application example, it is preferable that a frame body be provided so as to be in contact with the first hook or the second hook.

Since the frame body is arranged so as to be in contact with the first hook or the second hook, it is possible to release the heat of the substrates (electro-optic panel) via the first hook, the second hook, and the frame body.

Application Example 16

According to this application example, there is provided a method of manufacturing an electro-optic device, the electro-optic device including an electro-optic panel including a first substrate, a second substrate arranged so as to face the first substrate with a sealing material interposed therebetween, and an electro-optic layer arranged between the first substrate and the second substrate, the method including: arranging a first hook, which includes an opening overlapped with a display region of the electro-optic panel and blocks light, on a surface of the first substrate on an opposite side to the electro-optic layer; arranging a second hook, which includes an opening overlapped with the display region and blocks light, on a surface of the second substrate on an opposite side to the electro-optic layer; arranging a lower mold die so as to be in contact with a part of the first hook; arranging an upper mold die so as to be in contact with a part of the second hook; and forming a mold in an outer circumference of the electro-optic panel by supplying softened resin to the lower mold die.

Since the mold is formed in the outer circumference of the electro-optic panel via the first hook and the second hook by using the upper mold die and the lower mold die in this application example, it is possible to extend the length of the interface between the substrates and the mold from the sealing material which is pinched between the pair of substrates, namely the first substrate and the second substrate to the surface of the first hook on the opposite side to the sealing material and the surface of the second hook on the opposite side to the sealing material. Therefore, it is possible to suppress entry of moisture into the electro-optic layer via the interface and the sealing material.

In addition, since the first hook and the second hook made of a metal material are arranged so as to be in contact with the electro-optic panel, it is possible to release the heat accumulated in the electro-optic panel via the first hook and the second hook. Moreover, since the hooks with a parting function are arranged near the electro-optic panel, it is possible to improve parting accuracy.

Application Example 17

In the method of manufacturing an electro-optic device according to the above application example, it is preferable to further include coating the surface of the mold with a material with liquid repellency after forming the mold.

Since the coating processing is performed on the mold in this application example, it is possible to suppress transmission of moisture through the mold and entry of the moisture into the electro-optic layer.

Application Example 18

In the method of manufacturing an electro-optic device according to the above application example, it is preferable to further include forming Teflon (registered trademark) on surfaces of the upper mold die and the lower mold die.

Since Teflon is formed on the mold dies in this application example, it is possible to facilitate separation of the mold, which is supplied to the mold dies, from the mold dies.

Application Example 19

In the method of manufacturing an electro-optic device according to the above application example, it is preferable to further include arranging a third substrate between a surface of the first substrate on an opposite side to the electro-optic layer and the first hook and between a surface of the second substrate on an opposite side to the electro-optic layer and the second hook.

Since the third substrate (dust proofing glass, for example) is arranged in the electro-optic panel in this application example, it is possible to prevent dust from adhering to the surface of the first substrate and the surface of the second substrate. Therefore, even if dust adheres to the third substrate, the dust is distantly away from the electro-optic layer. Accordingly, in a case of using the electro-optic device in a projection-type display apparatus, for example, the dust is in a defocused state, and it is possible to suppress appearance of the dust as an image on a projected image.

Application Example 20

In the method of manufacturing an electro-optic device according to the above application example, it is preferable to further include fixing a third hook, which includes an opening overlapped with the display region and blocks light, to the mold.

Since the light-blocking third hook which has the opening hole overlapped with the display region is fixed to the mold in this application example, it is possible to limit the range of the light, which is incident on the display region, along with the first hook and the second hook.

Application Example 21

In the method of manufacturing an electro-optic device according to the above application example, it is preferable to further include fixing a frame body so as to be in contact with the first hook or the second hook.

Since the frame body is fixed so as to be in contact with the first hook or the second hook in this application example, it is possible to release the heat of the substrates (electro-optic panel) via the first hook, the second hook, and the frame body.

Application Example 22

According to this application example, there is provided an electronic apparatus including the electro-optic device as described in the above application examples.

Since the electronic apparatus includes the electro-optic device as described in the above application examples according to this application example, it is possible to supply an electronic apparatus capable of improving display quality and suppressing deterioration in the electro-optic layer.

Application Example 23

According to this application example, there is provided an electro-optic device including: an electro-optic panel which includes a first substrate, a second substrate arranged so as to face the first substrate with a sealing material interposed therebetween, and an electro-optic layer sealed in a region surrounded by the sealing material; a mold which covers an outer circumference of the electro-optic panel and functions as a frame; a first protection member which is arranged between the first substrate and the mold and includes an opening overlapped with a display region; and a second protection member which is arranged between the second substrate and the mold and includes an opening overlapped with the display region, in which the mold covers a region, which is overlapped with at least a part of the sealing material in a plan view, from an end of the first substrate and an end of the second substrate on a surface of the first protection member and a surface of the second protection member.

Since the mold covers the region from the ends of the pair of substrates, namely the first substrate and the second substrate to the surface of the first substrate on the opposite side to the sealing material and the surface of the second substrate on the opposite side to the sealing material in this application example, it is possible to extend the length of the interface between the substrates and the mold. Therefore, it is possible to suppress entry of moisture into the electro-optic layer via the interface and the sealing material.

Application Example 24

In the electro-optic device according to the above application example, it is preferable that the first protection member be a first support seal and the second protection member be a second support seal.

Since the first protection member and the second protection member are arranged at portions at which the first protection member and the second protection member are in contact with the mold in this application example, it is possible to prevent contact scratch from being generated in the electro-optic panel.

Application Example 25

In the electro-optic device according to the above application example, it is preferable that a coating agent with liquid repellency be arranged on the surface of the mold.

Since the coating agent is arranged on the surface of the mold in this application example, it is possible to suppress transmission of moisture through the mold and entry of the moisture into the electro-optic layer.

Application Example 26

In the electro-optic device according to the above application example, it is preferable that a light-blocking hook which includes an opening overlapped with a display region surrounded by the mold is arranged so as to be in contact with the surface of the mold.

Since the light-blocking hook is arranged so as to surround the display region in the application example, it is possible to limit the range of the light which is incident on the display region.

Application Example 27

In the electro-optic device according to the above embodiment, it is preferable that a third substrate be arranged between the first substrate and the first support seal and between the second substrate and the second support seal.

Since the third substrate (dust proofing glass, for example) is arranged in the electro-optic panel in this application example, it is possible to prevent dust and the like from adhering to the surface of the first substrate and the surface of the second substrate. Therefore, even if dust adheres to the third substrate, the dust is distantly away from the electro-optic layer. Accordingly, in a case of using the electro-optic device in a projection-type display apparatus for example, the dust is in a defocused state, and it is possible to suppress appearance of the dust as an image on a projected image.

Application Example 28

According to this application example, there is provided a method of manufacturing an electro-optic device, the electro-optic device including an electro-optic panel including a first substrate, a second substrate arranged so as to face the first substrate with a sealing material interposed therebetween, and an electro-optic layer arranged between the first substrate and the second substrate, the method including: arranging a first protection member, which includes an opening overlapped with a display region, on a surface of the first substrate on an opposite side to the electro-optic layer; arranging a second protection member, which includes an opening overlapped with the display region, on a surface of the second substrate on an opposite side to the electro-optic layer; arranging a lower mold die in a circumference of the electro-optic panel so as to be in contact with a part of the first protection member; arranging an upper mold die on the electro-optic panel so as to be in contact with a part of the second protection member; and forming a mold in an outer circumference of the electro-optic panel by supplying softened resin to the lower mold die.

Since the mold is formed in the outer circumference of the electro-optic panel via the first protection member and the second protection member by using the upper mold die and the lower mold die in this application example, it is possible to extend the length of the interface between the substrates and the mold from the sealing material which is pinched between the pair of substrates, namely the first substrate and the second substrate to the surface of the first protection member on the opposite side to the sealing material and the surface of the second protection member on the opposite side to the sealing material. Therefore, it is possible to suppress entry of moisture into the electro-optic layer via the interface and the sealing material.

In addition, since the first protection member and the second protection member are arranged at such a portion so as to be in contact with the lower mold die and at such a portion so as to be in contact with the upper mold die when the mold is formed, it is possible to prevent the mold dies from being brought into direct contact with the electro-optic panel and to thereby prevent contact scratch from being generated in the electro-optic panel.

Application Example 29

In the method of manufacturing an electro-optic device according to the above application example, it is preferable that the first protection member be a first support seal and the second protection member be a second support seal.

Since the first support seal and the second support seal are arranged at such a portion so as to be in contact with the lower mold die and at such a portion so as to be in contact with the upper mold die when the mold is formed in this application example, it is possible to prevent the mold dies from being brought into direct contact with the electro-optic panel and to thereby prevent contact scratch from being generated in the electro-optic panel.

Application Example 30

In the method of manufacturing an electro-optic device according to the above application example, it is preferable that in arranging the first protection member, a third protection member be formed in a region of an opening surrounded by the first protection member and in arranging the second protection member, a fourth protection member be formed in a region of an opening surrounded by the second protection member.

According to the application example, it is possible to prevent dust from adhering to the display region on the substrate when the mold is formed. In addition, it is possible to obtain a display surface with no dust adhered thereto by removing the third protection member and the fourth protection member after the mold is formed.

Application Example 31

In the method of manufacturing an electro-optic device according to the above application example, it is preferable to further include performing coating processing on the surface of the mold to provide liquid repellency thereto after forming the mold.

Since the coating processing is performed on the mold in this application example, it is possible to suppress transmittance of moisture through the mold and entry of the moisture into the electro-optic layer.

Application Example 32

In the method of manufacturing an electro-optic device according to the above application example, it is preferable to further include forming Teflon (registered trademark) on surfaces of the upper mold die and the lower mold die before forming the mold.

Since Teflon is formed on the mold dies in this application example, it is possible to facilitate separation of the mold, which is supplied to the mold dies, from the mold dies.

Application Example 33

In the method of manufacturing an electro-optic device according to the above application example, it is preferable to further include arranging a third substrate between a surface of the first substrate on an opposite side to the electro-optic layer and the first protection member and between a surface of the second substrate on an opposite side to the electro-optic layer and the second protection member.

Since the third substrate (dust proofing glass, for example) is arranged in the electro-optic panel in this application example, it is possible to prevent dust from adhering to the surface of the first substrate and the surface of the second substrate. Therefore, even if dust adheres to the third substrate, the dust is distantly away from the electro-optic layer. Accordingly, in a case of using the electro-optic device in a projection-type display apparatus, for example, the dust is in a defocused state, and it is possible to suppress appearance of the dust as an image on a projected image.

Application Example 34

According to this application example, there is provided an electronic apparatus including the electro-optic device as described in the above application examples.

Since the electronic apparatus includes the electro-optic device as described in the above application examples according to this application example, it is possible to supply an electronic apparatus capable of improving display quality and suppressing deterioration in the electro-optic layer.

Application Example 35

According to this application example, there is provided an electro-optic device including: an electro-optic panel which includes a first substrate, a second substrate arranged so as to face the first substrate with a sealing material interposed therebetween, and an electro-optic layer sealed in a region surrounded by the sealing material; a frame which is arranged in a circumference of the electro-optic panel; and a mold which is arranged between the electro-optic panel and the frame, in which the mold covers a region, which is overlapped with at least a part of the sealing material in a plan view, from an end of the first substrate and an end of the second substrate on a surface of the first substrate on an opposite side to the electro-optic layer and a surface of the second substrate on an opposite side to the electro-optic layer.

Since the mold covers the region, which is surrounded by the frame, from the surface of the first substrate on the opposite side to the electro-optic layer to the surface of the second substrate on the opposite side to the electro-optic layer in the circumference of the electro-optic panel in this application example, it is possible to extend the length of the interface between the substrates and the mold. Therefore, it is possible to suppress entry of moisture into the electro-optic layer via the interface and the sealing material.

Application Example 36

In the electro-optic device according to the above application example, it is preferable that an end of the frame be arranged so as to be in contact with the surface of the first substrate on the opposite side to the electro-optic layer, the other end of the frame be arranged at a higher position than the surface of the second substrate on the opposite side to the electro-optic layer, and the height of the upper surface of the mold be located between the other end of the frame and the surface of the second substrate on the opposite side to the electro-optic layer.

Since the upper surface of the mold is located between a height position of the other end of the frame and a height position of the surface of the second substrate on the opposite side to the electro-optic layer in this application example, it is possible to cover at least a part of the surface of the second substrate on the opposite side to the electro-optic layer with the mold. Therefore, it is possible to extend the length of the interface between the substrates and the mold and thereby to suppress entry of moisture into the electro-optic layer via the interface and the sealing material.

Application Example 37

In the electro-optic device according to the above application example, it is preferable that a support seal be arranged on the surface of the second substrate on the opposite side to the electro-optic layer and the height position of the upper surface of the mold be located between a lower surface and an upper surface of the support seal.

Since the height position of the upper surface of the mold is located within a range of a thickness of the support seal in this application example, it is possible to cover a region up to a position, in which the support seal is arranged, in the second substrate with the mold. Therefore, it is possible to extend the length of the interface between the substrates and the mold.

Application Example 38

In the electro-optic device according to the above application example, it is preferable that a light-blocking hook which includes an opening hole in a region overlapped with the display region be arranged so as to be in contact with the frame.

Since the light-blocking hook which includes the opening hole in the region overlapped with the display region is arranged, in other words, since the light-blocking hook is arranged so as to surround the display region in this application example, it is possible to limit the range of the light which is incident on the display region.

Application Example 39

In the electro-optic device according to the above application example, it is preferable that a first light-transmitting plate be arranged between the first substrate and the mold and a second light-transmitting plate be arranged between the second substrate and the mold.

Since the first light-transmitting plate and the second light-transmitting plate (dust proofing glass, for example) are arranged in the electro-optic panel in this application example, it is possible to prevent dust and the like from adhering to the surface of the first substrate and the surface of the second substrate. Therefore, even if dust adheres to the first light-transmitting plate and the second light-transmitting plate, the dust is distantly away from the electro-optic layer. Accordingly, in a case of using the electro-optic device in a projection-type display apparatus, for example, the dust is in a defocused state, and it is possible to suppress appearance of the dust as an image on a projected image.

Application Example 40

According to this application example, there is provided a method of manufacturing an electro-optic device, the electro-optic device including an electro-optic panel including a first substrate, a second substrate arranged so as to face the first substrate with a sealing material interposed therebetween, and an electro-optic layer arranged between the first substrate and the second substrate, the method including: arranging a frame in a circumference of the electro-optic panel; and arranging a mold in the circumference of the electro-optic panel by supplying the mold between the frame and the electro-optic panel.

Since the mold is supplied between the frame and the electro-optic panel in this application example, it is possible to cover the circumference of the electro-optic panel with the mold. Therefore, it is possible to extend the length of the interface between the substrates and the mold and to thereby suppress entry of moisture into the electro-optic layer via the interface and the sealing material.

Application Example 41

In the method of manufacturing an electro-optic device according to the above application example, it is preferable that an end of the frame be arranged so as to be in contact with the surface of the first substrate on the opposite side to the electro-optic layer, the other end of the frame is arranged at a higher position than the surface of the second substrate on the opposite side to the electro-optic layer, and in arranging the mold, the height position of the upper surface of the mold be located between the other end of the frame and the surface of the second substrate on the opposite side to the electro-optic layer.

Since the mold is supplied such that the height position of the upper surface of the mold is located between the other end of the frame and the surface of the second substrate on the opposite side to the electro-optic layer in this application example, it is possible to cover the region in the circumference of the electro-optic panel from at least a part of the surface of the first substrate on the opposite side to the electro-optic layer to a part of the surface of the second substrate on the opposite side to the electro-optic layer with the mold. Therefore, it is possible to extend the length of the interface between the substrates and the mold and to thereby suppress entry of moisture into the electro-optic layer via the interface and the sealing material.

Application Example 42

In the method of manufacturing an electro-optic device according to the above application example, it is preferable to further include arranging a support seal on the surface of the second substrate on the opposite side to the electro-optic layer before arranging the mold, and it is preferable that in arranging the mold, the mold be supplied such that the upper surface of the mold is located between the lower surface and the upper surface of the support seal.

Since the mold is supplied such that the height position of the upper surface of the mold is located between the lower surface and the upper surface of the support seal in this application example, it is possible to cover the region in the circumference of the electro-optic panel up to at least the portion, in which the support seal is arranged, in the second substrate with the mold.

Application Example 43

In the method of manufacturing an electro-optic device according to the above application example, it is preferable to further include arranging a light-blocking hook, which includes an opening hole in a region overlapped with the display region, so as to be in contact with the frame after arranging the mold.

Since the light-blocking hook which includes the opening hole in the region overlapped with the display region is arranged, in other words, the light-blocking hook is arranged so as to surround the display region, it is possible to limit the range of the light which is incident on the display region.

Application Example 44

In the method of manufacturing an electro-optic device according to the application example, it is preferable to further include arranging a first light-transmitting plate on the first substrate on the opposite side to the electro-optic layer and arranging a second light-transmitting plate on the second substrate on the opposite side to the electro-optic layer before arranging the frame.

Since the first light-transmitting plate and the second light-transmitting plate (dust proofing glass, for example) are arranged in the electro-optic panel in this application example, it is possible to prevent dust and the like from adhering to the surface of the first substrate and the surface of the second substrate. Therefore, even if dust adheres to the third substrate, the dust is distantly away from the electro-optic layer. Accordingly, in a case of using the electro-optic device in a projection-type display apparatus, for example, the dust is in a defocused state, and it is possible to suppress appearance of the dust as an image on a projected image.

Application Example 45

According to this application example, there is provided an electronic apparatus including the electro-optic device as described in the above application examples.

Since the electronic apparatus includes the electro-optic device as described in the above application examples according to this application example, it is possible to supply an electronic apparatus capable of improving display quality and suppressing deterioration in the electro-optic layer.

Application Example 46

According to this application example, there is provided an electro-optic device including: an electro-optic panel which includes a first substrate, a second substrate arranged so as to face the first substrate with a sealing material interposed therebetween, and an electro-optic layer sealed in a region surrounded by the sealing material; and a mold which is arranged so as to cover a circumference of the electro-optic panel, in which the mold covers a region, which is overlapped with at least a part of the sealing material in a plan view, from an end of the first substrate and an end of the second substrate on a surface of the first substrate on an opposite side to the electro-optic layer and on a surface of the second substrate on an opposite side to the electro-optic layer, and in which a first resin is arranged so as to cover the mold.

Since the first resin is arranged on the surface of the mold in this application example, it is possible to suppress entry of moisture into the mold. As a result, it is possible to suppress entry of the moisture into the electro-optic layer via the mold and the sealing material.

Application Example 47

In the electro-optic device according to the above application example, it is preferable to further include a frame arranged in the circumference of the electro-optic panel, and it is preferable that the mold be arranged between the electro-optic panel and the frame and the first resin be arranged so as to cover the mold in a region where the frame is opened.

Since the mold covers the region in the circumference of the electro-optic panel from the surface of the first substrate on the opposite side to the electro-optic layer to the surface of the second substrate on the opposite side to the electro-optic layer, which is surrounded by the frame, in this application example, it is possible to extend the length of the interface between the substrates and the mold. Therefore, it is possible to suppress entry of moisture into the electro-optic layer via the interface and the sealing material. In addition, since the first resin is arranged on the surface of the mold in the region where the frame is opened, namely on the surface of the exposed mold, it is possible to suppress entry of moisture into the mold. As a result, it is possible to suppress entry of the moisture into the electro-optic layer via the mold and the sealing material.

Application Example 48

In the electro-optic device according to the above application example, it is preferable that second resin be arranged so as to cover a portion where the electro-optic panel is brought into contact with the frame.

Since the second resin is arranged so as to cover the portion where the electro-optic panel is brought into contact with the frame, specifically a portion where a back side of the electro-optic panel is brought into contact with the frame in this application example, it is possible to suppress entry of moisture from a joint portion between the electro-optic panel and the frame.

Application Example 49

In the electro-optic device according to the above application example, it is preferable that an end of the frame be arranged so as to be in contact with the surface of the first substrate on the opposite side to the electro-optic layer, the other end of the frame be arranged at a higher position than the surface of the second substrate on the opposite side to the electro-optic layer, and the upper surface of the mold be located between the other end of the frame and the surface of the second substrate on the opposite side to the electro-optic layer.

Since the upper surface of the mold is located between the height position of the other end of the frame and the height position of the surface of the second substrate on the opposite side to the electro-optic layer in this application example, it is possible to cover at least a part of the surface of the second substrate on the opposite side to the electro-optic layer with the mold. Therefore, it is possible to extend the length of the interface between the substrates and the mold and to thereby suppress entry of moisture into the electro-optic layer via the interface and the sealing material.

Application Example 50

In the electro-optic device according to the above application example, it is preferable that a support seal be arranged on the surface of the second substrate on the opposite side to the electro-optic layer and the upper surface of the mold be located between the lower surface and the upper surface of the support seal.

Since the height position of the upper surface is located within a range of a thickness of the support seal in this application example, it is possible to cover a region up to a position, in which the support seal is arranged, in the second substrate with the mold. Therefore, it is possible to extend the length of the interface between the substrates and the mold.

Application Example 51

In the electro-optic device according to the above application example, it is preferable that a hook which includes an opening hole in a region overlapped with the display region be arranged so as to be in contact with the frame and the hook block light.

Since the light-blocking hook which includes the opening hole in the region overlapped with the display region is arranged, in other words, the light-blocking hook is arranged so as to surround the display region in this application example, it is possible to limit the range of the light which is incident on the display region.

Application Example 52

In the electro-optic device according to the above application example, it is preferable that a first light-transmitting plate be arranged between the first substrate and the mold and a second light-transmitting plate be arranged between the second substrate and the mold.

Since the first light-transmitting plate and the second light-transmitting plate (dust proofing glass, for example) are arranged in the electro-optic panel in this application example, it is possible to prevent dust and the like from adhering to the surface of the first substrate and the surface of the second substrate. Therefore, even if dust adheres to the first light-transmitting plate and the second light-transmitting plate, the dust is distantly away from the electro-optic layer. Accordingly, in a case of using the electro-optic device in a projection-type display apparatus, for example, the dust is in a defocused state, and it is possible to suppress appearance of the dust as an image on a projected image.

Application Example 53

According to this application example, there is provided a method of manufacturing an electro-optic device, the electro-optic device including an electro-optic panel including a first substrate, a second substrate arranged so as to face the first substrate with a sealing material interposed therebetween, and an electro-optic layer arranged between the first substrate and the second substrate, the method including: arranging a frame in a circumference of the electro-optic panel; arranging a mold in the circumference of the electro-optic panel by supplying mold between the frame and the electro-optic panel; and arranging a first resin so as to cover the mold in a region where the frame is opened.

Since the mold is supplied between the frame and the electro-optic panel in this application example, it is possible to cover the circumference of the electro-optic panel with the mold. Specifically, it is possible to cover the region from the surface of the first substrate on the opposite side to the electro-optic layer to the surface of the second substrate on the opposite side to the electro-optic layer, for example, with the mold. Therefore, it is possible to extend the length of the interface between the substrates and the mold and to thereby suppress entry of moisture into the electro-optic layer via the interface and the sealing material. In addition, since the first resin is arranged on the surface of the mold in the region where the frame is opened, in other words, on the surface of the exposed mold, it is possible to suppress entry of moisture into the mold. As a result, it is possible to suppress entry of moisture into the electro-optic layer via the mold and the sealing material.

Application Example 54

In the method of manufacturing an electro-optic device according to the above application example, it is preferable to further include arranging a second resin so as to cover a portion where the electro-optic panel is brought into contact with the frame.

Since the second resin is arranged so as to cover the portion where the electro-optic panel is brought into contact with the frame, specifically, a portion where the back side of the electro-optic panel is brought into contact with the frame, for example, in this application example, it is possible to suppress entry of moisture from the joint portion between the electro-optic panel and the frame.

Application Example 55

In the method of manufacturing an electro-optic device according to the above application example, it is preferable that in arranging the frame, the frame be arranged such that an end of the frame is in contact with the surface of the first substrate on the opposite side to the electro-optic layer, the frame be arranged such that the other end of the frame is located at a higher position than the surface of the second substrate on the opposite side to the electro-optic layer, and in arranging the mold, the mold be supplied such that the upper surface of the mold is located between the other end of the frame and the surface of the second substrate on the opposite side to the electro-optic layer.

Since the mold is supplied such that the height position of the upper surface of the mold is located between the other end of the frame and the surface of the second substrate on the opposite side to the electro-optic layer in this application example, it is possible to cover the region in the circumference of the electro-optic panel at least from a part of the surface of the first substrate on the opposite side to the electro-optic layer to a part of the surface of the second substrate on the opposite side to the electro-optic layer with the mold. Therefore, it is possible to extend the length of the interface between the substrates and the mold and to thereby suppress entry of moisture into the electro-optic layer via the interface and the sealing material.

Application Example 56

In the method of manufacturing an electro-optic device, it is preferable to further include arranging a support seal on the surface of the second substrate on the opposite side to the electro-optic layer before arranging the mold, and it is preferable that in arranging the mold, the mold be supplied such that the upper surface of the mold is located between the lower surface and the upper surface of the support seal.

Since the mold is supplied such that the height position of the upper surface of the mold is located between the lower surface and the upper surface of the support seal in this application example, it is possible to cover the region in the circumference of the electro-optic panel at least up to the portion, in which the support seal is arranged, of the second substrate with the mold.

Application Example 57

In the method of manufacturing an electro-optic device according to the above application example, it is preferable to further include arranging a hook, which includes the opening hole in the region overlapped with the display region, so as to be in contact with the frame after arranging the mold, and it is preferable that the hook block light.

Since the light-blocking hook which includes the opening hole in the region overlapped with the display region is arranged, in other words, the light-blocking hook is arranged so as to surround the display region in this application example, it is possible to limit the range of the light which is incident on the display region.

Application Example 58

In the method of manufacturing an electro-optic device according to the above application example, it is preferable to further include arranging a first light-transmitting plate on the first substrate on the opposite side to the electro-optic layer and arranging a second light-transmitting plate on the second substrate on the opposite side to the electro-optic layer before arranging the frame.

Since the first light-transmitting plate and the second light-transmitting plate (dust proofing glass, for example)

are arranged in the electro-optic panel in this application example, it is possible to prevent dust and the like from adhering to the surface of the first substrate and the surface of the second substrate. Therefore, even if dust adheres to the first light-transmitting plate and the second light-transmitting plate, the dust is distantly away from the electro-optic layer. Accordingly, in a case of using the electro-optic device in a projection-type display apparatus, for example, the dust is in a defocused state, and it is possible to suppress appearance of the dust as an image on a projected image.

Application Example 59

According to this application example, there is provided an electronic apparatus including the electro-optic device as described in the above application examples.

Since the electronic apparatus includes the electro-optic device as described in the above application examples according to this application example, it is possible to supply an electronic apparatus capable of improving display quality and suppressing deterioration in the electro-optic layer.

BRIEF DESCRIPTION OF THE DRAWINGS

The invention will be described with reference to the accompanying drawings, wherein like numbers reference like elements.

FIGS. 14A and 14B are cross-sectional views schematically showing a method of manufacturing the liquid crystal device as the electro-optic device according to the second embodiment.

DESCRIPTION OF EXEMPLARY EMBODIMENTS

An embodiment of the invention will be described below with reference to the drawings. The drawings are appropriately shown in an enlarged manner or a contracted manner such that parts to be described can be recognized.

Furthermore, a description "on a substrate", for example, includes a case where a component is arranged so as to be in contact with the substrate, a case where the component is arranged over the substrate via another constituent element, and a case where the component is arranged such that a part thereof is in contact with the substrate and the other part thereof is arranged via another constituent element in embodiments described below.

The following embodiments will be described by exemplifying an active matrix-type liquid crystal device provided with a thin film transistor (TFT), as an example of the electro-optic device, as a pixel switching element. For example, the liquid crystal device can be preferably used as light modulation means (liquid crystal light valve) in a projection-type display apparatus (liquid crystal projector) as an example of the electronic apparatus.

First Embodiment

Hereinafter, a first embodiment in which an example of the invention is implemented will be described with reference to drawings.

Configuration of Electronic Apparatus

Figure 1A:
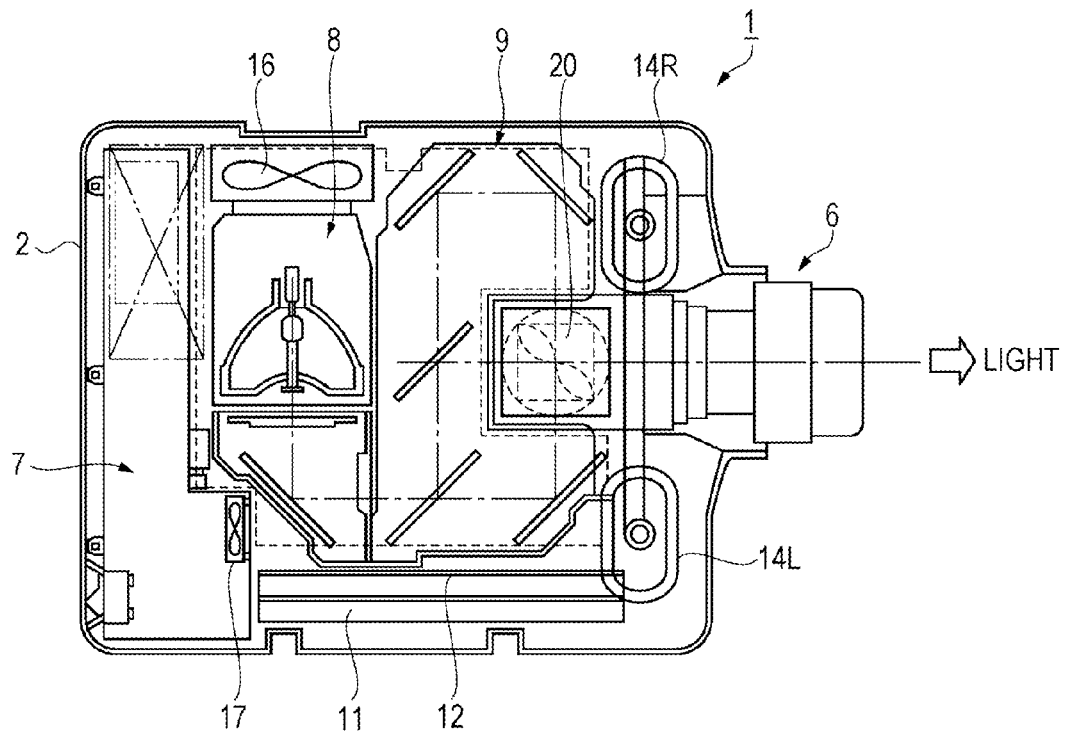
FIGS. 1A and 1B are diagrams schematically showing a configuration of a projection-type display apparatus as an example of an electronic apparatus according to a first embodiment.
Figure 1B:
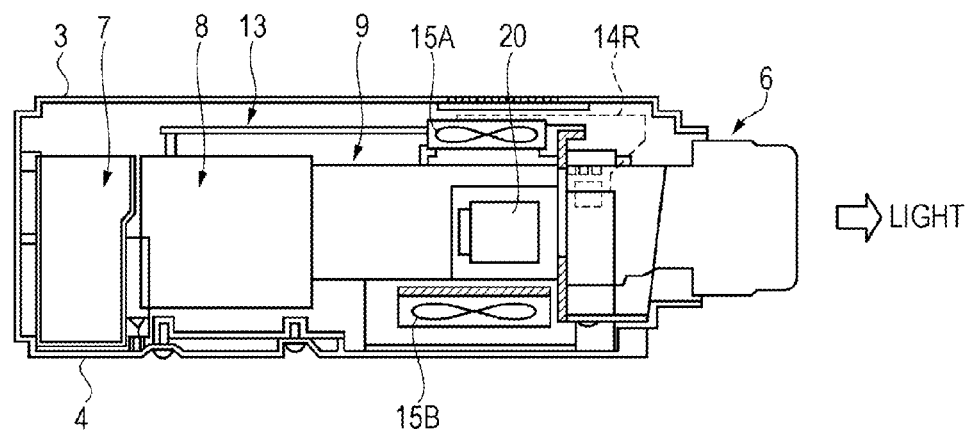
Figure 2:
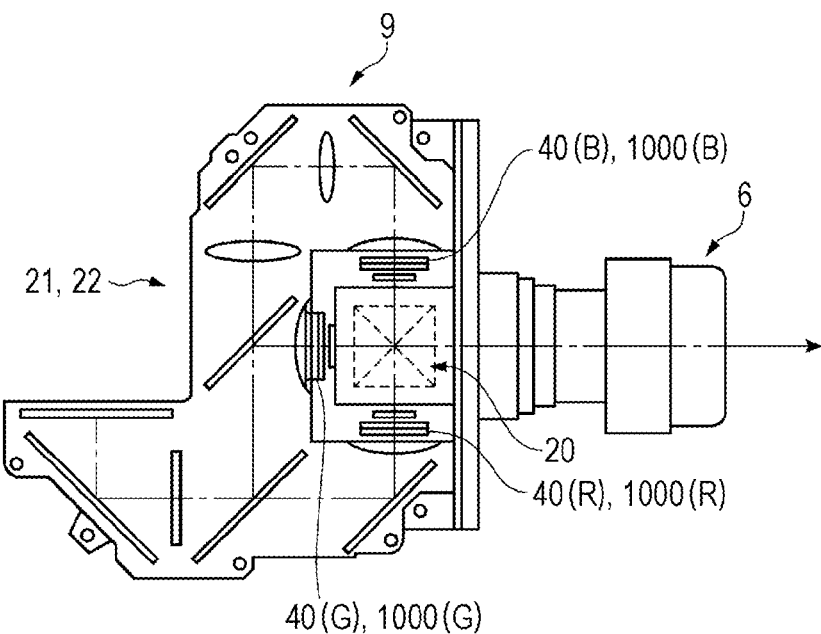
FIG. 2 is a diagram schematically showing a configuration of an optical unit used in the projection-type display apparatus according to the first embodiment.

FIGS. 1A and 1B are diagrams schematically showing a configuration of a projection-type display apparatus as an example of the electronic apparatus. FIG. 1A is a planar view schematically showing the projection-type display apparatus when viewed from an upper side. FIG. 1B is a side view schematically showing the projection-type display apparatus when viewed from a side. FIG. 2 is a diagram schematically showing a configuration of an optical unit used in the projection-type display apparatus. Hereinafter, the configuration of the projection-type display apparatus will be described with reference to FIGS. 1A, 1B, and 2.

In a projection-type display apparatus 1, a power unit 7 is arranged on a back end side inside an exterior case 2, and a light source lamp unit 8 (light source unit) and an optical unit 9 are arranged at adjacent positions in the power unit 7 on a front side of the projection-type display apparatus 1 as shown in FIGS. 1A and 1B.

Inside the exterior case 2, a base end side of a projection lens unit 6 is located at the center of the optical unit 9 on the front side (light emitting side). On a side of one side surface of the optical unit 9, an interface substrate 11 with an input and output interface circuit mounted thereon is arranged while being directed in a forward-backward direction of the projection-type display apparatus 1, and a video substrate 12 with a video signal processing circuit mounted thereon is arranged in parallel with the interface substrate 11.

As shown in FIG. 1B, a control substrate 13 for controlling drive of the apparatus is arranged on an upper side of the light source lamp unit 8 and the optical unit 9, and speakers 14R and 14L are arranged at the respective right and left corners on the side of the front end of the apparatus.

On the upper side and the lower side of the optical unit 9, air intake fans 15A and 15B for cooling the inside of the apparatus are arranged. In addition, an exhaust fan 16 is arranged on a side surface of the apparatus, which corresponds to the back surface side of the light source lamp unit 8.

Furthermore, an auxiliary cooling fan 17 for suctioning cooling air flow from the air intake fan 15A into the power unit 7 is arranged at a position which faces ends of the interface substrate 11 and the video substrate 12. Among the fans, the air intake fan 15B functions as a cooling fan for a liquid crystal panel 40 as an electro-optic panel which will be described later.

In FIG. 2, the respective optical elements which configure the optical unit 9 and include a prism unit 20 configuring color light synthesizing means are supported by an upper light guide 21 or a lower light guide 22 made of metal such as magnesium (Mg) or aluminum (Al). The upper light guide 21 and the lower light guide 22 are fixed to an upper case 3 and a lower case 4 (see FIGS. 1A and 1B) with fixation screws.

Detailed Configuration of Optical Unit

Figure 3:
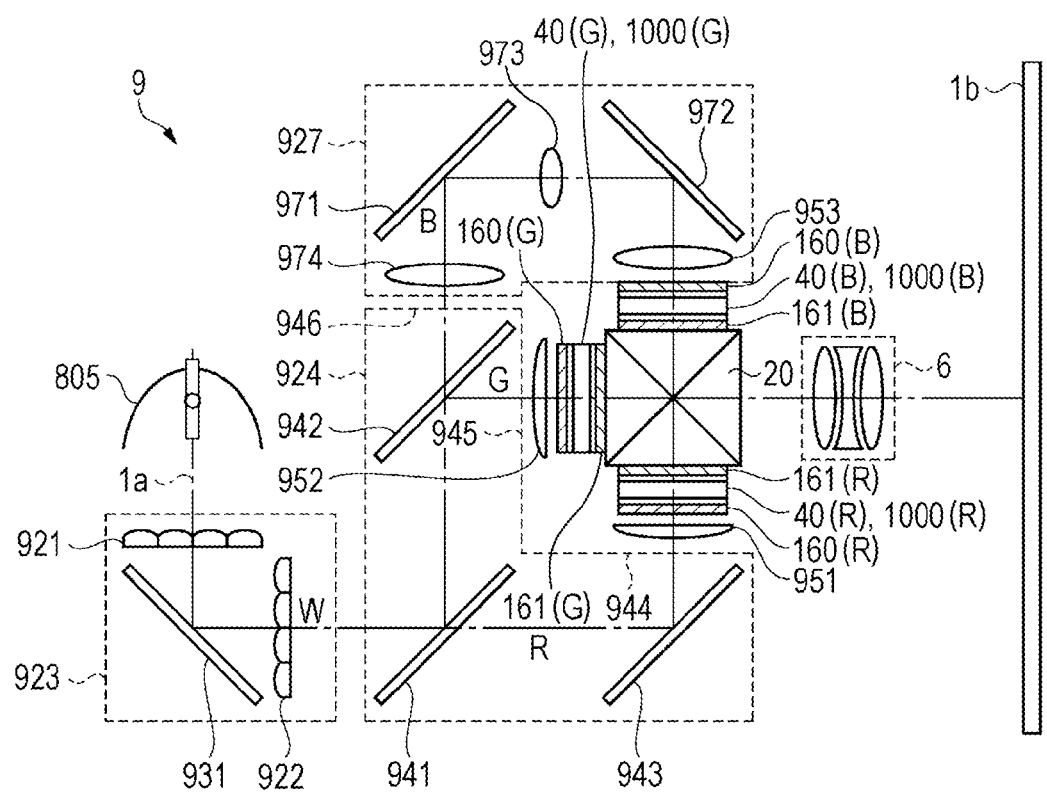
FIG. 3 is a diagram schematically showing a detailed configuration of the optical unit used in the projection-type display apparatus according to the first embodiment.

FIG. 3 is a diagram schematically showing a detailed configuration of the optical unit used in the projection-type display apparatus. Hereinafter, the configuration of the optical unit will be described with reference to FIG. 3.

As shown in FIG. 3, the optical unit 9 includes an illumination optical system 923 which includes integrator lenses 921 and 922 as uniform illumination optical elements irradiated with light emitted from a light source lamp 805 and a color light separation optical system 924 which separates a light flux W emitted from the illumination optical system 923 into red, green, and blue light fluxes R, G, and B.

In addition, the optical unit 9 includes three transmission-type liquid crystal panels 40(R), 40(G), and 40(B) as liquid crystal panels (light valves) for modulating the light fluxes of the respective colors, a prism unit 20 as a color light synthesizing optical system for synthesizing the modulated color light fluxes, and a projection lens unit 6 for projecting the synthesized light flux on a projection surface in an enlarged manner. Moreover, the optical unit 9 includes a relay optical system 927 which guides a blue light flux B from among the respective color light fluxes separated by the color light separation optical system 924 to the corresponding liquid crystal panel 40(B).

The illumination optical system 923 is further provided with a reflection mirror 931 and orthogonally bends a light axis 1a of light emitted from the light source lamp 805 in a direction toward the front side of the apparatus. The integrator lenses 921 and 922 are arranged before and after an optical path via the reflection mirror 931 so as to orthogonally intersect each other.

The color light separation optical system 924 is configured of a blue-green reflection dichroic mirror 941, a green reflection dichroic mirror 942, and a reflection mirror 943.

First, a blue light flux B and a green light flux G included in the light flux W after passing through the illumination optical system 923 are orthogonally reflected by the blue-green reflection dichroic mirror 941 and are directed to a side of the green reflection dichroic mirror 942.

A red light flux (light flux) R passes through the blue-green reflection dichroic mirror 941, is orthogonally reflected by the reflection mirror 943, and is emitted from an emitting portion 944 of the red light flux R to a side of the prism unit 20 as the color light synthesizing optical system.

Then, only a green light flux G from among the blue light flux (light flux) B and the green light flux (light flux) G reflected by the blue-green reflection dichroic mirror 941 is orthogonally reflected by the green reflection dichroic mirror 942 and is emitted from an emitting portion 945 of the green light flux G to the side of the color light synthesizing optical system.

The blue light flux B after passing through the green reflection dichroic mirror 942 is emitted from an emitting portion 946 of the blue light flux B to a side of the relay optical system 927.

According to this embodiment, all the distances from the light flux emitting portions of the illumination optical system 923 to the emitting portions 944, 945, and 946 for the light fluxes of the respective colors R, G, and B in the color light separation optical system 924 are set to be substantially equal to each other.

On the emitting sides of the emitting portions 944 and 945 of the red light flux R and the green light flux G in the color light separation optical system 924, condensing lenses 951 and 952 are arranged, respectively. Therefore, the red light flux R and the green light flux G emitted from the emitting portions 944 and 945 are incident on the condensing lenses 951 and 952 and are collimated.

Polarization directions of the collimated red and green light fluxes R and G are adjusted by polarization plates 160(R) and 160(G), the red and green light fluxes R and G are then incident on and modulated at the liquid crystal panels 40(R) and 40(G), and image information corresponding to the light of respective colors is added thereto. That is, the liquid crystal panels 40(R) and 40(G) are switching-controlled based on an image signal corresponding to the image information by drive means, which is not shown in the drawing, and the light of the respective colors passing therethrough is thus modulated. As the drive means, it is possible to use known means without any change.

In contrast, the blue light flux B is made to pass through the relay optical system 927, a polarization direction thereof is further adjusted by a polarization plate 160(B), the blue light flux B is then guided to the corresponding liquid crystal panel 40(B) and is incident on and modulated at the liquid crystal panel 40(B) in the same manner as the aforementioned liquid crystal panels 40(R) and 40(G), and image information corresponding to the blue light is added thereto.

The relay optical system 927 is configured of a condensing lens 974, an incident-side reflection mirror 971, an outgoing-side reflection mirror 972, an intermediate lens 973 arranged between these mirrors, and a condensing lens 953 arranged in front of the liquid crystal panel 40(B).

As for lengths of optical paths of the respective color light fluxes R, G, and B, namely distances from the light source lamp 805 to the respective liquid crystal panels 40(R), 40(G), and 40(B), the length of the optical path of the blue light flux B is the longest, and optical loss of the light flux is the highest. However, it is possible to suppress the optical loss by providing the relay optical system 927 in the optical path of the blue light flux B.

The respective color light fluxes after passing through and being modulated at the liquid crystal panels 40(R), 40(G), and 40(B) are incident on the polarization plates 161(R), 161(G), and 161(B), and light transmitted therethrough is incident on and synthesized by the prism unit 20 (cross dichroic prism). A color image synthesized therein is projected in an enlarged manner to a projection surface 1b, such as a screen, at a predetermined position via the projection lens unit 6 provided with a projection lens system.

Configuration of Electro-Optic Panel

Figure 4A:
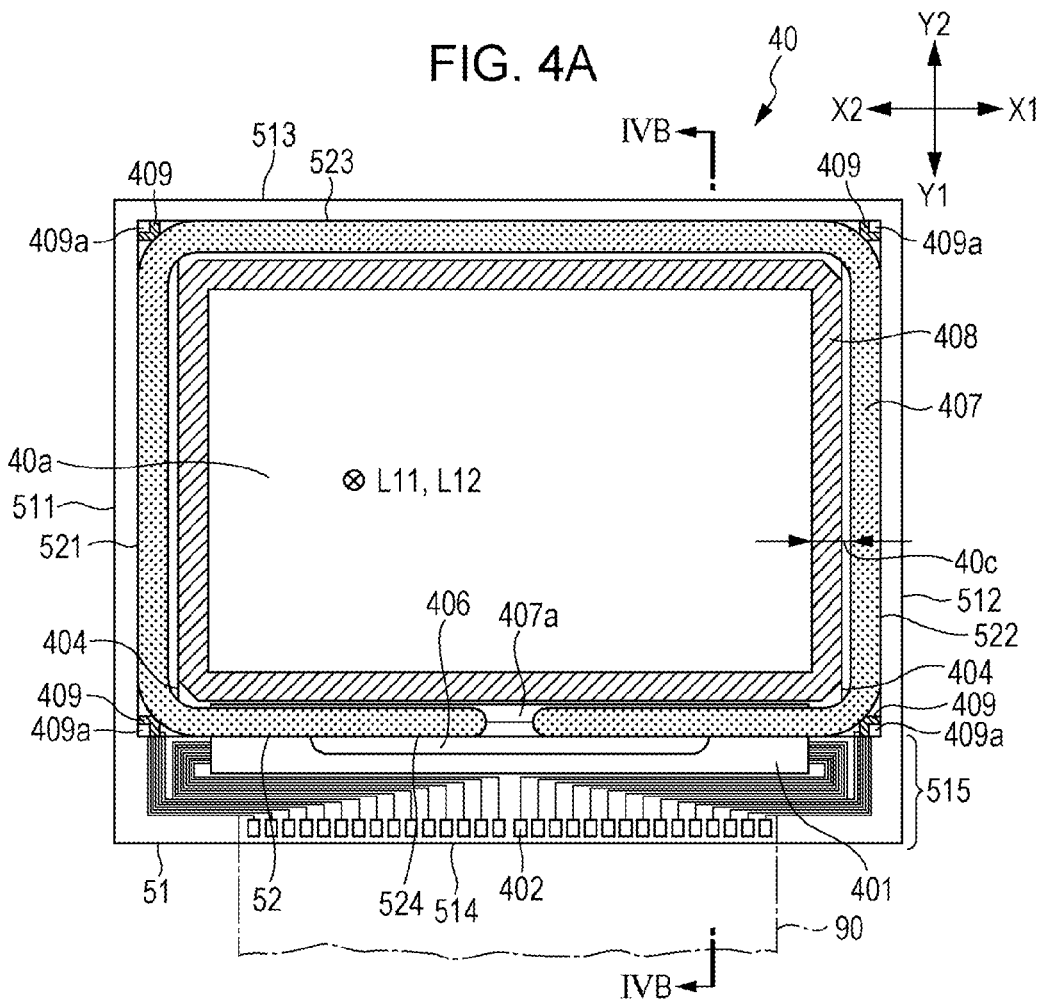
FIGS. 4A and 4B are diagrams schematically showing a configuration of a liquid crystal panel according to the first embodiment.
Figure 4B:
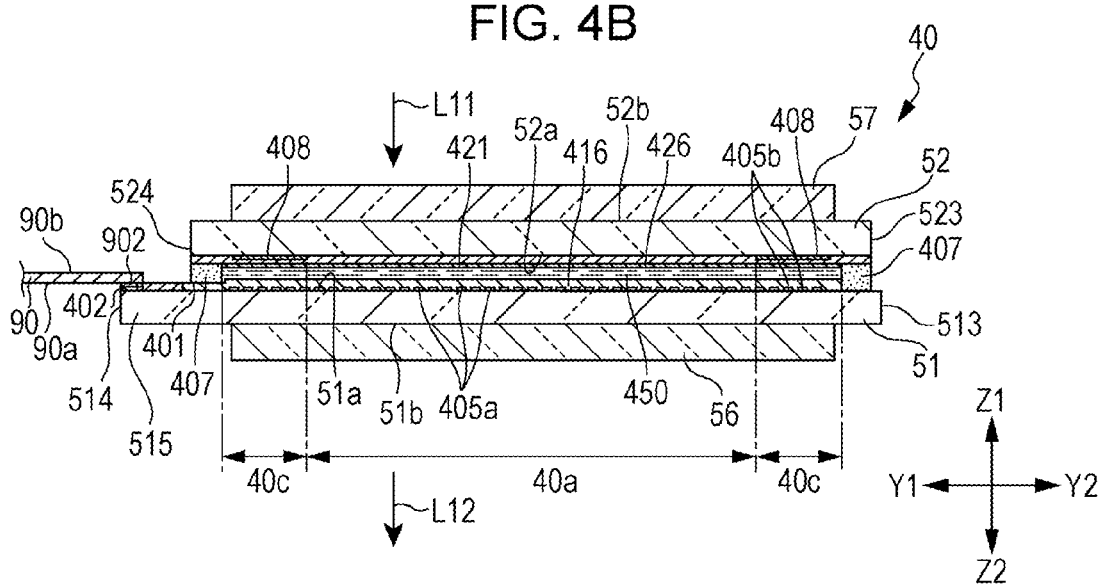

FIGS. 4A and 4B are diagrams schematically showing a configuration of a liquid crystal panel as the electro-optic panel. FIG. 4A is a planar view schematically showing the configuration of the liquid crystal panel, and FIG. 4B is a schematic cross-sectional view taken along line VI-VI in the liquid crystal panel shown in FIG. 4A. Hereinafter, the configuration of the liquid crystal panel will be described with reference to FIGS. 4A and 4B.

Figure 5:
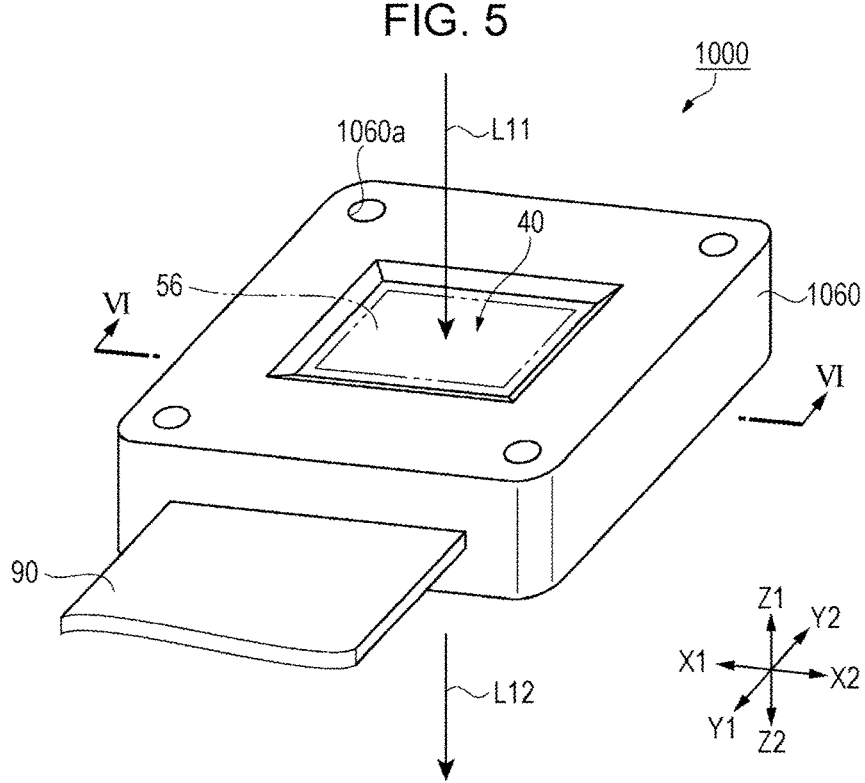
FIG. 5 is a perspective view schematically showing a configuration of a liquid crystal device as an electro-optic device according to the first embodiment.

In FIGS. 4A, 4B, and 5, a traveling direction of light from the light source is represented by the arrow L11, a traveling direction of display light obtained after modulating the light from the light source by the liquid crystal panel 40 is represented by the arrow L12, and a flow of cooling air (cooling gas) supplied to the liquid crystal panel 40 by the air intake fan 15B and the like shown in FIGS. 1A and 1B will be omitted in the drawing.

In the following description, one of directions which intersect each other in an in-plane direction of the liquid crystal panel 40 and a liquid crystal device 1000 is referred to as an X-axis direction, the other direction is referred to as a Y-axis direction, and a direction which intersects with the X-axis direction and the Y-axis direction is referred to as a Z-axis direction.

In the drawings to be referred to in the following description, one side in the Y-axis direction (a side on which a flexible wiring substrate 90 is provided) is referred to as a Y1 side, the other side thereof is referred to as a Y2 side, one side in the X-axis direction is referred to as an X1 side, the other side thereof is referred to as an X2 side, one side in the Z-axis direction (a side on which the light from the light source is incident) will be referred to as a Z1 side, and the other side (a side on which the display light is emitted) is referred to as a Z2 side.

In the projection-type display apparatus 1 described above with reference to FIGS. 1A, 1B, 2, and 3, the liquid crystal panels 40(R), 40(G), and 40(B) are mounted in a state of being provided at the liquid crystal devices 1000(R), 1000(G), and 1000(B) when the liquid crystal panels 40(R), 40(G), and 40(B) are mounted on the optical unit 9.

The liquid crystal panels 40(R), 40(G), and 40(B) have the same configuration, and the liquid crystal devices 1000(R), 1000(G), and 1000(B) provided with the liquid crystal panels 40(R), 40(G), and 40(B) also have the same configuration for the red color (R), the green color (G), and the blue color (B). Therefore, the liquid crystal panels 40(R), 40(G), and 40(B) and the liquid crystal devices 1000(R), 1000(G), and 1000(B) will be described without adding (R), (G), and (B) representing the corresponding colors in the following description.

As shown in FIGS. 4A and 4B, a light-transmitting element substrate 51 (first substrate) and a light-transmitting facing substrate 52 (second substrate) are attached with a sealing material 407 with a predetermined gap interposed therebetween in the liquid crystal panel 40. For the element substrate 51 and the facing substrate 52, it is possible to use quartz glass, heat-resistant glass, or the like. In this embodiment, quartz glass is used for the element substrate 51 and the facing substrate 52.

In this embodiment, a liquid crystal layer 450 as the electro-optic layer is held in a region surrounded by the sealing material 407 between the element substrate 51 and the facing substrate 52 in the liquid crystal panel 40.

The sealing material 407 is provided in a frame shape so as to extend along an outer edge of the facing substrate 52. The sealing material 407 is a photo-curable adhesive agent, a thermoset adhesive agent, or a photo-curable thermoset adhesive agent, and a gap material such as glass fiber or glass beads is blended therein in order to set the distance between the substrates to a predetermined value.

Here, a part of the sealing material 407 is disconnected, and such a disconnected portion forms a liquid crystal inlet port 407a. In addition, the liquid crystal inlet port 407a is sealed with a sealing material 406 after injection of a liquid crystal material to form the liquid crystal layer 450.

In this embodiment, the element substrate 51 has a square shape in a plan view and has side surfaces 511, 512, 513, and 514 configured of four sides. The facing substrate 52 also has a square shape in a plan view and has side surfaces 521, 522, 523, and 524 configured of four sides in the same manner as the element substrate 51.

An image display region 40*a* which emits modulated light is provided as a square region substantially at the center of the liquid crystal panel 40. In accordance with such a shape, the sealing material 407 is provided to have a substantially square shape, and a square frame-shaped circumferential region 40*c* is provided between an inner circumferential edge of the sealing material 407 and an outer circumferential edge of the image display region 40*a*.

In this embodiment, the element substrate 51 has a larger size than the facing substrate 52, and the four side surfaces 511, 512, 513, and 514 of the element substrate 51 respectively extend further outside than the side surfaces 521, 522, 523, and 524 of the facing substrate 52. Therefore, stepped portions are formed in the circumference of the facing substrate 52 by the element substrate 51 and the side surfaces 521, 522, 523, and 524 of the facing substrate 52, and the element substrate 51 is exposed from the facing substrate 52 at such stepped portions.

Light-transmitting pixel electrodes 405*a* and pixels provided with pixel transistors (switching elements; not shown in the drawing) corresponding to the pixel electrodes 405*a* are formed in a matrix shape in the image display region 40*a* on a first surface 51*a*, which faces the facing substrate 52, from among the first surface 51*a* (one side surface) and a second surface 51*b* (the other side surface) of the element substrate 51, and an oriented film 416 is formed on an upper layer side of the pixel electrodes 405*a*.

In addition, dummy pixel electrodes 405*b* which are formed at the same time as the pixel electrodes 405*a* are formed in the circumferential region 40*c* on the first surface 51*a* of the element substrate 51. For the dummy pixel electrodes 405*b*, a configuration of being electrically connected to dummy pixel transistors, a configuration of being directly and electrically connected to wiring without providing the dummy pixel transistors, or a configuration of being brought into a floating state in which no potential is applied thereto is employed.

The side surface 514 of the element substrate 51, which is located on the Y1 side in the Y-axis direction projects from the side surface 524 of the facing substrate 52 to a greater extent than the stepped portions between the other side surfaces 511, 512, and 513 and the side surfaces 521, 522, and 523 of the facing substrate 52 to form a projecting portion 515, and a data line drive circuit 401 and a plurality of first terminals 402 are formed along the side surface 514 at an end portion of a surface (first surface 51*a*) of the projecting portion 515 on a side of the facing substrate 52. In addition, a scanning line drive circuit 404 is formed along the side surfaces 511 and 512 on the element substrate 51.

In addition, the flexible wiring substrate 90 is connected to the element substrate 51. A second terminal 902 is formed at a position, at which the second terminal 902 is overlapped with the first terminal 402 in a plan view, on a first surface 90*a* which faces the element substrate 51 from among the first surface 90*a* and a second surface 90*b* of the flexible wiring substrate 90, and the first terminal 402 and the second terminal 902 are electrically connected to each other. Therefore, various potentials and various signals are input to the element substrate 51 via the flexible wiring substrate 90.

Although various methods can be applied for the connection between the first terminal 402 and the second terminal 902, the connection between the first terminal 402 and the second terminal 902 is established by an anisotropic conductive material in this embodiment.

A light-transmitting common electrode 421 is formed on a first surface 52*a* which faces the element substrate 51 from among the first surface 52*a* and a second surface 52*b* of the facing substrate 52, and an oriented film 426 is formed as an upper layer of the common electrode 421. The common electrode 421 is formed on substantially the entire surface of the facing substrate 52 or is formed so as to be laid across a plurality of pixels as a plurality of band-shaped electrodes, and in this embodiment, the common electrode 421 is formed on substantially the entire surface of the facing substrate 52.

In addition, a light-blocking layer 408 is formed on a lower layer side of the common electrode 421 on the first surface 52*a* of the facing substrate 52. In this embodiment, the light-blocking layer 408 is formed in a picture-frame shape extending along the outer circumferential edge of the image display region 40*a*, and the image display region 40*a* is defined by an inner edge of the light-blocking layer 408. In addition, the light-blocking layer 408 is formed as a black matrix or a black stripe in a region which is overlapped with a region interposed between adjacent pixel electrodes 405*a* on the facing substrate 52 in some cases.

In regions which are overlapped with corner portions of the facing substrate 52 further outside than the sealing material 407 on the element substrate 51, an inter-substrate continuity electrode 409 for establishing electrical continuity between the element substrate 51 and the facing substrate 52 is formed. An inter-substrate continuity material 409*a* containing conductive particles is arranged between the inter-substrate continuity electrode 409 and the facing substrate 52, and the common electrode 421 of the facing substrate 52 is electrically connected to the side of the element substrate 51 via the inter-substrate continuity material 409*a* and the inter-substrate continuity electrode 409. Therefore, a common potential is applied to the common electrode 421 from the side of the element substrate 51. The sealing material 407 is provided so as to have substantially the same width dimension and extend along an outer circumferential edge of the facing substrate 52.

In the liquid crystal panel 40 with such a configuration, the liquid crystal panel 40 is a transmission-type liquid crystal panel in this embodiment since the pixel electrodes 405*a* and the common electrode 421 are formed of light-transmitting conductive films such as ITO films. In the case of such a transmission-type liquid crystal panel 40, light which is incident from a substrate on one side from among the element substrate 51 and the facing substrate 52 is modulated while transmitted through and emitted from a substrate on the other side.

This embodiment is configured such that light (represented by the arrow L11) which is incident from the facing substrate 52 is transmitted through and emitted as modulated light (represented by the arrow L12) from the element substrate 51. Therefore, the facing substrate 52 is arranged on the Z1 side in the Z-axis direction, and the element substrate 51 is arranged on the Z2 side in the Z-axis direction.

If the common electrode 421 is formed of a light-transmitting conductive film and the pixel electrodes 405*a* are formed of reflective conductive films, then it is possible to configure a reflection-type liquid crystal panel. In the case of the reflection-type liquid crystal panel, the light which is incident from the side of the facing substrate 52 is modulated while being reflected by and emitted from the side of the element substrate 51.

Since the liquid crystal panel 40 according to this embodiment is used as a light valve in the aforementioned projection-type display apparatus 1 (liquid crystal projector), a color filter is not formed. However, a color filter is formed on the facing substrate 52 in a case of using the liquid crystal panel 40 as a direct-view-type color display apparatus for an electronic apparatus such as a mobile computer or a mobile phone.

Configuration of Electro-Optic Device

Figure 6:
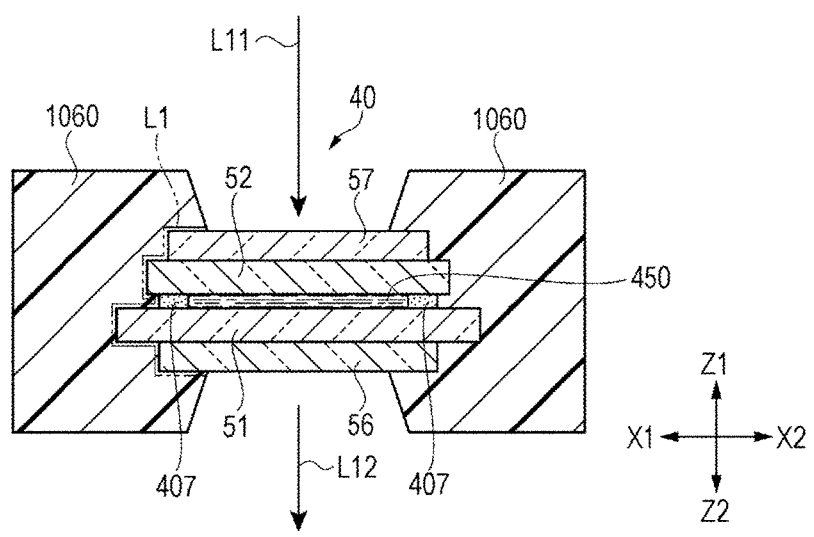
FIG. 6 is a schematic cross-sectional view taken along line VI-VI in the liquid crystal device shown in FIG. 5.

FIG. 5 is a perspective view schematically showing a configuration of a liquid crystal device as the electro-optic device. FIG. 6 is a schematic cross-sectional view taken along line XI-XI in the liquid crystal device shown in FIG. 5. Hereinafter, the configuration of the liquid crystal device will be described with reference to FIGS. 5 and 6. In FIG. 6, depiction and description of the flexible wiring substrate 90 are omitted.

When the liquid crystal panel 40 described above with reference to FIGS. 4A and 4B is mounted on the projection-type display apparatus 1 described above with reference to FIGS. 1A, 1B, 2, and 3, the optical unit 9, the flexible wiring substrate 90 is connected to the liquid crystal panel 40, and the liquid crystal device 1000 in which a mold 1060 is arranged so as to cover the outer circumference of the liquid crystal panel 40 for the purpose of moisture resistance and reinforcement is then obtained as shown in FIGS. 5 and 6.

Specifically, the mold 1060 is a member which is provided with a rectangular opening hole at the center thereof, has an outer shape functioning as a frame, and is made of resin, and accommodates the liquid crystal panel 40 therein. The mold 1060 is formed of silicon-based resin, for example.

As shown in FIG. 6, the mold 1060 is provided so as to cover a region from the surface of the first light-transmitting plate 56 as a third substrate on the opposite side (Z1) to the liquid crystal layer 450 to the surface of the second light-transmitting plate 57 as the third substrate on the opposite side (Z2) to the liquid crystal layer 450. Specifically, the mold 1060 is provided so as to cover up to a region which is overlapped with the sealing material 407 in a plan view. The opening hole is opened such that the mold 1060 is not arranged at least in a region which is overlapped with the image display region 40*a*.

As shown in FIGS. 4A, 4B, 5, and 6, the first light-transmitting plate 56 is attached to the second surface 51*b* (the outer surface; the surface of the element substrate 51 on the opposite side to the facing substrate 52) of the element substrate 51 with an adhesive agent and the second light-transmitting plate 57 is attached to the second surface 52*b* (the outer surface; the surface of the facing substrate 52 on the opposite side to the element substrate 51) of the facing substrate 52 in the liquid crystal panel 40 when the liquid crystal device 1000 is configured by using the liquid crystal panel 40 according to this embodiment.

The first light-transmitting plate 56 and the second light-transmitting plate 57 are respectively configured as dust proofing glass and prevents dust and the like from adhering to the outer surface (second surface 51*b*) of the element substrate 51 and the outer surface (second substrate 52*b*) of the facing substrate 52. Therefore, if dust adheres to the liquid crystal panel 40, the dust is distantly away from the liquid crystal layer 450. Accordingly, the dust is in a defocused state, and it is possible to suppress appearance of the dust as an image in a projected image by the projection-type display apparatus 1 described above with reference to FIGS. 1A, 1B, and the like.

For the first light-transmitting plate 56 and the second light-transmitting plate 57, it is possible to use quartz glass, heat-resistant glass, or the like. In this embodiment, quartz glass is used for the first light-transmitting plate 56 and the second light-transmitting plate 57 in the same manner as the element substrate 51 and the facing substrate 52, and a thickness thereof is from 1.1 mm to 1.2 mm.

The first light-transmitting plate 56 is provided so as to be overlapped with at least the image display region 40*a* in the liquid crystal panel 40 in a state where a part of the second surface 51*b* of the element substrate 51 is exposed. More specifically, the first light-transmitting plate 56 has a square shape with a smaller size than that of the element substrate 51 in a plan view, and the second surface 51*b* of the element substrate 51 is in the exposed state in the circumference of the first light-transmitting plate 56.

The second light-transmitting plate 57 is provided so as to be overlapped with at least the image display region 40*a* in the liquid crystal panel 40 in a state where a part of the second surface 52*b* of the facing substrate 52 is exposed. More specifically, the second light-transmitting plate 57 has a square shape with substantially the same size as that of the first light-transmitting plate 56 in a plan view and is smaller than the facing substrate 52. Therefore, the second surface 52*b* of the facing substrate 52 is in the exposed state in the circumference of the second light-transmitting plate 57.

As shown in FIG. 5, opening holes 1060*a* for arranging the liquid crystal device 1000 in the aforementioned projection-type display apparatus 1 are provided at four corners on the upper surface of the mold 1060. In addition, the invention is not limited to the opening holes 1060*a*, and screw holes may be formed.

In addition, coating processing to provide liquid repellency is performed on the surface of the mold 1060. Examples of the coating processing include fluorine coating.

Since the mold 1060 is provided so as to cover the region from the surface of the first light-transmitting plate 56 on the opposite side to the liquid crystal layer 450 to the surface of the second light-transmitting plate 57 on the opposite side to the liquid crystal layer 450 as described above, it is possible to extend a length L1 of the interface between the mold 1060 and the substrates (the element substrate 51, the facing substrate 52, the first light-transmitting plate 56, and the second light-transmitting plate 57). Accordingly, it is possible to suppress entry of moisture into the liquid crystal layer 450 via the interface and the sealing material 407.

In addition, since the fluorine coating processing is performed on the surface of the mold 1060, it is possible to suppress transmittance of moisture through the mold 1060 and entry of the moisture into the liquid crystal layer 450.

Method of Manufacturing Electro-Optic Device

Figure 7A:
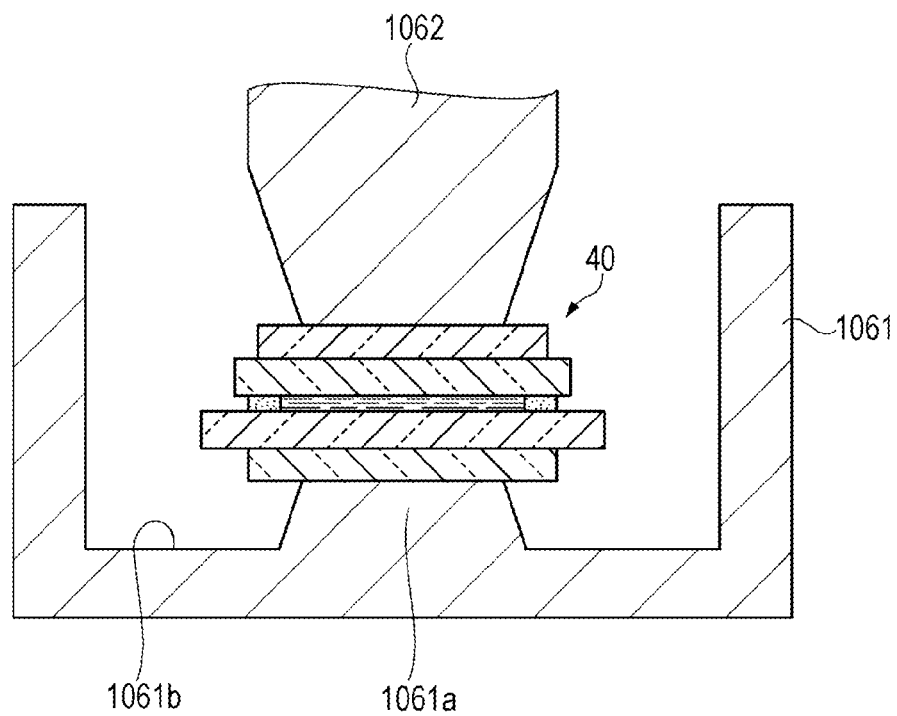
FIGS. 7A and 7B are cross-sectional views schematically showing a method of manufacturing the liquid crystal device as the electro-optic device according to the first embodiment.
Figure 7B:
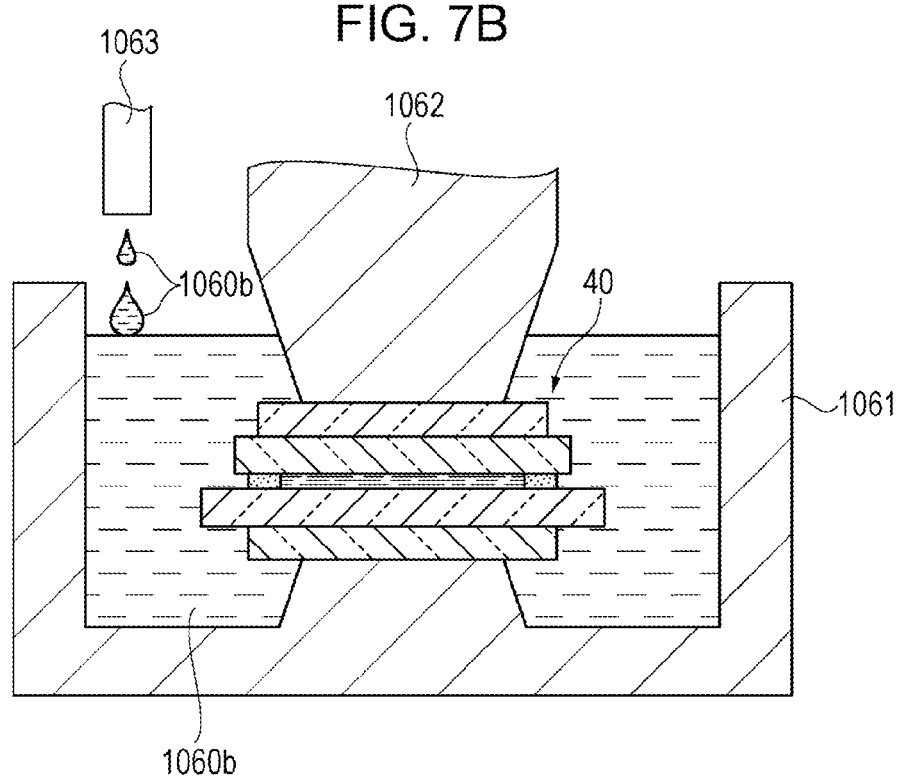

FIGS. 7A and 7B are cross-sectional views schematically showing a method of manufacturing a liquid crystal device as the electro-optic device. Particularly, FIGS. 7A and 7B are cross-sectional views schematically showing a method of manufacturing a mold as a frame of the liquid crystal device. Hereinafter, the method of manufacturing the mold will be described with reference to FIGS. 7A and 7B.

In the process shown in FIG. 7A, the liquid crystal panel 40 is arranged in mold dies (an upper mold die 1062 and a lower mold die 1061). First, the concave-shaped lower mold die 1061 is arranged. A bottom portion 1061*b* of the lower mold die 1061 is provided with a convex portion 1061*a* for arranging the liquid crystal panel 40. Then, the liquid crystal panel 40 is arranged on the convex portion 1061a. Thereafter, the upper mold die 1062 is arranged on the liquid crystal panel 40.

In addition, it is desirable that Teflon is formed on the surface of the upper mold die 1062 and the surface of the lower mold die 1061. Specifically, Teflon is formed at least in portions, at which the upper mold die 1062 and the lower mold die 1061 are brought into contact with mold resin 1060b, of the upper mold die 1062 and the lower mold die 1061. With such a configuration, it is possible to facilitate separation of the mold 1060 from the upper mold die 1062 and the lower mold die 1061 when the mold 1060 is formed.

In the process shown in FIG. 7B, the softened mold resin 1060b is supplied to a space surrounded by a side wall of the lower mold die 1061. First, a nozzle 1063 for supplying the mold resin 1060b is arranged above the lower mold die 1061 (between the upper mold die 1062 and the side wall of the lower mold die 1061). Then, the mold resin 1060b is supplied to the inside of the lower mold die 1061 from the nozzle 1063.

The mold resin 1060b is silicon-based resin, for example, as described above. Specifically, it is preferable to use silicon-based resin which adheres to quartz and is hardened at room temperature. The amount of mold resin 1060b is adjusted such that at least the upper surface of the second light-transmitting plate 57 arranged on the facing substrate 52 is buried in the mold resin 1060b.

By forming the mold 1060 up to a level in which the upper surface of the second light-transmitting plate 57 is buried in the mold 1060 as described above, it is possible to extend the length of the interface between the second light-transmitting plate 57 and the mold 1060. In other words, it is possible to extend the distance from a portion of the second light transmitting plate 57, which is in contact with ambient air, to the sealing material 407 and to thereby suppress entry of moisture into the liquid crystal layer 450 via the sealing material 407.

In addition, it is preferable to perform fluorine coating processing on the surface of the mold 1060 after forming the mold 1060 in the outer circumference of the liquid crystal panel 40. With such a configuration, it is possible to suppress transmission of moisture through the mold 1060 and entry of the moisture into the liquid crystal layer 450.

As described above in detail, it is possible to achieve the following advantages by the liquid crystal device 1000, the method of manufacturing the liquid crystal device 1000, and the electronic apparatus according to the first embodiment.

(1) According to the liquid crystal device 1000 and the method of manufacturing the liquid crystal device 1000 in the first embodiment, the mold 1060 is formed so as to cover the region from the surface of the first light-transmitting plate 56 on the opposite side to the liquid crystal layer 450 to the surface of the second light-transmitting plate 57 on the opposite side to the liquid crystal layer 450, and therefore, it is possible to extend the length of the interface between the mold 1060 and the substrates (the element substrate 51, the facing substrate 52, the first light-transmitting plate 56, and the second light-transmitting plate 57). For this reason, it is possible to suppress entry of moisture into the liquid crystal layer 450 via the interface and the sealing material 407. In addition, since the mold 1060 is formed to have a large thickness, it is possible to improve moisture resistance. As a result, it is possible to suppress deterioration in the liquid crystal layer 450 and to suppress degradation in display quality due to a degraded controllability (responsiveness) of the liquid crystal.

(2) According to the liquid crystal device 1000 and the method of manufacturing the liquid crystal device 1000 in the first embodiment, the coating processing is performed on the surface of the mold 1060, and therefore, it is possible to suppress transmittance of moisture through the mold 1060 and entry of the moisture into the liquid crystal layer 450.

(3) According to the liquid crystal device 1000 and the method of manufacturing the liquid crystal device 1000 in the first embodiment, the mold 1060 with a function as a frame is used instead of a metal frame which is used in the related art, and therefore, it is possible to employ a frameless configuration and to suppress the cost. In addition, it is possible to reduce the weight by employing the mold 1060.

(4) According to the electronic apparatus in the first embodiment, the above liquid crystal device 1000 is provided therein, and therefore, it is possible to provide an electronic apparatus capable of improving display quality and suppressing deterioration in the liquid crystal layer 450.

Modification Example 1

Figure 8:
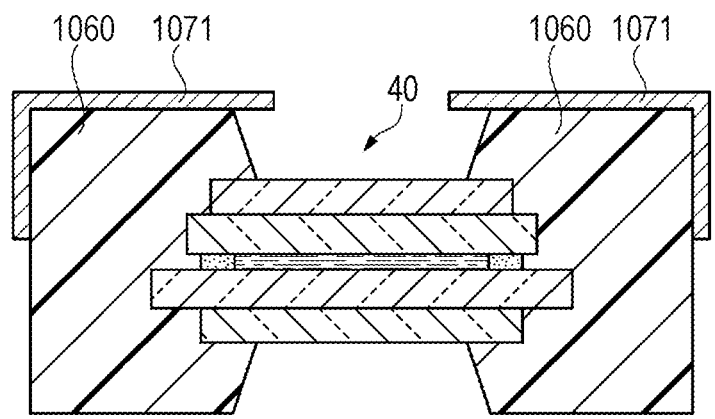
FIG. 8 is a cross-sectional view schematically showing a configuration of a liquid crystal device according to a modification example of the first embodiment.

The invention is not limited to the above configuration in which only the mold 1060 functioning as a frame is formed in the outer circumference of the liquid crystal device 1000, and the configuration shown in FIG. 8 may be employed. FIG. 8 is a cross-sectional view schematically showing the configuration of a liquid crystal device according to the modification example. The liquid crystal device shown in FIG. 8 is different from the liquid crystal device 1000 according to the above embodiment in that a hook 1071 which has a light blocking property and a parting function is arranged on the mold 1060.

The hook 1071 is arranged on the light incident side with respect to the mold 1060 and is used as a parting unit for limiting a range of light which is incident on the liquid crystal panel 40. The hook 1071 is a metal plate, for example. The hook 1071 is provided with an opening hole which is overlapped with an opening region of the mold 1060. The opening hole of the hook 1071 is smaller than the opening hole of the mold 1060.

The hook 1071 is made of a material with higher heat conductivity than those of the second light-transmitting plate 57 and the liquid crystal panel 40 (the element substrate 51 and the facing substrate 52). More specifically, the hook 1071 is made of metal such as aluminum or copper. Therefore, the hook 1071 also functions as a heat releasing member for releasing heat, which is generated at the liquid crystal panel 40, via the mold 1060. In addition, black color treatment is performed on the hook 1071 in order to suppress reflection of light.

The mold 1060 and the hook 1071 may be fixed to each other with an adhesive agent, for example, or may be fixed to each other by fitting a convex portion of the mold 1060 into a concave portion of the hook 1071.

With such a configuration, the light-blocking hook 1071 is arranged so as to surround the image display region 40a, and therefore, it is possible to limit the range of the light which is incident on the image display region 40a. In other words, it is possible to block light which is unnecessarily incident on the region.

In addition, the invention is not limited to the arrangement of the hook 1071 on the side of the facing substrate 52, and the hook 1071 may also be arranged on the side of the element substrate 51.

Modification Example 2

Figure 9:
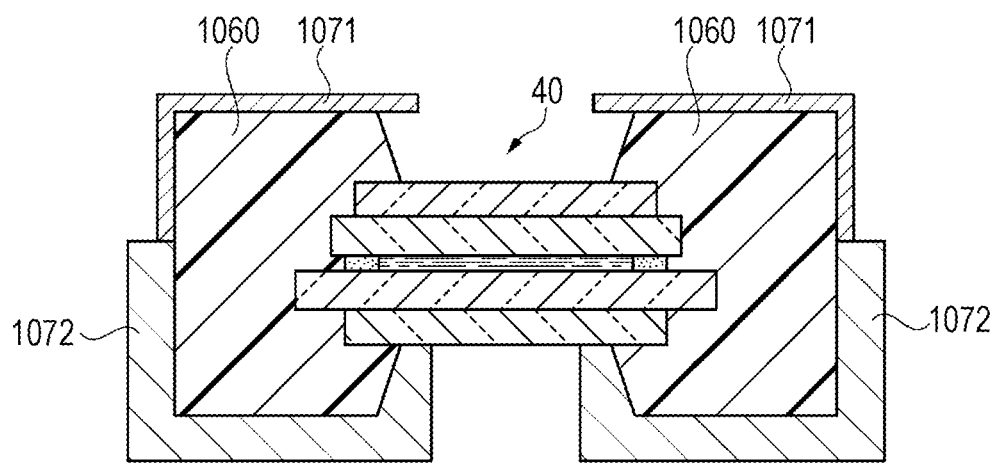
FIG. 9 is a cross-sectional view schematically showing a configuration of a liquid crystal device according to a modification example of the first embodiment.

The invention is not limited to the above configuration in which only the mold 1060 functioning as a frame is formed in the outer circumference of the liquid crystal device 1000 or the configuration of providing the hook 1071 as in Modification Example 1, and the configuration shown in FIG. 9 may be employed. FIG. 9 is a cross-sectional view schematically showing a configuration of a liquid crystal device according to Modification Example 2.

The liquid crystal device shown in FIG. 9 is different from those in the above embodiment and Modification Example 1 in that the hook 1071 is provided above the mold 1060 and a case 1072 as a frame body is provided below the mold 1060.

The hook 1071 is configured in the same manner as that in Modification Example 1, for example. The case 1072 is a metal material such as aluminum or magnesium and is arranged so as to surround the mold 1060 and be in contact with the liquid crystal panel 40.

Fixation between the mold 1060 and the hook 1071 and fixation between the mold 1060 and the case 1072 may be established with an adhesive agent or may be established by fitting these components to each other as described above.

According to this modification example, the case 1072 is arranged so as to be in contact with the liquid crystal panel 40, and therefore, it is possible to efficiently release the heat accumulated in the liquid crystal panel 40. In addition, since the heat in the liquid crystal layer 450 is released, it is possible to suppress a decrease in lifetime of the liquid crystal layer 450 (lifetime of the liquid crystal panel 40).

Modification Example 3

The invention is not limited to the above configuration in which the mold 1060 is formed in the outer circumference of the liquid crystal panel 40 by supplying (dripping) the mold resin 1060*b* to the lower mold die 1061, and the mold 1060 may be formed by a transfer mold scheme, for example. At this time, it is preferable to employ mold resin 1060*b* capable of forming the mold 1060 at a temperature which does not affect the liquid crystal panel 40.

Modification Example 4

As for electronic apparatuses on which the liquid crystal device 1000 is mounted as described above, it is possible to use the liquid crystal device 1000 for various electronic apparatuses such as an electrical view finder (EVF), a mobile mini projector, a head-up display, a smart phone, a mobile phone, a mobile computer, a digital camera, a digital video camera, a display, a vehicle-mounted device, an audio device, an exposure device, and an illumination device as well as the projection-type display apparatus 1.

Modification Example 5

The invention is not limited to the application of the liquid crystal device 1000 as the electro-optic device as described above, and the electro-optic device may be applied to an organic EL device, a plasma display, or an electronic paper (EPD), for example. In a case of a liquid crystal device, for example, an electro-optic material is liquid crystal. In a case of an electronic paper, the electro-optic material is an electrophoretic material.

Second Embodiment

Hereinafter, a second embodiment in which an example of the invention is implemented will be described with reference to drawings. In addition, the drawings to be used are appropriately shown in an enlarged manner or in a contracted manner such that parts to be described can be recognized. Furthermore, since the second embodiment is configured in the same manner as in the first embodiment other than that the configuration of the liquid crystal device 1000 and the method of manufacturing the liquid crystal device as the electro-optic device according to the aforementioned first embodiment are different, the same reference numerals will be given to the same constituent elements as those in the first embodiment, and the descriptions thereof will be omitted.

Figure 10:
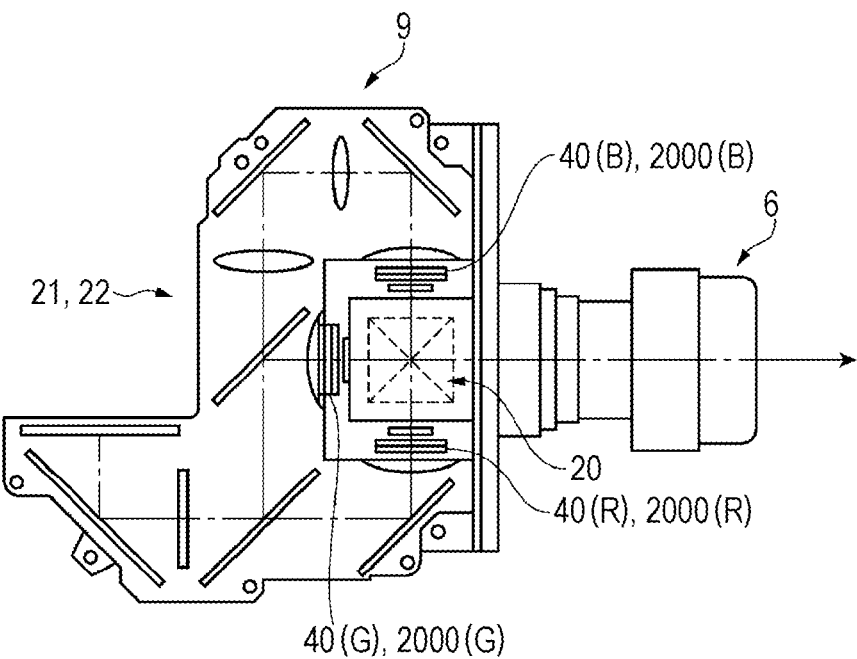
FIG. 10 is a diagram schematically showing a configuration of an optical unit used in a projection-type display apparatus according to a second embodiment.
Figure 11:
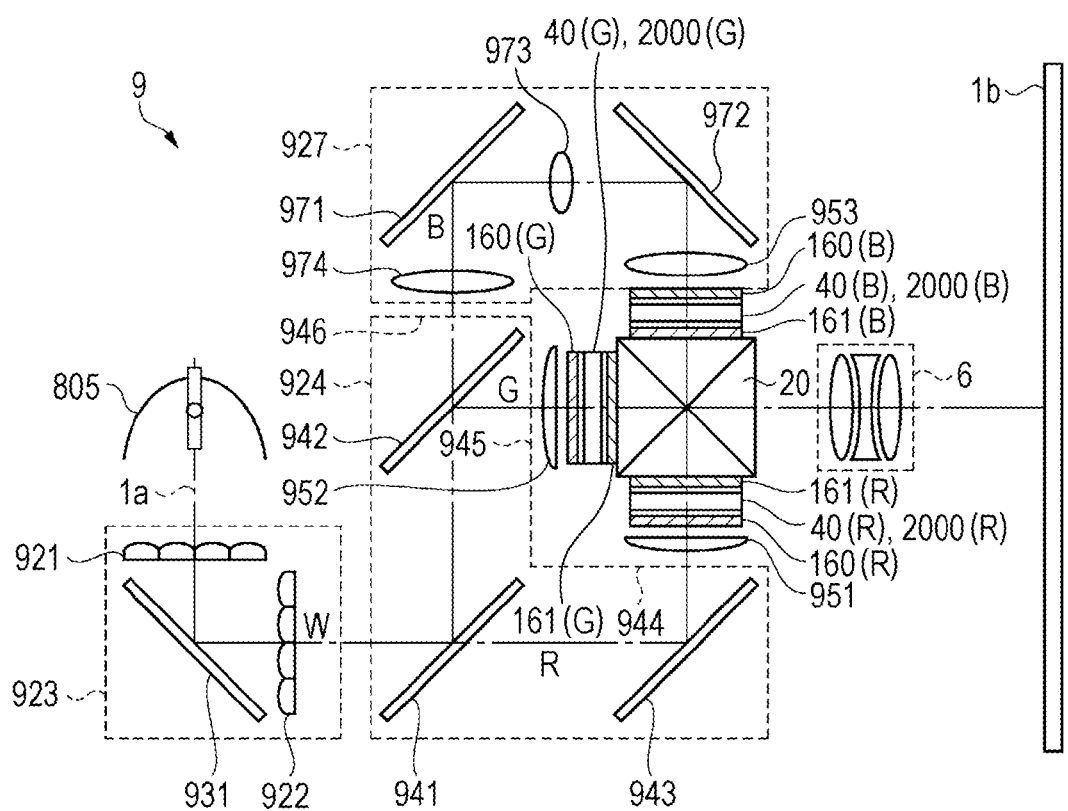
FIG. 11 is a diagram schematically showing a detailed configuration of the optical unit used in the projection-type display apparatus according to the second embodiment.

In this embodiment, a configuration of the electronic apparatus, a detailed configuration of the optical unit, and a configuration of the electro-optic panel are the same as those according to the aforementioned first embodiment. However, when the liquid crystal panels 40(R), 40(G), and 40(B) are mounted on the optical unit 9 shown in FIGS. 10 and 11, the liquid crystal panels 40(R), 40(G), and 40(B) are mounted in a state of being provided in liquid crystal devices 2000(R), 2000(G), and 2000(B), which will be described later, respectively.

The liquid crystal panels 40(R), 40(G), and 40(B) have the same configuration, and the liquid crystal devices 2000(R), 2000(G), and 2000(B) for the red color (R), the green color (G), and the blue color (B) provided with the liquid panels 40(R), 40(G), and 40(B) also have the same configuration. Therefore, the following description will be given without adding (R), (G), and (B) which represent corresponding colors.

Configuration of Electro-optic Device

Figure 12:
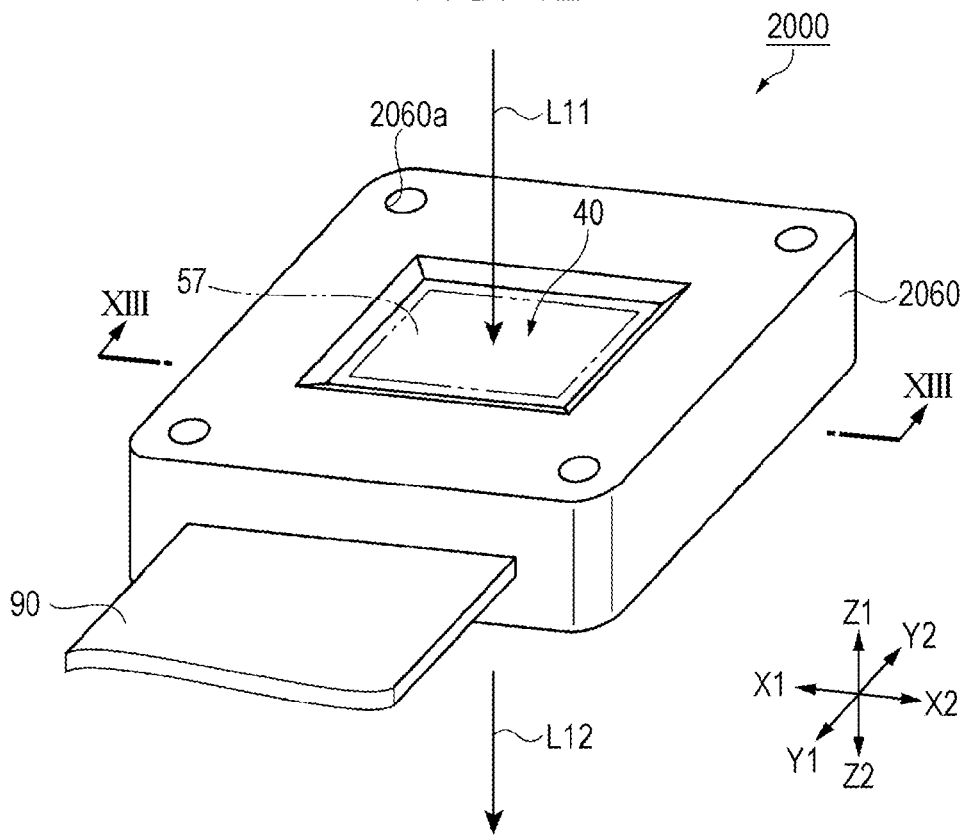
FIG. 12 is a perspective view schematically showing a configuration of a liquid crystal device as an electro-optic device according to the second embodiment.
Figure 13:
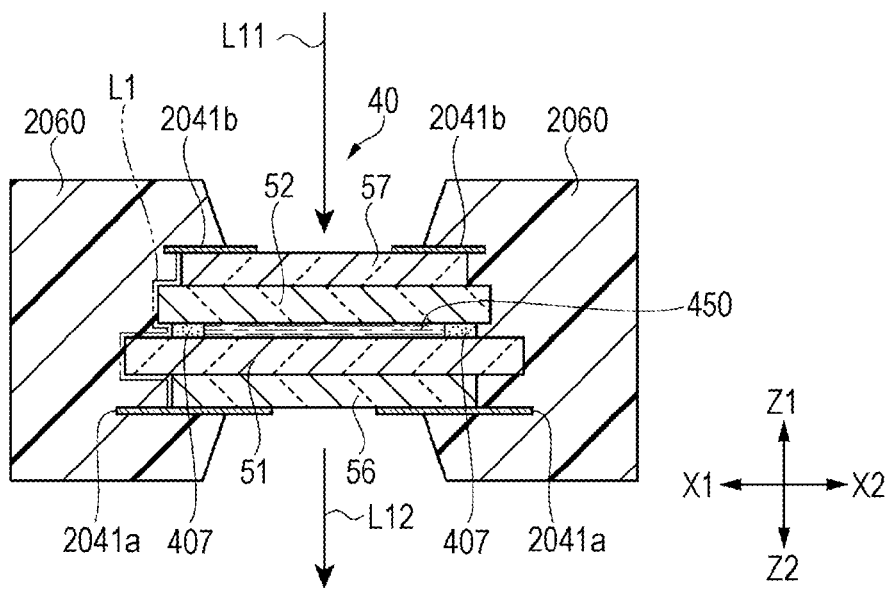
FIG. 13 is a schematic cross-sectional view taken along line XIII-XIII in the liquid crystal device shown in FIG. 12.

FIG. 12 is a perspective view schematically showing a configuration of the liquid crystal device as the electro-optic device. FIG. 13 is a schematic cross-sectional view taken along line XIII-XIII in the liquid crystal device shown in FIG. 12. Hereinafter, the configuration of the liquid crystal device will be described with reference to FIGS. 12 and 13. In FIG. 13, depiction and description of the flexible wiring substrate 90 are omitted.

When the liquid crystal panel 40 described above with reference to FIGS. 4A and 4B is mounted on the projection-type display apparatus 1 and the optical unit 9 described above with reference to FIGS. 1A, 1B, 10, and 11, the flexible wiring substrate 90 is connected to the liquid crystal panel 40, and the liquid crystal device 2000 in which a mold 2060 is arranged so as to cover the outer circumference of the liquid crystal panel 40 for the purpose of moisture resistance and reinforcement is then obtained as shown in FIGS. 12 and 13.

Specifically, the mold 2060 is a resin member which includes a rectangular opening hole at the center thereof and has an outer shape functioning as a frame, and accommodates the liquid crystal panel 40 therein. The mold 2060 is formed of silicon-based resin, for example.

As shown in FIG. 13, the mold 2060 is provided so as to cover a region from the surface of the first light-transmitting plate 56 as a third substrate on the opposite side to the liquid crystal layer 450 to the surface of the second light-transmitting plate 57 as the third substrate on the opposite side to the liquid crystal layer 450. Specifically, the mold 2060 is provided so as to cover up to the region overlapped with the sealing material 407 in a plan view. The opening hole is opened such that the mold 2060 is not arranged in at least a region overlapped with the image display region 40*a*.

As shown in FIGS. 4A, 4B, 12, and 13, the first light-transmitting plate 56 is attached to the second surface 51*b* of the element substrate 51 (outer surface; the surface of the element substrate 51 on the opposite side to the facing substrate 52) with an adhesive agent or the like, and the second light-transmitting plate 57 is attached to the second surface 52b of the facing substrate 52 (outer surface; the surface of the facing substrate 52 on the opposite side to the element substrate 51) with an adhesive agent or the like in the liquid crystal panel 40 for configuring the liquid crystal device 2000 by using the liquid crystal panel 40 according to this embodiment.

Since the first light-transmitting plate 56 and the second light-transmitting plate 57 have the same configurations as those in the aforementioned first embodiment, the descriptions thereof will be omitted.

As shown in FIG. 12, opening holes 2060a for arranging the liquid crystal device 2000 in the aforementioned projection-type display apparatus 1 are provided at four corners of the upper surface of the mold 2060. In addition, the invention is not limited to the opening holes 2060a, and screw holes may be formed.

In addition, coating processing to provide liquid repellency is performed on the surface of the mold 2060. Examples of the coating processing include fluorine coating.

Since the mold 2060 is provided so as to cover the region from the surface of the first light-transmitting plate 56 on the opposite side to the liquid crystal layer 450 to the surface of the second light-transmitting plate 57 on the opposite side to the liquid crystal layer 450 as described above, it is possible to extend the length L1 of the interface between the mold 2060 and the substrates (the element substrate 51, the facing substrate 52, the first light-transmitting plate 56, and the second light-transmitting plate 57). Therefore, it is possible to suppress entry of moisture into the liquid crystal layer 450 via the interface and the sealing material 407.

In addition, since the fluorine coating processing is performed on the surface of the mold 2060, it is possible to suppress transmittance of moisture through the mold 2060 and entry of the moisture into the liquid crystal layer 450.

In addition, a first hook 2041a which includes an opening portion in a region overlapped with the image display region 40a is arranged between the surface of the first light-transmitting plate 56 and the mold 2060. In contrast, a second hook 2041b which includes an opening portion in a region overlapped with the image display region 40a is arranged between the surface of the second light-transmitting plate 57 and the mold 2060.

The first hook 2041a and the second hook 2041b are made of a material with higher heat conductivity than those of the first light-transmitting plate 56, the second light-transmitting plate 57, and the liquid crystal panel 40 (the element substrate 51 and the facing substrate 52). More specifically, the first hook 2041a and the second hook 2041b are made of metal such as aluminum or copper. Therefore, the first hook 2041a and the second hook 2041b also function as heat releasing members for releasing heat, which is generated at the liquid crystal panel 40, therethrough. In addition, black color treatment is performed on the surfaces of the first hook 2041a and the second hook 2041b in order to suppress reflection of light.

In addition, since the first hook 2041a and the second hook 2041b with a parting function are arranged near the liquid crystal panel 40, it is possible to improve parting accuracy.

Method of Manufacturing Electro-Optic Device

FIGS. 14A and 14B are cross-sectional views schematically showing a method of manufacturing a liquid crystal device as the electro-optic device. Particularly, FIGS. 14A and 14B are cross-sectional views schematically showing a method of manufacturing a mold as a frame of the liquid crystal device. Hereinafter, the method of manufacturing the mold will be described with reference to FIGS. 14A and 14B.

In the process shown in FIG. 14A, the liquid crystal panel 40 is arranged in mold dies (an upper mold die 2062 and a lower mold die 2061). First, the concave-shaped lower mold die 2061 is arranged. A bottom portion 2061b of the lower mold die 2061 is provided with a convex portion 2061a for arranging the liquid crystal panel 40.

Next, the first light-transmitting plate 56 is arranged on the surface of the element substrate 51 on the opposite side to the liquid crystal layer 450 in the liquid crystal panel 40. In addition, the second light-transmitting plate 57 is arranged on the surface of the facing substrate 52 on the opposite side to the liquid crystal layer 450.

Next, the liquid crystal panel 40 is arranged on the convex portion 2061a via the first hook 2041a. Thereafter, the upper mold die 2062 is arranged on the liquid crystal panel 40 via the second hook 2041b. Specifically, the convex portion 2061a and the first light-transmitting plate 56 are arranged so as to face each other, and the second light-transmitting plate 57 and the upper mold die 2062 are arranged so as to face each other.

It is desirable that Teflon is formed in advance on the surface of the upper mold die 2062 and the surface of the lower mold die 2061. Specifically, Teflon is formed at least in portions, at which the upper mold die 2062 and the lower mold die 2061 are brought into contact with the mold resin 2060b, of the upper mold die 2062 and the lower mold die 2061. With such a configuration, it is possible to facilitate separation of the mold 2060 from the upper mold die 2062 and the lower mold die 2061 when the mold 2060 is formed.

In the process shown in FIG. 14B, the softened mold resin 2060b is supplied to a space surrounded by a side wall of the lower mold die 2061. First, a nozzle 2063 for supplying the mold resin 2060b is arranged above the lower mold die 2061 (between the upper mold die 2062 and the side wall of the lower mold die 2061). Then, the mold resin 2060b is supplied from the nozzle 2063 to the inside of the lower mold die 2061.

The mold resin 2060b is silicon-based resin, for example, as described above. Specifically, it is preferable to use silicon-based resin which adheres to quartz and is hardened at room temperature. The amount of mold resin 2060b is adjusted such that at least the upper surface of the second light-transmitting plate 57 arranged on the facing substrate 52 is buried in the mold resin 2060b.

By forming the mold 2060 up to a level in which the upper surface of the second light-transmitting plate 57 is buried in the mold 2060 as described above, it is possible to extend the length of the interface between the second light-transmitting plate 57 and the mold 2060. In other words, it is possible to extend the distance from a portion of the second light transmitting plate 57, which is in contact with ambient air, to the sealing material 407 and to thereby suppress entry of moisture into the liquid crystal layer 450 via the sealing material 407.

In addition, it is preferable to perform fluorine coating processing on the surface of the mold 2060 after forming the mold 2060 in the outer circumference of the liquid crystal panel 40. With such a configuration, it is possible to suppress transmission of moisture through the mold 2060 and entry of the moisture into the liquid crystal layer 450.

In addition, since the first hook 2041a is arranged at the contact portion between the lower mold die 2061 and the liquid crystal panel 40 and the second hook 2041b is arranged at the contact portion between the upper mold die 2062 and the liquid crystal panel 40, it is possible to prevent the mold dies from being brought into direct contact with the liquid crystal panel 40 and to thereby prevent contact scratch from being generated in the liquid crystal panel 40 (the first light-transmitting plate 56 and the second light-transmitting plate 57).

As described above in detail, it is possible to achieve the following advantages by the liquid crystal device 2000, the method of manufacturing the liquid crystal device 2000, and the electronic apparatus according to this embodiment.

(1) According to the liquid crystal device 2000 and the method of manufacturing the liquid crystal device 2000 in the second embodiment, the mold 2060 is formed so as to cover the region from the surface of the first light-transmitting plate 56 on the opposite side to the liquid crystal layer 450 to the surface of the second light-transmitting plate 57 on the opposite side to the liquid crystal layer 450, and therefore, it is possible to extend the length of the interface between the mold 2060 and the substrates (the element substrate 51, the facing substrate 52, the first light-transmitting plate 56, and the second light-transmitting plate 57). For this reason, it is possible to suppress entry of moisture into the liquid crystal layer 450 via the interface and the sealing material 407. In addition, since the mold 2060 is formed to have a large thickness, it is possible to improve moisture resistance. As a result, it is possible to suppress deterioration in the liquid crystal layer 450 and to suppress degradation in display quality due to a degraded controllability (responsiveness) of the liquid crystal.

(2) According to the liquid crystal device 2000 and the method of manufacturing the liquid crystal device 2000 in the second embodiment, the coating processing is performed on the surface of the mold 2060, and therefore, it is possible to suppress transmittance of moisture through the mold 2060 and entry of the moisture into the liquid crystal layer 450.

(3) According to the liquid crystal device 2000 and the method of manufacturing the liquid crystal device 2000 in the second embodiment, the mold 2060 with a function as a frame is used instead of a metal frame which is used in the related art, and therefore, it is possible to employ a frameless configuration and to suppress the cost. In addition, it is possible to reduce the weight by employing the mold 2060.

(4) According to the liquid crystal device 2000 and the method of manufacturing the liquid crystal device 2000 in the second embodiment, the first hook 2041a and the second hook 2041b are provided as parting units at the first light-transmitting plate 56 and the second light-transmitting plate 57 near the liquid crystal panel 40, and therefore, it is possible to improve parting accuracy. In addition, since the first hook 2041a and the second hook 2041b are arranged at such portions so as to be brought into contact with the lower mold die 2061 and the upper mold die 2062 when the mold 2060 is formed, it is possible to prevent the mold dies (the upper mold die 2062 and the lower mold die 2061) from being brought into direct contact with the liquid crystal panel 40 and to thereby prevent contact scratch from being generated in the liquid crystal panel 40 (the first light-transmitting plate 56 and the second light-transmitting plate 57).

(5) According to the electronic apparatus in the second embodiment, the above liquid crystal device 2000 is provided therein, and therefore, it is possible to provide an electronic apparatus capable of improving display quality and suppressing deterioration in the liquid crystal layer 450.

Modification Example 6

Figure 15:
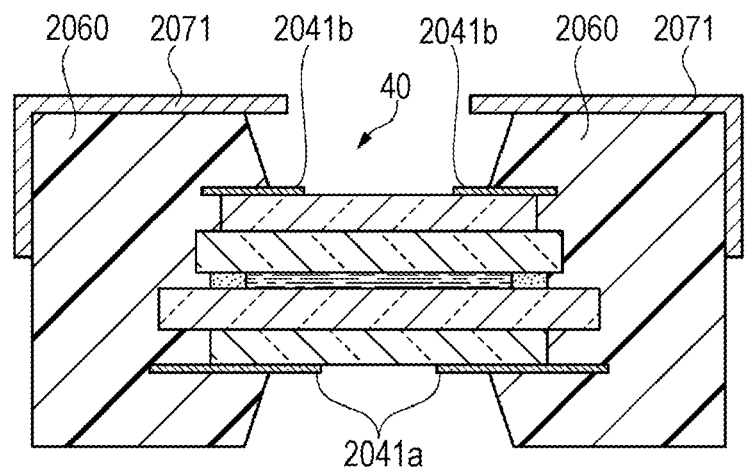
FIG. 15 is a cross-sectional view schematically showing a configuration of a liquid crystal device according to a modification example of the second embodiment.

The invention is not limited to the above configuration in which only the mold 2060 functioning as a frame is formed in the outer circumference of the liquid crystal panel 40, and the configuration shown in FIG. 15 may be employed. FIG. 15 is a cross-sectional view schematically showing a configuration of a liquid crystal device according to a modification example. The liquid crystal device shown in FIG. 15 is different from those in the above embodiments and modification examples in that a light-blocking third hook 2071 functioning as a parting unit is arranged on the mold 2060 along with the first hook 2041a and the second hook 2041b.

The third hook 2071 is arranged on the light incident side with respect to the mold 2060 and is used as a parting unit for limiting the range of the light which is incident on the liquid crystal panel 40. The third hook 2071 is a metal plate, for example. The third hook 2071 is provided with an opening hole which is overlapped with the opening region of the mold 2060. The opening hole of the third hook 2071 is smaller than the opening hole of the mold 2060.

The third hook 2071 is made of a material with higher heat conductivity than those of the second light-transmitting plate 57 and the liquid crystal panel 40 (the element substrate 51 and the facing substrate 52). More specifically, the third hook 2071 is made of metal such as aluminum or copper. Therefore, the third hook 2071 also functions as a heat releasing member for releasing the heat, which is generated at the liquid crystal panel 40, via the mold 2060. In addition, black color treatment is performed on the surface of the third hook 2071 in order to suppress reflection of light.

The mold 2060 and the third hook 2071 may be fixed to each other with an adhesive agent, for example, or may be fixed to each other by fitting a convex portion of the mold 2060 into a concave portion of the third hook 2071.

With such a configuration, the light-blocking third hook 2071 is arranged so as to surround the image display region 40a, and therefore, it is possible to limit the range of the light which is incident on the image display region 40a. In other words, it is possible to block light which is unnecessarily incident on the region.

In addition, the invention is not limited to the arrangement of the third hook 2071 on the side of the facing substrate 52, and the third hook 2071 may also be arranged on the side of the element substrate 51.

Modification Example 7

Figure 16:
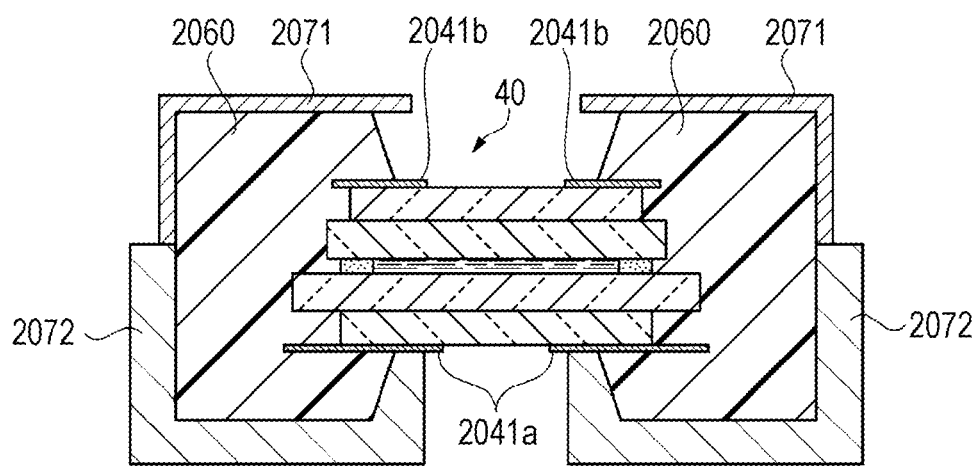
FIG. 16 is a cross-sectional view schematically showing a configuration of a liquid crystal device according to a modification example of the second embodiment.

The invention is not limited to the above configuration in which only the mold 2060 functioning as a frame is formed in the outer circumference of the liquid crystal panel 40 or the configuration of providing the third hook 2071 as in Modification Example 6, and the configuration shown in FIG. 16 may be employed. FIG. 16 is a cross-sectional view schematically showing a configuration of a liquid crystal device according to Modification Example 7. The liquid crystal device shown in FIG. 16 is different from those in the above embodiments and modification examples in that the light-blocking third hook 2071 functioning as a parting unit is provided above the mold 2060 along with the first hook 2041a and the second hook 2041b and a case 2072 as a frame body is provided below the mold 2060.

The third hook 2071 is configured in the same manner as that in Modification Example 6, for example. The case 2072 is a metal material such as aluminum or magnesium and is arranged so as to surround the mold 2060 and be in contact with the liquid crystal panel 40 via the first hook 2041a.

Fixation between the mold 2060 and the third hook 2071 and fixation between the mold 2060 and the case 2072 may be established with an adhesive agent or may be established by fitting these components to each other as described above.

According to this modification example, the case 2072 is arranged so as to be in contact with the liquid crystal panel 40 via the first hook 2041*a*, and therefore, it is possible to prevent contact scratch from being generated in the lower mold die 2061 of the liquid crystal panel 40 (first light-transmitting plate 56) and to efficiently release the heat accumulated in the liquid crystal panel 40. In addition, since the heat in the liquid crystal layer 450 is released, it is possible to suppress a decrease in lifetime of the liquid crystal layer 450 (lifetime of the liquid crystal panel 40).

Modification Example 7

The invention is not limited to the above configuration in which the mold 2060 is formed in the outer circumference of the liquid crystal panel 40 by supplying (dripping) the mold resin 2060*b* to the lower mold die 2061, and the mold 2060 may be formed by a transfer mold scheme, for example. At this time, it is preferable to employ mold resin 2060*b* capable of forming the mold 2060 at a temperature which does not affect the liquid crystal panel 40.

Modification Example 8

As for electronic apparatuses on which the liquid crystal device 2000 is mounted as described above, it is possible to use the liquid crystal device for various electronic apparatuses such as an electrical view finder (EVF), a mobile mini projector, a head-up display, a smart phone, a mobile phone, a mobile computer, a digital camera, a digital video camera, a display, a vehicle-mounted device, an audio device, an exposure device, and an illumination device as well as the projection-type display apparatus 1.

Modification Example 9

The invention is not limited to the application of the liquid crystal device 2000 as the electro-optic device as described above, and the electro-optic device may be applied to an organic EL device, a plasma display, or an electronic paper (EPD), for example. In a case of a liquid crystal device, for example, an electro-optic material is liquid crystal. In a case of an electronic paper, the electro-optic material is an electrophoretic material.

Third Embodiment

Hereinafter, a third embodiment in which an example of the invention is implemented will be described with reference to drawings. In addition, the drawings to be used are appropriately shown in an enlarged manner or in a contracted manner such that parts to be described can be recognized. Furthermore, since the third embodiment is configured in the same manner as in the first embodiment other than that the configuration of the liquid crystal device 1000 and the method of manufacturing the liquid crystal device as the electro-optic device according to the aforementioned first embodiment are different, the same reference numerals will be given to the same constituent elements as those in the first embodiment, and the descriptions thereof will be omitted.

Figure 17:
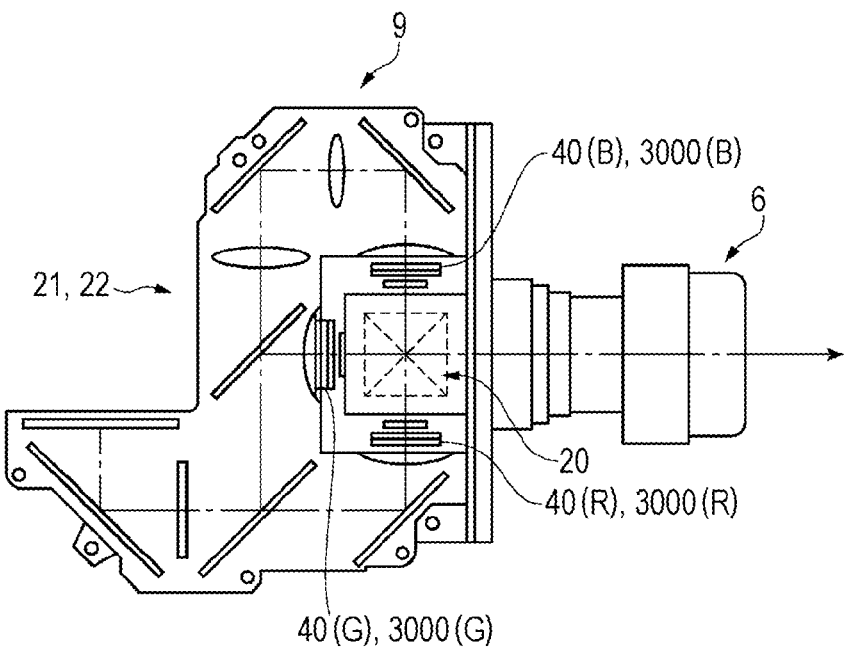
FIG. 17 is a diagram schematically showing a configuration of an optical unit used in a projection-type display apparatus according to a third embodiment.
Figure 18:
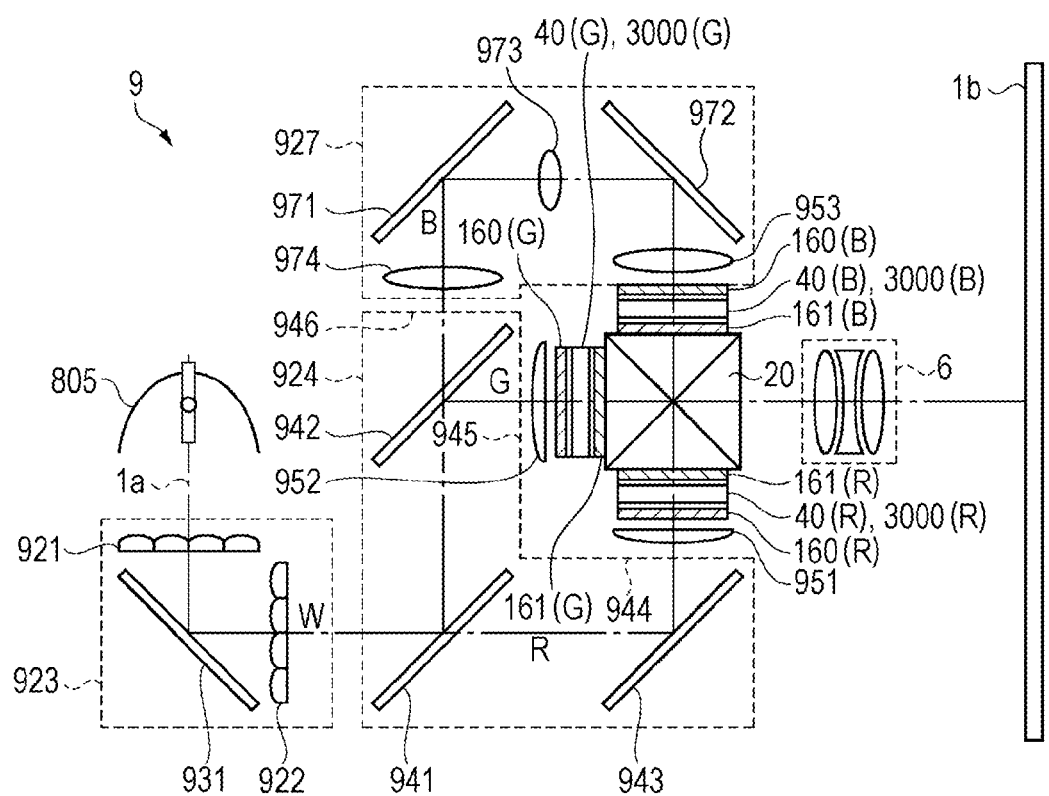
FIG. 18 is a diagram schematically showing a detailed configuration of the optical unit used in the projection-type display apparatus according to the third embodiment.

In this embodiment, a configuration of the electronic apparatus, a detailed configuration of the optical unit, and a configuration of the electro-optic panel are the same as those according to the aforementioned first embodiment. However, when the liquid crystal panels 40(R), 40(G), and 40(B) are mounted on the optical unit 9 shown in FIGS. 17 and 18, the liquid crystal panels 40(R), 40(G), and 40(B) are mounted in a state of being provided in liquid crystal devices 3000(R), 3000(G), and 3000(B), which will be described later, respectively.

The liquid crystal panels 40(R), 40(G), and 40(B) have the same configuration, and the liquid crystal devices 3000 (R), 3000(G), and 3000(B) for the red color (R), the green color (G), and the blue color (B) provided with the liquid panels 40(R), 40(G), and 40(B) also have the same configuration. Therefore, the following description will be given without adding (R), (G), and (B) which represent corresponding colors.

Configuration of Electro-Optic Device

Figure 19:
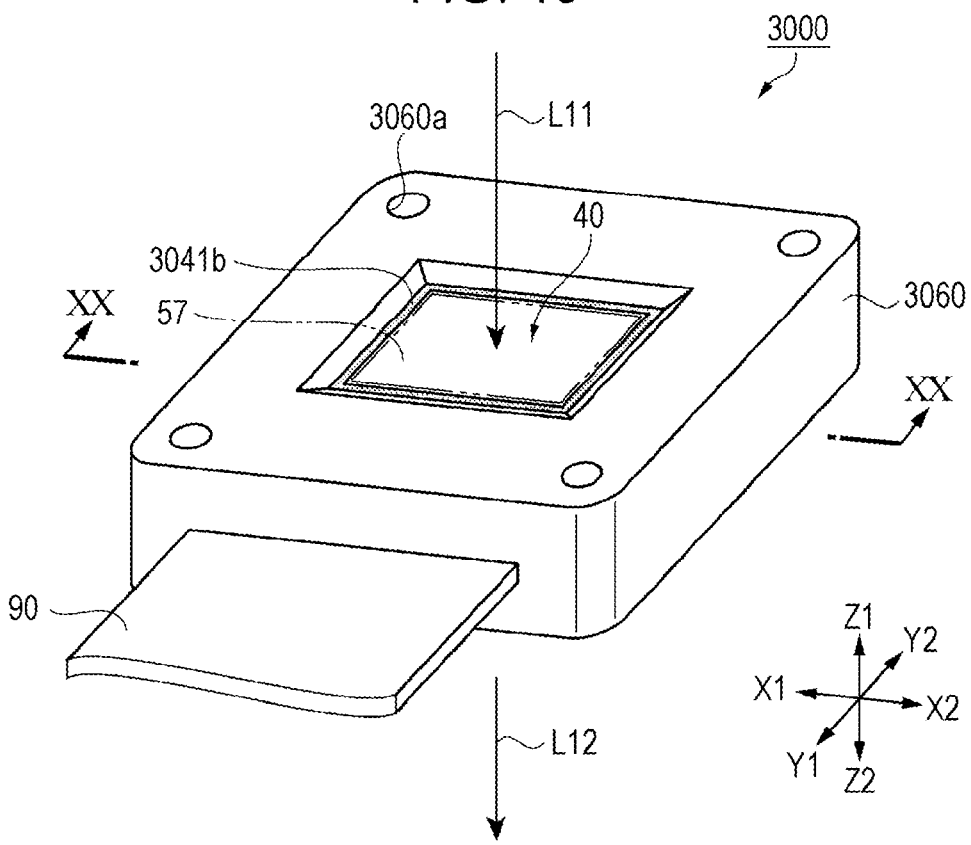
FIG. 19 is a perspective view schematically showing a configuration of a liquid crystal device as an electro-optic device according to the third embodiment.
Figure 20:
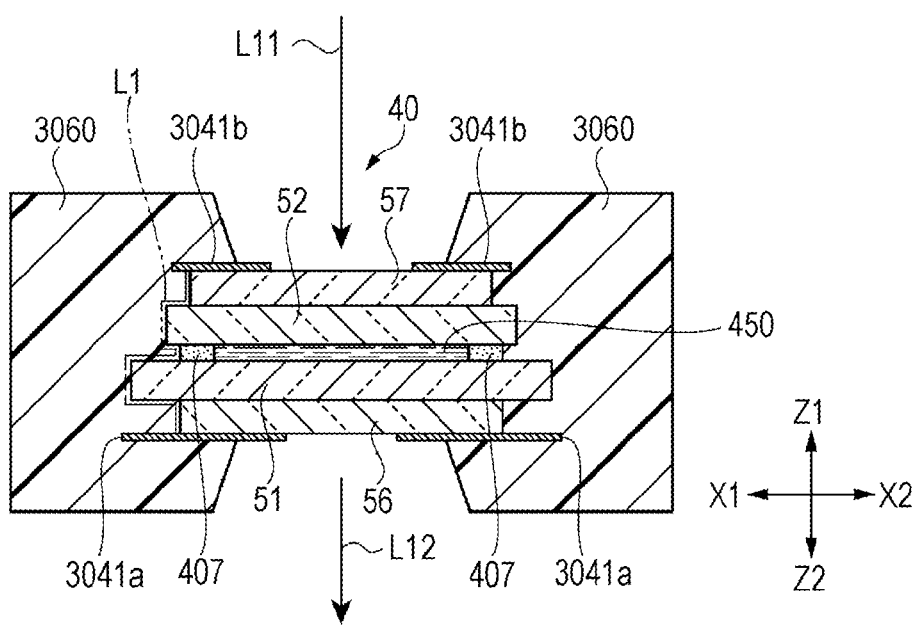
FIG. 20 is a schematic cross-sectional view taken along line XX-XX in the liquid crystal device shown in FIG. 19.

FIG. 19 is a perspective view schematically showing a configuration of a liquid crystal device as the electro-optic device. FIG. 20 is a schematic cross-sectional view taken along line XX-XX in the liquid crystal device shown in FIG. 19. Hereinafter, the configuration of the liquid crystal device will be described with reference to FIGS. 19 and 20. In FIG. 20, depiction and description of the flexible wiring substrate 90 are omitted.

When the liquid crystal panel 40 described above with reference to FIGS. 4A and 4B is mounted on the projection-type display apparatus 1 and the optical unit 9 described above with reference to FIGS. 1A, 1B, 17, and 18, the flexible wiring substrate 90 is connected to the liquid crystal panel 40, and the liquid crystal device 3000 in which a mold 3060 is arranged so as to cover the outer circumference of the liquid crystal panel 40 for the purpose of moisture resistance and reinforcement is then obtained as shown in FIGS. 19 and 20.

Specifically, the mold 3060 is a resin member which includes a rectangular opening hole at the center thereof and has an outer shape functioning as a frame, and accommodates the liquid crystal panel 40 therein. The mold 3060 is formed of silicon-based resin, for example.

As shown in FIG. 20, the mold 3060 is provided so as to cover a region from the surface of the first light-transmitting plate 56 as a third substrate on the opposite side to the liquid crystal layer 450 to the surface of the second light-transmitting plate 57 as the third substrate on the opposite side to the liquid crystal layer 450. Specifically, the mold 3060 is provided so as to cover up to the region overlapped with the sealing material 407 in a plan view. The opening hole is opened such that the mold 3060 is not arranged in at least a region overlapped with the image display region 40*a*.

As shown in FIGS. 4A, 4B, 19, and 20, the first light-transmitting plate 56 is attached to the second surface 51*b* of the element substrate 51 (outer surface; the surface of the element substrate 51 on the opposite side to the facing substrate 52) with an adhesive agent or the like, and the second light-transmitting plate 57 is attached to the second surface 52*b* of the facing substrate 52 (outer surface; the surface of the facing substrate 52 on the opposite side to the element substrate 51) with an adhesive agent or the like in the liquid crystal panel 40 for configuring the liquid crystal device 3000 by using the liquid crystal panel 40 according to this embodiment.

Since the first light-transmitting plate 56 and the second light-transmitting plate 57 have the same configurations as those in the aforementioned first embodiment, the descriptions thereof will be omitted.

As shown in FIG. 19, opening holes 3060*a* for arranging the liquid crystal device 3000 in the aforementioned projection-type display apparatus 1 are provided at four corners of the upper surface of the mold 3060. In addition, the invention is not limited to the opening holes 3060a, and screw holes may be formed.

In addition, coating processing to provide liquid repellency is performed on the surface of the mold 3060. Examples of the coating processing include fluorine coating.

Since the mold 3060 is provided so as to cover the region from the surface of the first light-transmitting plate 56 on the opposite side to the liquid crystal layer 450 to the surface of the second light-transmitting plate 57 on the opposite side to the liquid crystal layer 450 as described above, it is possible to extend the length L1 of the interface between the mold 3060 and the substrates (the element substrate 51, the facing substrate 52, the first light-transmitting plate 56, and the second light-transmitting plate 57). Therefore, it is possible to suppress entry of moisture into the liquid crystal layer 450 via the interface and the sealing material 407.

In addition, since the fluorine coating processing is performed on the surface of the mold 3060, it is possible to suppress transmittance of moisture through the mold 3060 and entry of the moisture into the liquid crystal layer 450.

In addition, a first support seal 3041a which includes an opening portion in a region overlapped with the image display region 40a is arranged between the surface of the first light-transmitting plate 56 and the mold 3060. In contrast, a second support seal 3041b which includes an opening portion in a region overlapped with the image display region 40a is arranged between the surface of the second light-transmitting plate 57 and the mold 3060.

The first support seal 3041a and the second support seal 3041b are preferably configured of a film-shaped flexible material, and are configured of vinyl chloride, polyimide film, or polyester (PET), for example. Alternatively, the first support seal 3041a and the second support seal 3041b may be configured of rubber or the like.

The first support seal 3041a and the second support seal 3041b are used to prevent contact scratch from being generated in the liquid crystal panel 40 when the mold dies are arranged in the circumference of the liquid crystal panel 40 for forming the mold 3060 in the outer circumference of the liquid crystal panel 40.

Method of Manufacturing Electro-Optic Device

Figure 21A:
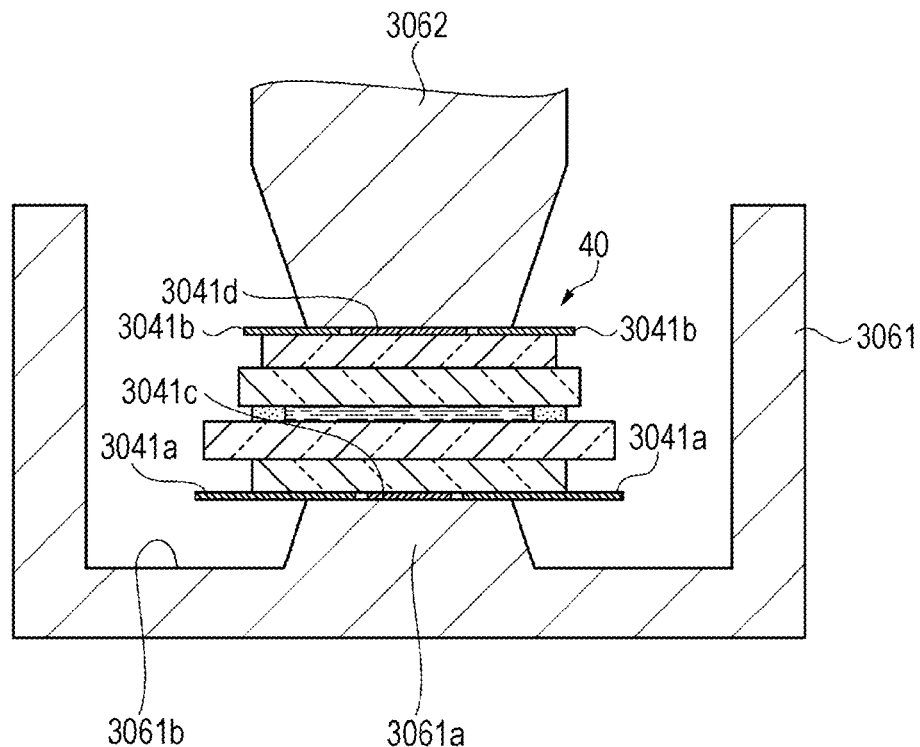
FIGS. 21A and 21B are cross-sectional views schematically showing a method of manufacturing the liquid crystal device as the electro-optic device according to the third embodiment.
Figure 21B:
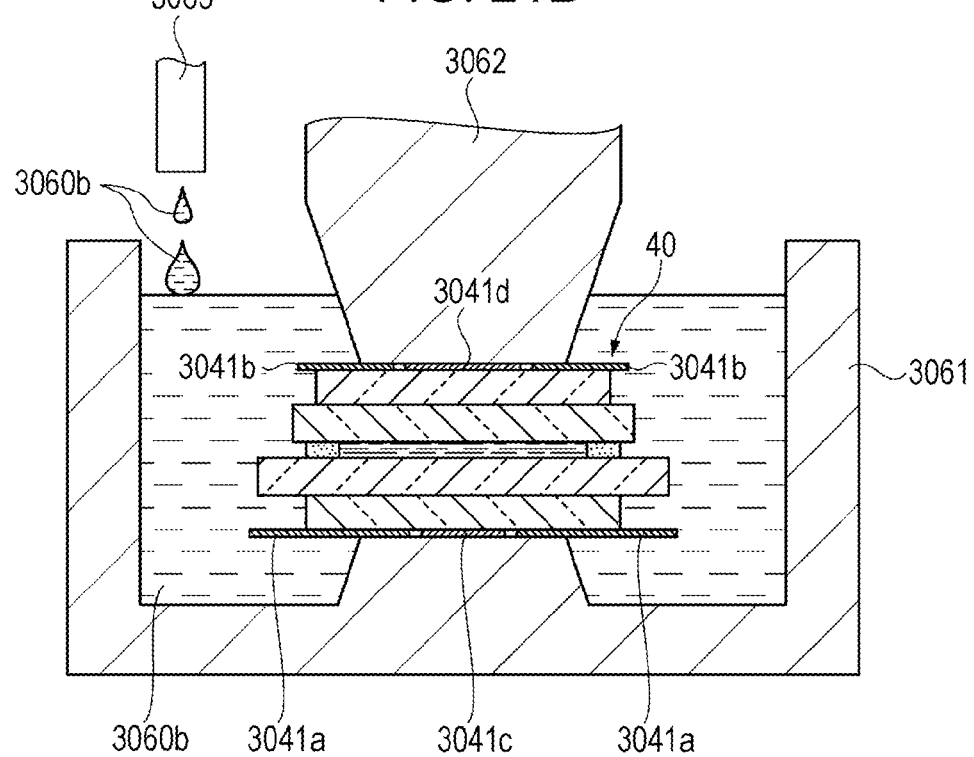

FIGS. 21A and 21B are cross-sectional views schematically showing a method of manufacturing a liquid crystal device as the electro-optic device. Particularly, FIGS. 21A and 21B are cross-sectional views schematically showing a mold as a frame of the liquid crystal device. Hereinafter, the method of manufacturing the mold will be described with reference to FIGS. 21A and 21B.

In the process shown in FIG. 21A, the liquid crystal panel 40 is arranged in mold dies (an upper mold die 3062 and a lower mold die 3061). First, the concave-shaped lower mold die 3061 is arranged. At a bottom portion 3061b of the lower mold die 3061, a convex portion 3061a for arranging the liquid crystal panel 40 is arranged.

Next, the first light-transmitting plate 56 is arranged on the surface of the element substrate 51 on the opposite side to the liquid crystal layer 450 in the liquid crystal panel 40. In addition, the second light-transmitting plate 57 is arranged on the surface of the facing substrate 52 on the opposite side to the liquid crystal layer 450.

Then, the liquid crystal panel 40 is arranged on the convex portion 3061a via the first support seal 3041a. Thereafter, the upper mold die 3062 is arranged on the liquid crystal panel 40 via the second support seal 3041b. Specifically, the convex portion 3061a and the first light-transmitting plate 56 are arranged so as to face each other, and the second light-transmitting plate 57 and the upper mold die 3062 are arranged so as to face each other.

The first support seal 3041a and the second support seal 3041b may be a type of being attached to the liquid crystal panel 40 or may be a type of being formed on the liquid crystal panel 40 by using a semiconductor manufacturing technology.

According to this embodiment, the mold dies are in contact with the liquid crystal panel 40 via the first support seal 3041a and the second support seal 3041b even if the mold dies (the upper mold die 3062 and the lower mold die 3061) have a degree of flatness with low accuracy or even if burr occurs in the mold dies. Therefore, it is possible to prevent the liquid crystal panel 40 (the first light-transmitting plate 56 and the second light-transmitting plate 57) from being scratched and to prevent the mold resin 3060b from flowing into the image display region 40a.

In addition, it is possible to suppress entry of moisture into the liquid crystal panel 40 by using the first support seal 3041a and the second support seal 3041b with no force of penetration.

In addition, it is desirable to attach a third support seal 3041c to an opening portion surrounded by the first support seal 3041a, namely to the image display region 40a of the liquid crystal panel 40. Moreover, it is desirable to attach a fourth support seal 3041d to an opening portion surrounded by the second support seal 3041b, namely to the image display region 40a of the liquid crystal panel 40.

With such a configuration, it is possible to prevent dust and the like from adhering to the image display region 40a of the liquid crystal panel 40. In other words, it is possible to protect the display surface.

In addition, it is desirable to form Teflon on the surface of the upper mold die 3062 and the surface of the lower mold die 3061. Specifically, Teflon is formed at least in portions, at which the upper mold die 3062 and the lower mold die 3061 are brought into contact with the mold resin 3060b, of the upper mold die 3062 and the lower mold die 3061. With such a configuration, it is possible to facilitate separation of the mold 3060 from the upper mold die 3062 and the lower mold die 3061 when the mold 3060 is formed.

In the process shown in FIG. 21B, the softened mold resin 3060b is supplied to a space surrounded by a side wall of the lower mold die 3061. First, a nozzle 3063 for supplying the mold resin 3060b is arranged above the lower mold die 3061 (between the upper mold die 3062 and the side wall of the lower mold die 3061). Then, the mold resin 3060b is supplied from the nozzle 3063 to the inside of the lower mold die 3061.

The mold resin 3060b is silicon-based resin, for example, as described above. Specifically, it is preferable to use silicon-based resin which adheres to quartz and is hardened at room temperature. The amount of mold resin 3060b is adjusted such that at least the upper surface of the second light-transmitting plate 57 arranged on the facing substrate 52 is buried in the mold resin 3060b.

By forming the mold 3060 up to a level in which the upper surface of the second light-transmitting plate 57 is buried in the mold 3060 as described above, it is possible to extend the length of the interface between the second light-transmitting plate 57 and the mold 3060. In other words, it is possible to extend the distance from a portion of the second light transmitting plate 57, which is in contact with ambient air, to the sealing material 407 and to thereby suppress entry of moisture into the liquid crystal layer 450 via the sealing material 407.

In addition, it is preferable to perform fluorine coating processing on the surface of the mold 3060 after forming the mold 3060 in the outer circumference of the liquid crystal panel 40. With such a configuration, it is possible to suppress transmission of moisture through the mold 3060 and entry of the moisture into the liquid crystal layer 450.

Since the first support seal 3041a is arranged at the contact portion between the lower mold die 3061 and the liquid crystal panel 40 and the second support seal 3041b is arranged at the contact portion between the upper mold die 3062 and the liquid crystal panel 40, it is possible to prevent the mold dies from being brought into direct contact with the liquid crystal panel 40 and to thereby prevent contact scratch from being generated in the liquid crystal panel 40 (the first light-transmitting plate 56 and the second light-transmitting plate 57).

In addition, it is only necessary for the first support seal 3041a and the second support seal 3041b to function during the filling of the mold resin 3060b, and the first support seal 3041a and the second support seal 3041b may be left in the attached state to the liquid crystal panel 40 or may be peeled off after forming the mold 3060. Moreover, the third support seal 3041c and the fourth support seal 3041d can protect the display surface by being left until the electro-optic device is used as a product.

As described above in detail, it is possible to achieve the following advantages by the liquid crystal device 3000, the method of manufacturing the liquid crystal device 3000, and the electronic apparatus according to this embodiment.

(1) According to the liquid crystal device 3000 and the method of manufacturing the liquid crystal device 3000 in the third embodiment, the mold 3060 is formed so as to cover the region from the surface of the first light-transmitting plate 56 on the opposite side to the liquid crystal layer 450 to the surface of the second light-transmitting plate 57 on the opposite side to the liquid crystal layer 450, and therefore, it is possible to extend the length of the interface between the mold 3060 and the substrates (the element substrate 51, the facing substrate 52, the first light-transmitting plate 56, and the second light-transmitting plate 57). For this reason, it is possible to suppress entry of moisture into the liquid crystal layer 450 via the interface and the sealing material 407. In addition, since the mold 3060 is formed to have a large thickness, it is possible to improve moisture resistance. As a result, it is possible to suppress deterioration in the liquid crystal layer 450 and to suppress degradation in display quality due to a degraded controllability (responsiveness) of the liquid crystal.

(2) According to the liquid crystal device 3000 and the method of manufacturing the liquid crystal device 3000 in the third embodiment, the coating processing is performed on the surface of the mold 3060, and therefore, it is possible to suppress transmittance of moisture through the mold 3060 and entry of the moisture into the liquid crystal layer 450.

(3) According to the liquid crystal device 3000 and the method of manufacturing the liquid crystal device 3000 in the third embodiment, the mold 3060 with a function as a frame is used instead of a metal frame which is used in the related art, and therefore, it is possible to employ a frameless configuration and to suppress the cost. In addition, it is possible to reduce the weight by employing the mold 3060.

(4) According to the method of manufacturing the liquid crystal device 3000 in the third embodiment, the first support seal 3041a and the second support seal 3041b are arranged at such portions so as to be brought into contact with the lower mold die 3061 and the upper mold die 3062 when the mold 3060 is formed, and therefore, it is possible to prevent the mold dies from being brought into direct contact with the liquid crystal panel 40 and to thereby prevent contact scratch from being generated in the liquid crystal panel 40 (the first light-transmitting plate 56 and the second light-transmitting plate 57).

(5) According to the electronic apparatus in the third embodiment, the above liquid crystal device 3000 is provided therein, and therefore, it is possible to provide an electronic apparatus capable of improving display quality and suppressing deterioration in the liquid crystal layer 450.

Modification Example 10

Figure 22:
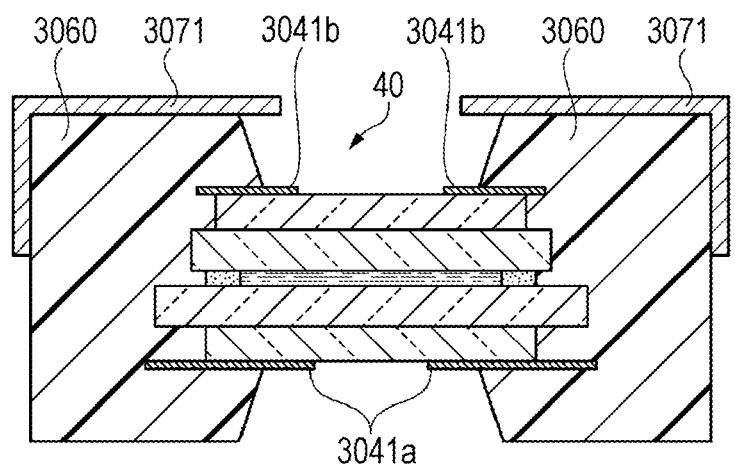
FIG. 22 is a cross-sectional view schematically showing a configuration of a liquid crystal device according to a modification example of the third embodiment.

The invention is not limited to the above configuration in which only the mold 3060 functioning as a frame is formed in the outer circumference of the liquid crystal panel 40, and the configuration shown in FIG. 22 may be employed. FIG. 22 is a cross-sectional view schematically showing a configuration of a liquid crystal device according to a modification example. The liquid crystal device shown in FIG. 22 is different from those in the above embodiments and modification examples in that a light-blocking hook 3071 functioning as a parting unit is arranged on the mold 3060 along with the first support seal 3041a and the second support seal 3041b.

The hook 3071 is arranged on the light incident side with respect to the mold 3060 and is used as a parting unit for limiting the range of the light which is incident on the liquid crystal panel 40. The hook 3071 is a metal plate, for example. The hook 3071 is provided with an opening hole which is overlapped with the opening region of the mold 3060. The opening hole of the hook 3071 is smaller than the opening hole of the mold 3060.

The hook 3071 is made of a material with higher heat conductivity than those of the second light-transmitting plate 57 and the liquid crystal panel 40 (the element substrate 51 and the facing substrate 52). More specifically, the hook 3071 is made of metal such as aluminum or copper. Therefore, the hook 3071 also functions as a heat releasing member for releasing the heat, which is generated at the liquid crystal panel 40, via the mold 3060. In addition, black color treatment is performed on the surface of the hook 3071 in order to suppress reflection of light.

Fixation between the mold 3060 and the hook 3071 may be established with an adhesive agent, for example, or may be established by fitting a convex portion of the mold 3060 into a concave portion of the hook 3071.

According to this modification example, the light-blocking hook 3071 is arranged so as to surround the image display region 40a, and therefore, it is possible to limit the range of the light which is incident on the image display region 40a. In other words, it is possible to block light which is unnecessarily incident on the region.

In addition, the invention is not limited to the arrangement of the hook 3071 on the side of the facing substrate 52, and the hook 3071 may also be arranged on the side of the element substrate 51.

Modification Example 11

Figure 23:
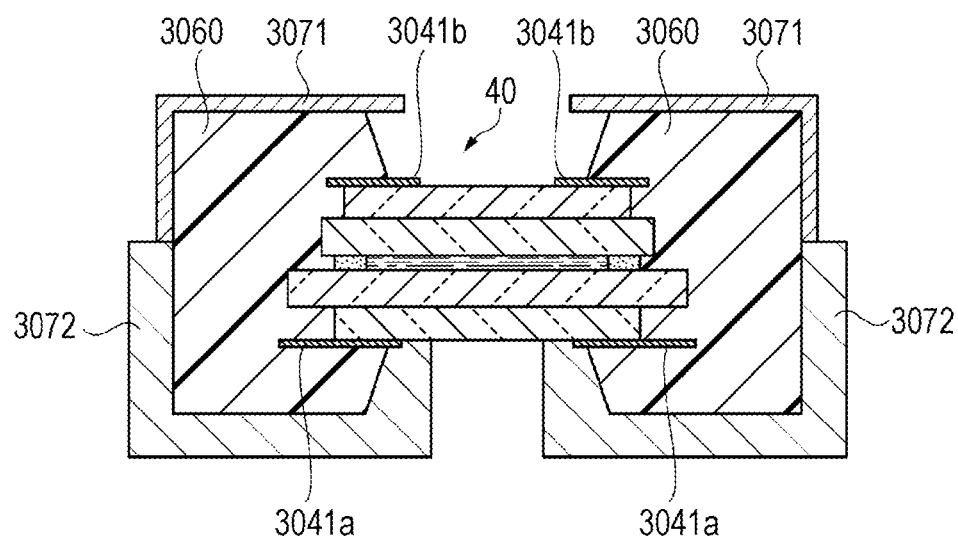
FIG. 23 is a cross-sectional view schematically showing a configuration of a liquid crystal device according to a modification example of the third embodiment.

The invention is not limited to the above configuration in which only the mold 3060 functioning as a frame is formed in the outer circumference of the liquid crystal panel 40 the configuration of arranging the hook 3071 as in Modification Example 10, and the configuration shown in FIG. 23 may be employed. FIG. 23 is a cross-sectional view schematically showing a configuration of a liquid crystal device according to Modification Example 11. The liquid crystal device shown in FIG. 23 is different from those in the above embodiments and modification examples in that the hook 3071 is arranged above the mold 3060 along with the first support seal 3041a and the second support seal 3041b and a case 3072 as a frame body is provided below the mold 3060.

The hook 3071 is configured in the same manner as that in Modification Example 10, for example. The case 3072 is a metal material such as aluminum or magnesium and is arranged so as to surround the mold 3060 and be in contact with the first support seal 3041a and the liquid crystal panel 40.

Fixation between the mold 3060 and the hook 3071 and fixation between the mold 3060 and the case 3072 may be established with an adhesive agent or may be established by fitting these components to each other as described above.

According to this modification example, the case 3072 is arranged so as to be in contact with the first support seal 3041a and the liquid crystal panel 40, and therefore, it is possible to prevent contact scratch from being generated in the lower mold die 2061 of the liquid crystal panel 40 (first light-transmitting plate 56) and to efficiently release the heat accumulated in the liquid crystal panel 40. In addition, since the heat in the liquid crystal layer 450 is released, it is possible to suppress a decrease in lifetime of the liquid crystal layer 450 (lifetime of the liquid crystal panel 40).

Modification Example 12

The invention is not limited to the above configuration in which the mold 3060 is formed in the outer circumference of the liquid crystal panel 40 by supplying (dripping) the mold resin 3060b to the lower mold die 3061, and the mold 3060 may be formed by a transfer mold scheme, for example. At this time, it is preferable to employ mold resin 3060b capable of forming the mold 3060 at a temperature which does not affect the liquid crystal panel 40.

Modification Example 13

As for electronic apparatuses on which the liquid crystal device 3000 is mounted as described above, it is possible to use the liquid crystal device for various electronic apparatuses such as an electrical view finder (EVF), a mobile mini projector, a head-up display, a smart phone, a mobile phone, a mobile computer, a digital camera, a digital video camera, a display, a vehicle-mounted device, an audio device, an exposure device, and an illumination device as well as the projection-type display apparatus 1.

Modification Example 14

The invention is not limited to the application of the liquid crystal device 3000 as the electro-optic device as described above, and the electro-optic device may be applied to an organic EL device, a plasma display, or an electronic paper (EPD), for example. In a case of a liquid crystal device, for example, an electro-optic material is liquid crystal. In a case of an electronic paper, the electro-optic material is an electrophoretic material.

Fourth Embodiment

Hereinafter, a fourth embodiment in which an example of the invention is implemented will be described with reference to drawings. In addition, the drawings to be used are appropriately shown in an enlarged manner or in a contracted manner such that parts to be described can be recognized. Furthermore, since the fourth embodiment is configured in the same manner as in the first embodiment other than that the configuration of the liquid crystal device 1000 and the method of manufacturing the liquid crystal device as the electro-optic device according to the aforementioned first embodiment are different, the same reference numerals will be given to the same constituent elements as those in the first embodiment, and the descriptions thereof will be omitted.

Figure 24:
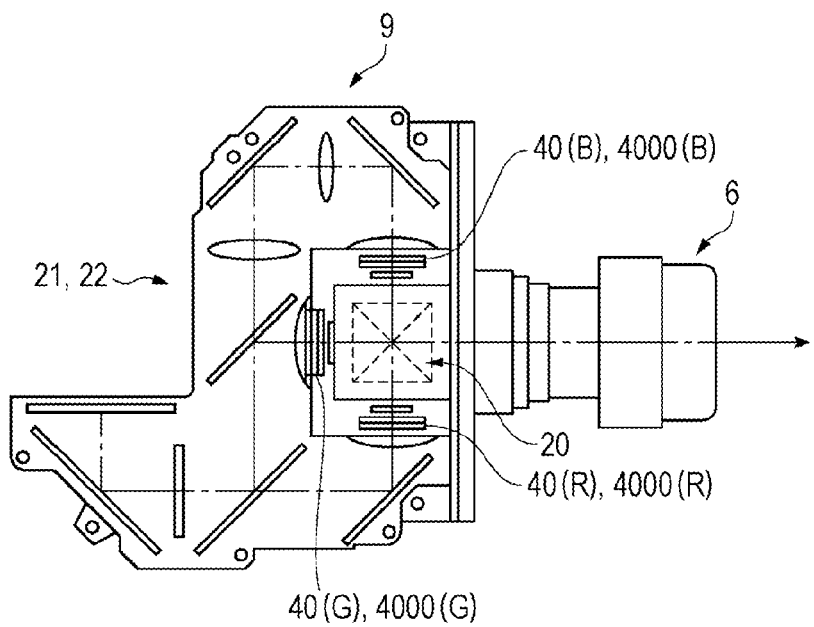
FIG. 24 is a diagram schematically showing a configuration of an optical unit used in a projection-type display apparatus according to a fourth embodiment.
Figure 25:
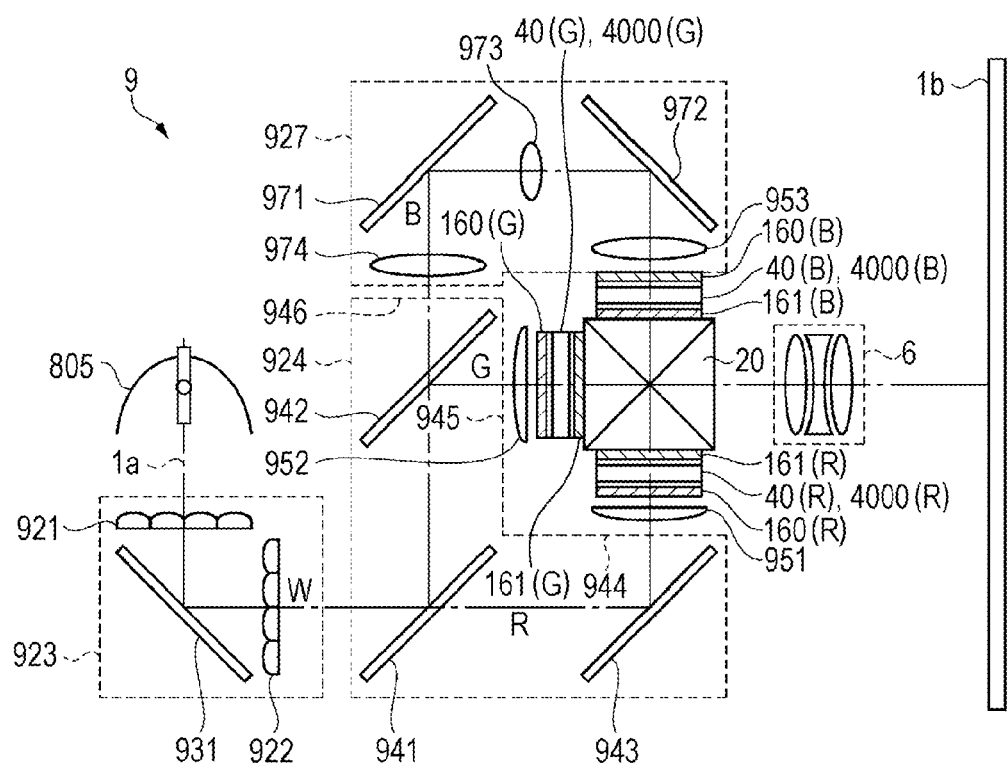
FIG. 25 is a diagram schematically showing a detailed configuration of the optical unit used in the projection-type display apparatus according to the fourth embodiment.

In this embodiment, a configuration of the electronic apparatus, a detailed configuration of the optical unit, and a configuration of the electro-optic panel are the same as those according to the aforementioned first embodiment. However, when the liquid crystal panels 40(R), 40(G), and 40(B) are mounted on the optical unit 9 shown in FIGS. 24 and 25, the liquid crystal panels 40(R), 40(G), and 40(B) are mounted in a state of being provided in liquid crystal devices 4000(R), 4000(G), and 4000(B), which will be described later, respectively.

The liquid crystal panels 40(R), 40(G), and 40(B) have the same configuration, and the liquid crystal devices 4000(R), 4000(G), and 4000(B) for the red color (R), the green color (G), and the blue color (B) provided with the liquid crystal panels 40(R), 40(G), and 40(B) also have the same configuration. Therefore, the following description will be given without adding (R), (G), and (B) which represent corresponding colors.

Configuration of Electro-Optic Device

Figure 26:
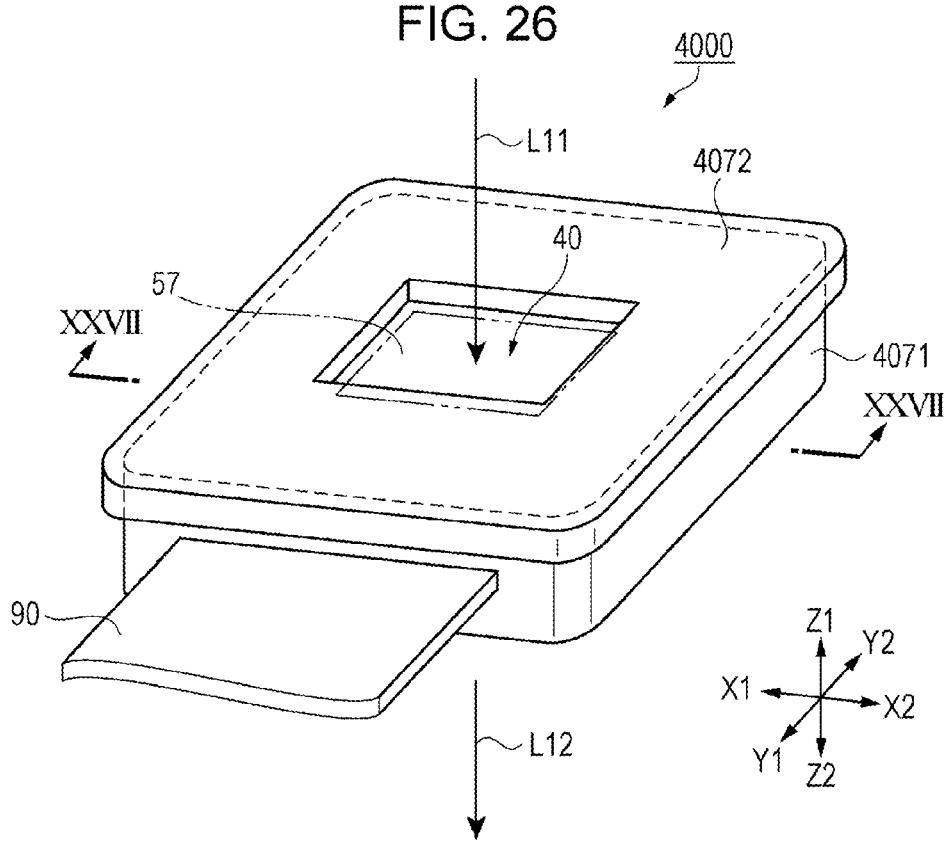
FIG. 26 is a perspective view schematically showing a configuration of a liquid crystal device as an electro-optic device according to the fourth embodiment.
Figure 27:
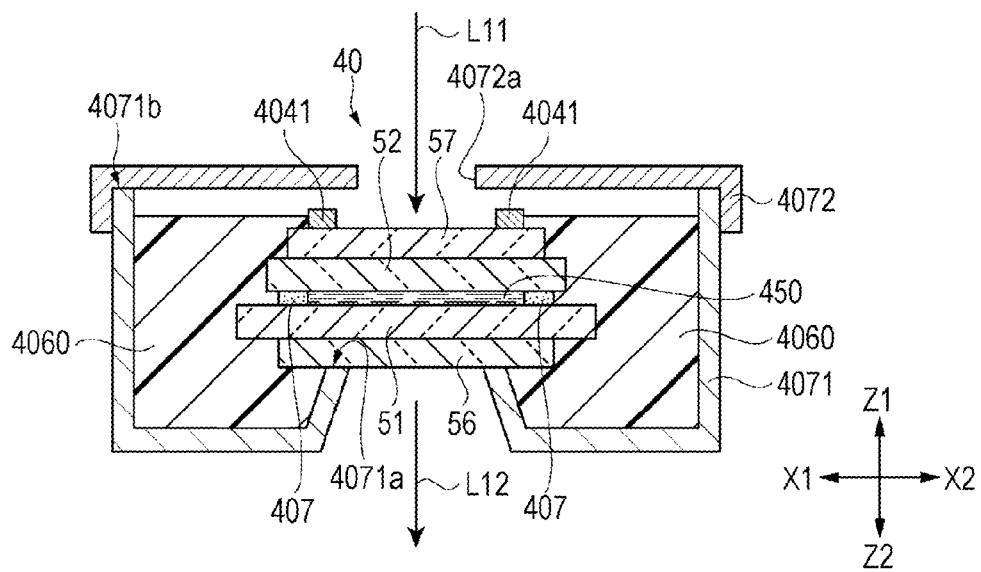
FIG. 27 is a schematic cross-sectional view taken along line XXVII-XXVII in the liquid crystal device shown in FIG. 26.

FIG. 26 is a perspective view schematically showing a configuration of a liquid crystal device as the electro-optic device. FIG. 27 is a schematic cross-sectional view taken along line XXVII-XXVII in the liquid crystal device shown in FIG. 26. Hereinafter, the configuration of the liquid crystal device will be described with reference to FIGS. 26 and 27. In FIG. 27, depiction and description of the flexible wiring substrate 90 are omitted.

When the liquid crystal panel 40 described above with reference to FIGS. 4A and 4B is mounted on the projection-type display apparatus 1 described above with reference to FIGS. 1A, 1B, 24, and 25 and the optical unit 9, the flexible wiring substrate 90 is connected to the liquid crystal panel 40, and the liquid crystal device 4000 in which a mold 4060, a frame 4071, and a hook 4072 are arranged so as to cover the outer circumference of the liquid crystal panel 40 for the purpose of moisture resistance and reinforcement is then obtained as shown in FIGS. 26 and 27.

As shown in FIGS. 4A, 4B, and 27, the first light-transmitting plate 56 is attached to the second surface 51b of the element substrate 51 (outer surface; the surface on the opposite side to the liquid crystal layer 450) with an adhesive agent or the like, and the second light-transmitting plate 57 is attached to the second surface 52b of the facing substrate 52 (outer surface; the surface on the opposite side to the liquid crystal layer 450) with an adhesive agent or the like in the liquid crystal panel 40.

Since the first light-transmitting plate 56 and the second light-transmitting plate 57 have the same configurations as those in the aforementioned first embodiment, the descriptions thereof will be omitted.

The frame 4071 is formed into substantially a concave shape so as to surround the liquid crystal panel 40 and includes an opening hole at the center of the bottom surface thereof. Specifically, a whole circumference of one end 4071a which forms the opening hole of the frame 4071 is bent so as to be directed upward with respect to the bottom surface. That is, the whole circumference of the one end 4071a is arranged so as to be in contact with the surface of the first light-transmitting plate 56 on the opposite side to the liquid crystal layer 450 in the liquid crystal panel 40. In addition, the frame 4071 is caulked or bonded such that mold resin which will be described later does not leak from a gap caused between the one end 4071a and the first light-transmitting plate 56.

The other end 4071b of the frame 4071 is arranged so as to extend to an upper position than the upper surface of the second light-transmitting plate 57 of the liquid crystal panel 40 and surround the liquid crystal panel 40 as a whole. Specifically, a support seal 4041 is arranged on the upper surface of the second light-transmitting plate 57 so as to surround the image display region 40a. The other end 4071b of the frame 4071 is arranged so as to extend to an upper position than the upper surface of the support seal 4041.

The frame 4071 is configured of a metal material such as aluminum or magnesium. The frame 4071 is used for forming the mold 4060 and can efficiently release the heat accumulated in the liquid crystal panel 40 by being arranged so as to be in contact with the liquid crystal panel 40. In addition, since the frame 4071 releases the heat in the liquid crystal layer 450, it is possible to suppress a decrease in lifetime of the liquid crystal layer 450 (lifetime of the liquid crystal panel 40).

The mold 4060 is arranged between the liquid crystal panel 40 and the frame 4071. The mold 4060 is formed of silicon-based resin, for example. The mold 4060 is arranged so as to cover a region from the surface of the first light-transmitting plate 56 on the opposite side to the liquid crystal layer 450 to the surface of the second light-transmitting plate 57 on the opposite side to the liquid crystal layer 450.

Specifically, the support seal 4041 is arranged on the surface of the second light-transmitting plate 57 so as to surround the image display region 40a as described above. The height position of the upper surface of the mold 4060 is arranged so as to be located between the upper surface and the lower surface of the support seal 4041.

The hook 4072 is provided above the frame 4071 so as to cover the entire region surrounded by the frame 4071 and is fixed thereto with an adhesive agent. In addition, an opening hole 4072a which opens in a region overlapped with the image display region 40a is formed in the hook 4072. The hook 4072 is arranged on the light incident side and is used as a parting unit for limiting the range of the light which is incident on the liquid crystal panel 40.

The hook 4072 is a metal plate, for example. The hook 4072 is configured of a material with higher heat conductivity than those of the first light-transmitting plate 56, the second light-transmitting plate 57, and the liquid crystal panel 40 (the element substrate 51 and the facing substrate 52). More specifically, the hook 4072 is made of metal such as aluminum or copper. In addition, black color treatment is performed on the surface of the hook 4072 in order to suppress reflection of light.

Since the light-blocking hook 4072 is arranged so as to surround the image display region 40a as described above, it is possible to limit the range of the light which is incident on the image display region 40a. In other words, it is possible to block light which is unnecessarily incident on the region.

In addition, since the mold 4060 is arranged so as to cover the region from the surface of the first light-transmitting plate 56 on the opposite side to the liquid crystal layer 450 to the surface of the second light-transmitting plate 57 on the opposite side to the liquid crystal layer 450, it is possible to extend the length of the interface between the mold 4060 and the substrates (the element substrate 51, the facing substrate 52, the first light-transmitting plate 56, and the second light-transmitting plate 57). Therefore, it is possible to suppress entry of moisture into the liquid crystal layer 450 via the interface and the sealing material 407.

Method of Manufacturing Electro-Optic Device

FIGS. 28A, 28B, 29A, and 29B are cross-sectional views schematically showing a method of manufacturing a liquid crystal device as the electro-optic device. Particularly, FIGS. 28A, 28B, 29A, and 29B are cross-sectional views schematically showing a method of manufacturing a frame, a mold, and a hook which configure the liquid crystal device. Hereinafter, the method of manufacturing a liquid crystal device will be described with reference to FIGS. 28A, 28B, 29A, and 29B.

Figure 28A:
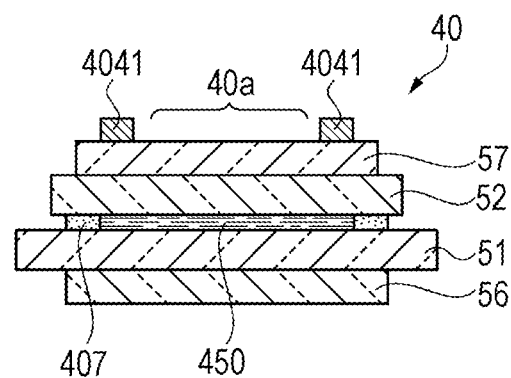
FIGS. 28A and 28B are cross-sectional views schematically showing a method of manufacturing the liquid crystal device according to the fourth embodiment.

In the process shown in FIG. 28A, the support seal 4041 is attached to the liquid crystal panel 40. Specifically, the support seal 4041 is attached so as to surround the image display region 40a on the upper surface (the surface on the opposite side to the liquid crystal layer 450) of the second light-transmitting plate 57.

Figure 28B:
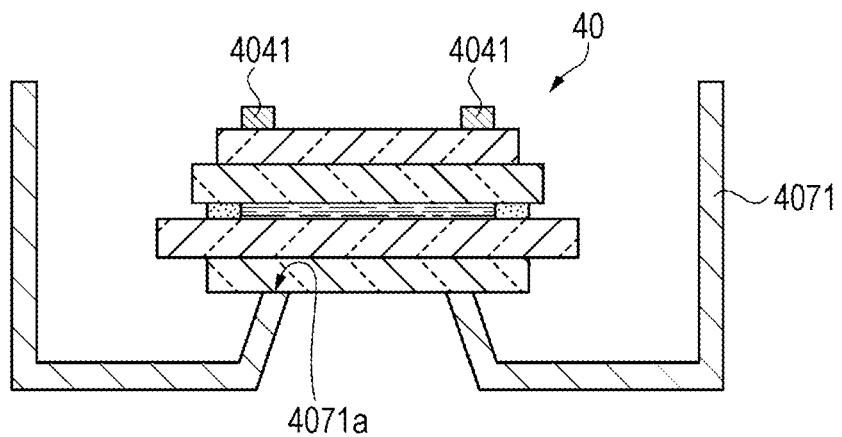

In the process shown in FIG. 28B, the liquid crystal panel 40 is arranged in the frame 4071. Specifically, the liquid crystal panel 40 is arranged on the one end 4071a, which forms the opening hole at substantially the center of the frame 4071, of the frame 4071. At this time, the liquid crystal panel 40 is arranged such that the opening hole of the frame 4071 surrounds the image display region 40a of the liquid crystal panel 40 in a plan view.

Figure 29A:
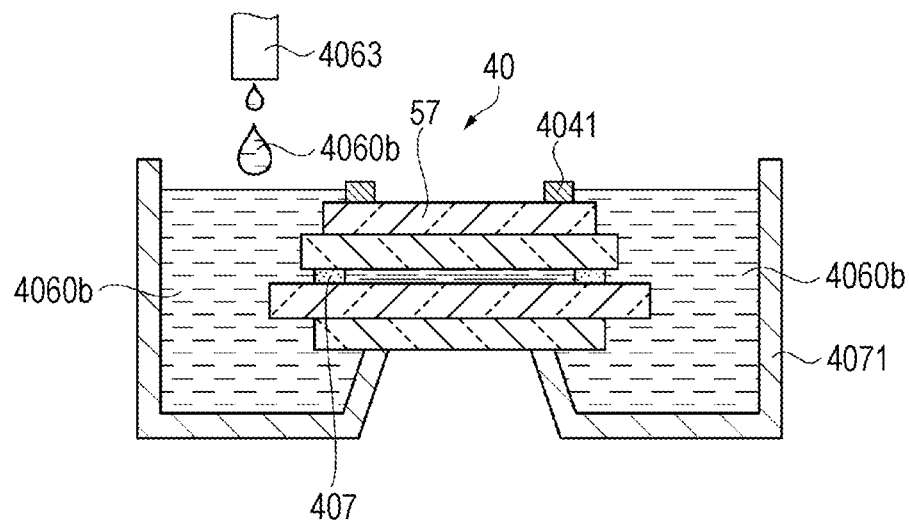
FIGS. 29A and 29B are cross-sectional views schematically showing the method of manufacturing the liquid crystal device according to the fourth embodiment.

In the process shown in FIG. 29A, a softened mold resin 4060b is supplied to the space surrounded by the frame 4071. First, a nozzle 4063 for supplying the mold resin 4060b is arranged between the frame 4071 and the liquid crystal panel 40. Then, the mold resin 4060b is supplied from the nozzle 4063 to the inside of the frame 4071.

The mold resin 4060b is silicon-based resin, for example, as described above. Specifically, it is preferable to use silicon-based resin which adheres to quartz and is hardened at room temperature. The amount of mold resin 4060b is adjusted such that at least the outside of the support seal 4041 on the upper surface of the second light-transmitting plate 57 arranged on the facing substrate 52 is buried in the mold resin 4060b. In other words, it is preferable to supply the mold resin 4060b such that the upper surface of the mold 4060 is located between the upper surface and the lower surface of the support seal 4041.

According to this embodiment, the support seal 4041 is arranged on the upper surface of the second light-transmitting plate 57, and therefore, it is possible to cover a part of the upper surface of the second light-transmitting plate 57 with the mold resin 4060b and to prevent the mold resin 4060b from flowing to the side of the image display region 40a.

By forming the mold 4060 up to a level in which the upper surface of the second light-transmitting plate 57 is buried in the mold 4060, it is possible to extend the length of the interface between the second light-transmitting plate 57 and the mold 4060. In other words, it is possible to extend the distance from a portion of the second light transmitting plate 57, which is in contact with ambient air, to the sealing material 407 and to thereby suppress entry of moisture into the liquid crystal layer 450 via the sealing material 407.

Figure 29B:
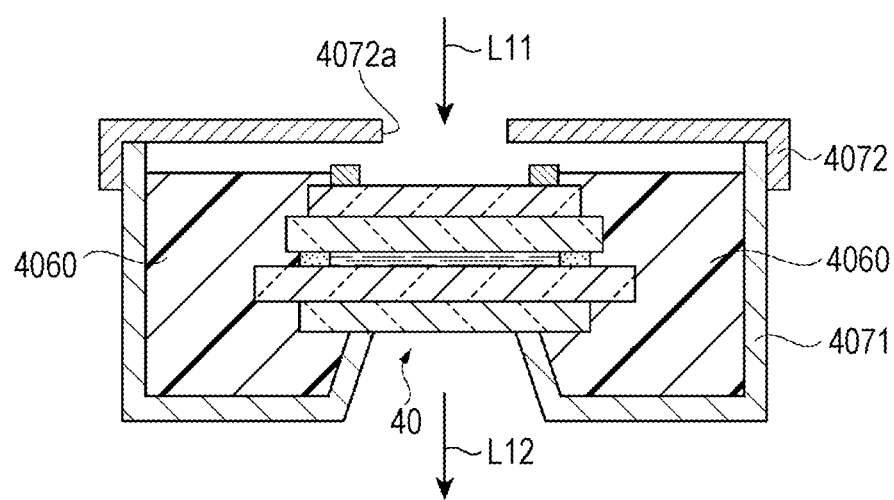

In the process shown in FIG. 29B, the hook 4072 is placed over the frame 4071 and fixed thereto. The opening hole 4072a is formed at the center of the hook 4072 as described above. Therefore, it is possible to limit the range of the light which is incident on the image display region 40a.

As described above in detail, it is possible to achieve the following advantages by the liquid crystal device 4000, the method of manufacturing the liquid crystal device 4000, and the electronic apparatus according to this embodiment.

(1) According to the liquid crystal device 4000 in the fourth embodiment, the mold 4060 covers the region in the circumference of the liquid crystal panel 40 from the surface of the first light-transmitting plate 56 on the opposite side to the liquid crystal layer 450 to the surface of the second light-transmitting plate 57 on the opposite side to the liquid crystal layer 450, which are surrounded by the frame 4071, and therefore, it is possible to extend the length of the interface between the substrates (the element substrate 51, the facing substrate 52, the first light-transmitting plate 56, and the second light-transmitting plate 57) and the mold 4060. For this reason, it is possible to suppress entry of moisture into the liquid crystal layer 450 via the interface and the sealing material 407. In addition, since the mold 4060 is formed to have a large thickness, it is possible to improve moisture resistance. As a result, it is possible to suppress deterioration in the liquid crystal layer 450 and to suppress degradation in display quality due to a degraded controllability (responsiveness) of the liquid crystal.

(2) According to the method of manufacturing the liquid crystal device 4000 in the fourth embodiment, the mold resin 4060b is supplied between the frame 4071 and the liquid crystal panel 40, and therefore, it is possible to cover the circumference of the liquid crystal panel 40 with the mold 4060. For this reason, it is possible to extend the length of the interface between the substrates (the element substrate 51, the facing substrate 52, the first light-transmitting plate 56, and the second light-transmitting plate 57) and the mold 4060 and to thereby suppress entry of moisture into the liquid crystal layer 450 via the interface and the sealing material 407.

(3) According to the method of manufacturing the liquid crystal device 4000 in the fourth embodiment, the mold resin 4060b is supplied such that the height position of the upper surface of the mold 4060 is located between the upper surface and the lower surface of the support seal 4041, and therefore, it is possible to cover at least the region in the circumference of the liquid crystal panel 40 from a part of the surface of the first light-transmitting plate 56 on the opposite side to the liquid crystal layer 450 to the support seal 4041 on the surface of the second light-transmitting plate 57 on the opposite side to the liquid crystal layer 450 with the mold 4060.

(4) According to the electronic apparatus in the fourth embodiment, the above liquid crystal device 4000 is provided therein, and therefore, it is possible to provide an electronic apparatus capable of improving display quality and suppressing deterioration in the liquid crystal layer 450.

Modification Example 15

The liquid crystal device 4000 is not limited to the above configuration in which the hook 4072 is arranged, and may be configured of the liquid crystal panel 40, the mold 4060, and the frame 4071 without arranging the hook 4072. In addition, the liquid crystal device 4000 may have a configuration in which the first light-transmitting plate 56 and the second light-transmitting plate 57 are not included.

Modification Example 16

The invention is not limited to the above configuration in which the support seal 4041 is arranged on the second light-transmitting plate 57, any configuration is applicable as long as the mold resin 4060b does not flow into the image display region 40a, and a passivation film may be formed into a convex shape, for example.

Modification Example 17

As for electronic apparatuses on which the liquid crystal device 4000 is mounted as described above, it is possible to use the liquid crystal device for various electronic apparatuses such as an electrical view finder (EVF), a mobile mini projector, a head-up display, a smart phone, a mobile phone, a mobile computer, a digital camera, a digital video camera, a display, a vehicle-mounted device, an audio device, an exposure device, and an illumination device as well as the projection-type display apparatus 1.

Modification Example 18

The invention is not limited to the application of the liquid crystal device 4000 as the electro-optic device as described above, and the electro-optic device may be applied to an organic EL device, a plasma display, or an electronic paper (EPD), for example. In a case of a liquid crystal device, for example, an electro-optic material is liquid crystal. In a case of an electronic paper, the electro-optic material is an electrophoretic material.

Fifth Embodiment

Hereinafter, a fifth embodiment in which an example of the invention is implemented will be described with reference to drawings. In addition, the drawings to be used are appropriately shown in an enlarged manner or in a contracted manner such that parts to be described can be recognized. Furthermore, since the fifth embodiment is configured in the same manner as in the first embodiment other than that the configuration of the liquid crystal device 1000 and the method of manufacturing the liquid crystal device as the electro-optic device according to the aforementioned first embodiment are different, the same reference numerals will be given to the same constituent elements as those in the first embodiment, and the descriptions thereof will be omitted.

Figure 30:
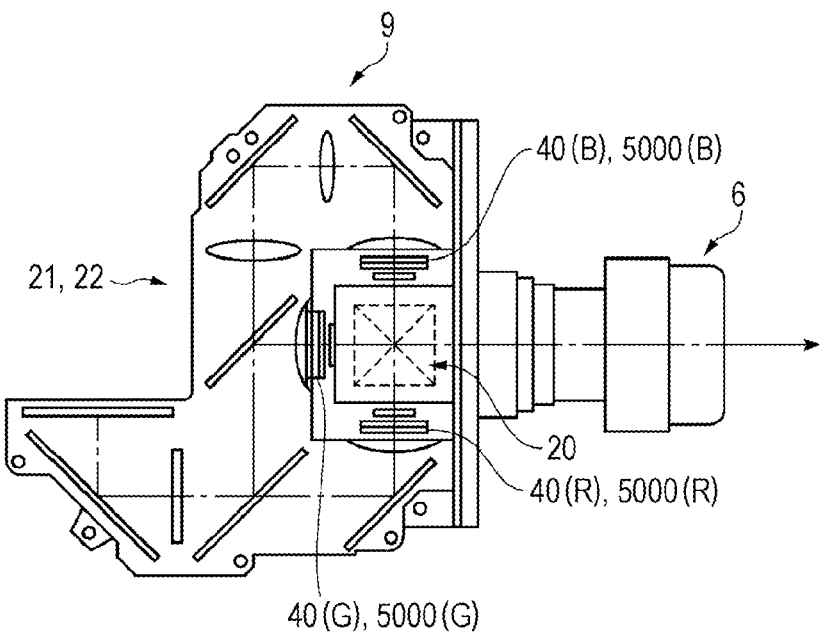
FIG. 30 is a diagram schematically showing a configuration of an optical unit used in a projection-type display apparatus according to a fifth embodiment.
Figure 31:
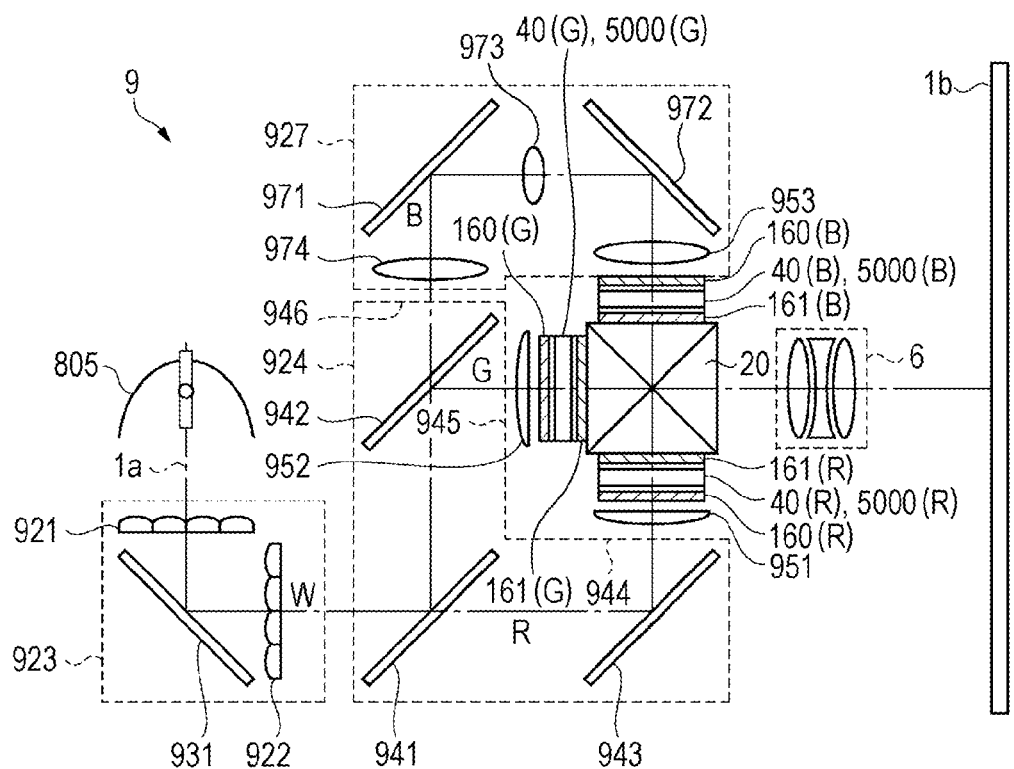
FIG. 31 is a diagram schematically showing a detailed configuration of the optical unit used in the projection-type display apparatus according to the fifth embodiment.

In this embodiment, a configuration of the electronic apparatus, a detailed configuration of the optical unit, and a configuration of the electro-optic panel are the same as those according to the aforementioned first embodiment. However, when the liquid crystal panels 40(R), 40(G), and 40(B) are mounted on the optical unit 9 shown in FIGS. 30 and 31, the liquid crystal panels 40(R), 40(G), and 40(B) are mounted in a state of being provided in liquid crystal devices 5000(R), 5000(G), and 5000(B), which will be described later, respectively.

The liquid crystal panels 40(R), 40(G), and 40(B) have the same configuration, and the liquid crystal devices 5000(R), 5000(G), and 5000(B) for the red color (R), the green color (G), and the blue color (B) provided with the liquid panels 40(R), 40(G), and 40(B) also have the same configuration. Therefore, the following description will be given without adding (R), (G), and (B) which represent corresponding colors.

Configuration of Electro-Optic Device

Figure 32:
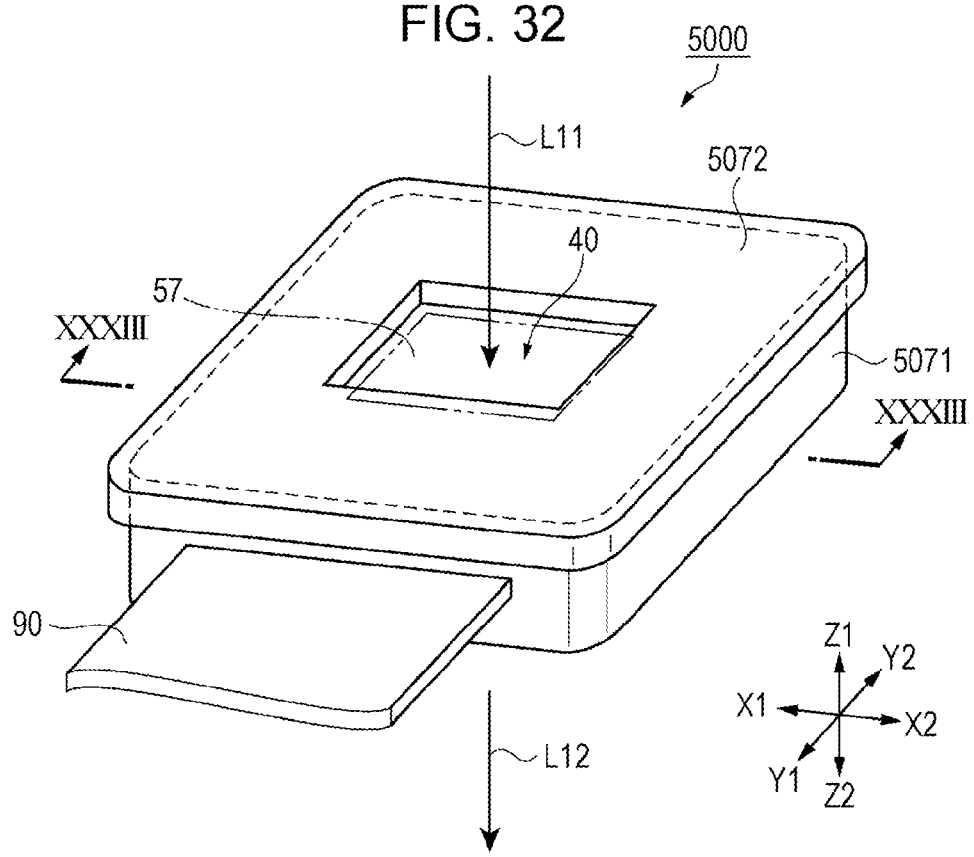
FIG. 32 is a perspective view schematically showing a configuration of a liquid crystal device as an electro-optic device according to the fifth embodiment.
Figure 33:
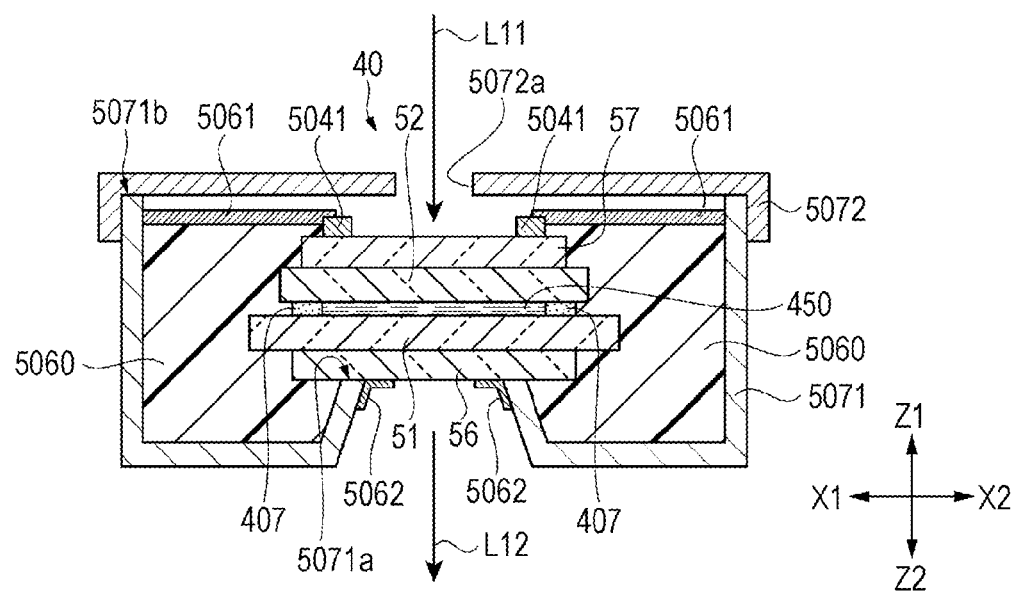
FIG. 33 is a schematic cross-sectional view taken along line XXXIII-XXXIII in the liquid crystal device shown in FIG. 32.

FIG. 32 is a perspective view schematically showing a configuration of a liquid crystal device as the electro-optic device. FIG. 33 is a schematic cross-sectional view taken along line XXXIII-XXXIII in the liquid crystal device shown in FIG. 32. Hereinafter, the configuration of the liquid crystal device will be described with reference to FIGS. 32 and 33. In FIG. 33, depiction and description of the flexible wiring substrate 90 are omitted.

When the liquid crystal panel 40 described above with reference to FIGS. 4A and 4B is mounted on the projection-type display apparatus 1 described above with reference to FIGS. 1A, 1B, 30, and 31 and the optical unit 9, the flexible wiring substrate 90 is connected to the liquid crystal panel 40, and the liquid crystal device 5000 in which a mold 5060, a frame 5071, and a hook 5072 are arranged so as to cover the outer circumference of the liquid crystal panel 40 for the purpose of moisture resistance and reinforcement is then obtained as shown in FIGS. 32 and 33.

As shown in FIGS. 4A, 4B, and 33, the first light-transmitting plate 56 is attached to the second surface 51b of the element substrate 51 (outer surface; the surface on the opposite side to the liquid crystal layer 450) with an adhesive agent or the like, and the second light-transmitting plate 57 is attached to the second surface 52b of the facing substrate 52 (outer surface; the surface on the opposite side to the liquid crystal layer 450) with an adhesive agent or the like in the liquid crystal panel 40.

Since the first light-transmitting plate 56 and the second light-transmitting plate 57 have the same configurations as those in the aforementioned first embodiment, the descriptions thereof will be omitted.

The frame 5071 is formed into substantially a concave shape so as to surround the liquid crystal panel 40 and includes an opening hole at the center of the bottom surface thereof. Specifically, a whole circumference of one end 5071a which forms the opening hole of the frame 5071 is bent so as to be directed upward with respect to the bottom surface. That is, the whole circumference of the one end 5071a is arranged so as to be in contact with the surface of the first light-transmitting plate 56 on the opposite side to the liquid crystal layer 450 in the liquid crystal panel 40. In addition, the frame 5071 is caulked or the first light-transmitting plate 56 is bonded to the frame 5071 such that mold resin which will be described later does not leak from a gap caused at the contact portion between the one end 5071a and the first light-transmitting plate 56.

The other end 5071b of the frame 5071 is arranged so as to extend to an upper position than the upper surface of the second light-transmitting plate 57 of the liquid crystal panel 40 and surround the liquid crystal panel 40 as a whole. Specifically, a support seal 5041 is arranged on the upper surface of the second light-transmitting plate 57 so as to surround the image display region 40a. The other end 5071b of the frame 5071 is arranged so as to extend to an upper position than the upper surface of the support seal 5041.

The frame 5071 is configured of a metal material such as aluminum or magnesium. The frame 5071 is used for forming the mold 5060 and can efficiently release the heat accumulated in the liquid crystal panel 40 by being arranged so as to be in contact with the liquid crystal panel 40. In addition, since the frame 5071 releases the heat in the liquid crystal layer 450, it is possible to suppress a decrease in lifetime of the liquid crystal layer 450 (lifetime of the liquid crystal panel 40).

The mold 5060 is arranged between the liquid crystal panel 40 and the frame 5071. The mold 5060 is formed of silicon-based resin, for example. The mold 5060 is arranged so as to cover the region from the surface of the first light-transmitting plate 56 on the opposite side to the liquid crystal layer 450 to the surface of the second light-transmitting plate 57 on the opposite side to the liquid crystal layer 450.

Specifically, the support seal 5041 is arranged on the surface of the second light-transmitting plate 57 so as to surround the image display region 40a as described above. The height position of the upper surface of the mold 5060 is arranged so as to be located between the upper surface and the lower surface of the support seal 5041.

A first resin 5061 is arranged in the mold 5060 in a region where the frame 5071 is opened so as to cover the mold 5060. In other words, the first resin 5061 is arranged so as to cover a portion where the mold 5060 is exposed. In addition, a second resin 5062 is arranged at a contact portion between the frame 5071 and the first light-transmitting plate 56.

The first resin 5061 and the second resin 5062 are fluorine coating agents, for example. As the fluorine coating agent, water-shedding resin or resin with low water permeability with respect to moisture is employed. By arranging (applying) the fluorine coating agent, a state where a water entry path is capped is obtained, and entry of moisture from the mold 5060 can be suppressed. As a result, it is possible to maintain responsiveness of the liquid crystal and thereby to improve reliability.

The hook 5072 is placed over the frame 5071 and is fixed thereto with an adhesive agent so as to cover the entire region surrounded by the frame 5071. In addition, an opening hole 5072a which opens in a region overlapped with the image display region 40a is formed in the hook 5072. The hook 5072 is arranged on the light incident side and is used as a parting unit for limiting the range of the light which is incident on the liquid crystal panel 40.

The hook 5072 is a metal plate, for example. The hook 5072 is made of a material with higher heat conductivity than those of the first light-transmitting plate 56, the second light-transmitting plate 57, and the liquid crystal panel 40 (the element substrate 51 and the facing substrate 52). More specifically, the hook 5072 is made of metal such as aluminum or copper. In addition, black color treatment is performed on the surface of the hook 5072 in order to suppress reflection of light.

Since the light-blocking hook 5072 is arranged so as to surround the image display region 40a as described above, it is possible to limit the range of the light which is incident on the image display region 40a. In other words, it is possible to block light which is unnecessarily incident on the region.

In addition, since the mold 5060 is arranged so as to cover the region from the surface of the first light-transmitting plate 56 on the opposite side to the liquid crystal layer 450 to the surface of the second light-transmitting plate 57 on the opposite side to the liquid crystal layer 450, it is possible to extend the length of the interface between the mold 5060 and the substrates (the element substrate 51, the facing substrate 52, the first light-transmitting plate 56, and the second light-transmitting plate 57). Therefore, it is possible to suppress entry of moisture into the liquid crystal layer 450 via the interface and the sealing material 407.

Method of Manufacturing Electro-Optic Device

FIGS. 34A, 34B, and 35A to 35C are cross-sectional views schematically showing a method of manufacturing a liquid crystal device as the electro-optic device. Particularly, FIGS. 34A, 34B, and 35A to 35C are cross-sectional views schematically showing a method of manufacturing a frame, a mold, and a hook which configure the liquid crystal device.

Hereinafter, the method of manufacturing a liquid crystal device will be described with reference to FIGS. 34A, 34B, and 35A to 35C.

Figure 34A:
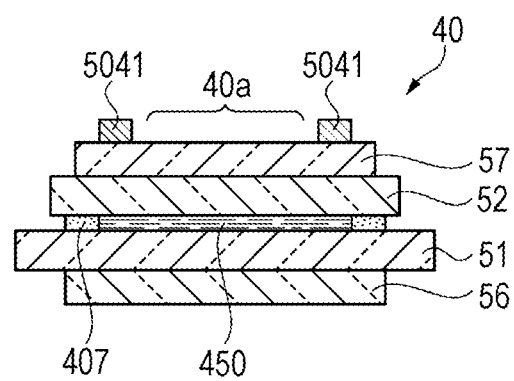
FIGS. 34A and 34B are cross-sectional views schematically showing a method of manufacturing the liquid crystal device according to the fifth embodiment.

In the process shown in FIG. 34A, the support seal 5041 is attached to the liquid crystal panel 40. Specifically, the support seal 5041 is attached to the upper surface of the second light-transmitting plate 57 (the surface on the opposite side to the liquid crystal layer 450) so as to surround the image display region 40*a*.

Figure 34B:
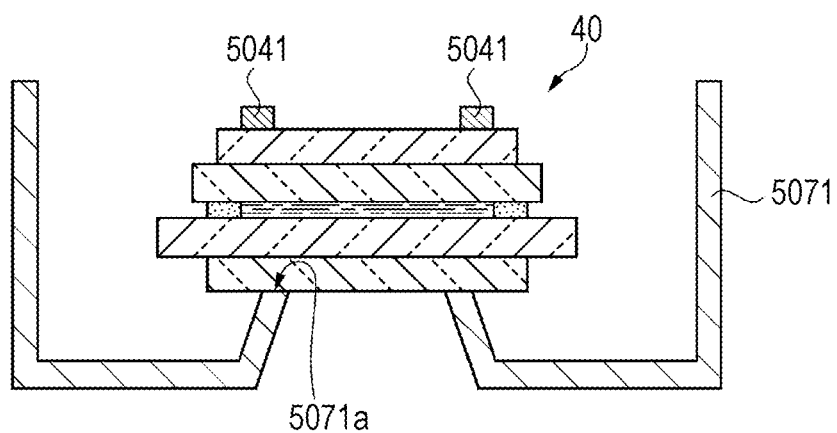

In the process shown in FIG. 34B, the liquid crystal panel 40 is arranged in the frame 5071. Specifically, the liquid crystal panel 40 is arranged on one end 5071*a*, which forms the opening hole at substantially the center of the frame 5071, of the frame 5071. At this time, the liquid crystal panel 40 is arranged such that the opening hole of the frame 5071 surrounds the image display region 40*a* of the liquid crystal panel 40 in a plan view.

Figure 35A:
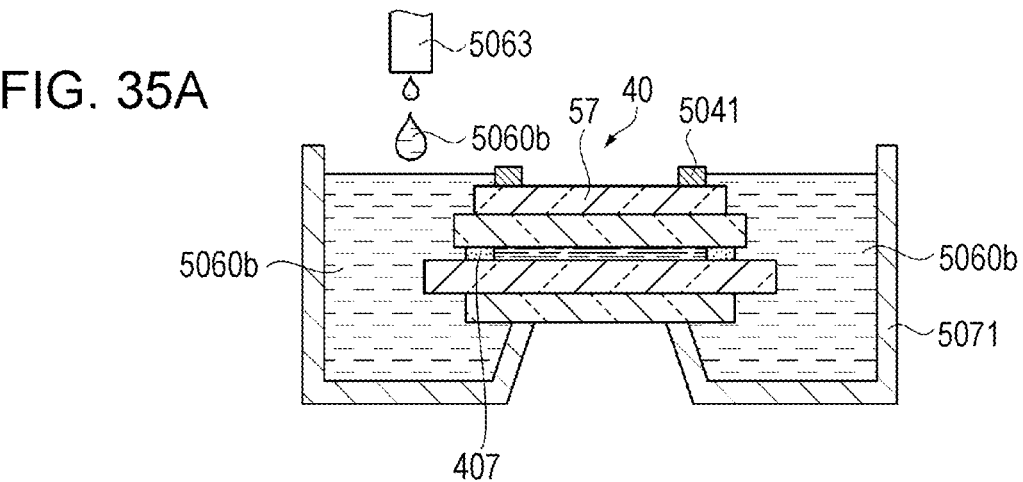
FIGS. 35A to 35C are cross-sectional views schematically showing the method of manufacturing the liquid crystal device according to the fifth embodiment.

In the process shown in FIG. 35A, a softened mold resin 5060*b* is supplied to a space surrounded by the frame 5071. First, a nozzle 5063 for supplying the mold resin 5060*b* is arranged between the frame 5071 and the liquid crystal panel 40. Then, the mold resin 5060*b* is supplied from the nozzle 5063 to the inside of the frame 5071.

The mold resin 5060*b* is silicon-based resin, for example, as described above. Specifically, it is preferable to use silicon-based resin which adheres to quartz and is hardened at room temperature. The amount of mold resin 5060*b* is adjusted such that at least the outside of the support seal 5041 on the upper surface of the second light-transmitting plate 57 arranged on the facing substrate 52 is buried in the mold resin 5060*b*. In other words, it is preferable to supply the mold resin 5006*b* such that the upper surface of the mold 5060 is located between the upper surface and the lower surface of the support seal 5041.

According to this embodiment, the support seal 5041 is arranged on the upper surface of the second light-transmitting plate 57, and therefore, it is possible to cover a part of the upper surface of the second light-transmitting plate 57 with the mold resin 5060*b* and to prevent the mold resin 5060*b* from flowing to the side of the image display region 40*a*.

By forming the mold 5060 up to a level in which the upper surface of the second light-transmitting plate 57 is buried in the mold 5060, it is possible to extend the length of the interface between the second light-transmitting plate 57 and the mold 5060. In other words, it is possible to extend the length of the distance from a portion of the second light-transmitting plate 57, which is in contact with ambient air, to the sealing material 407 and to thereby suppress entry of moisture into the liquid crystal layer 450 via the sealing material 407.

Figure 35B:
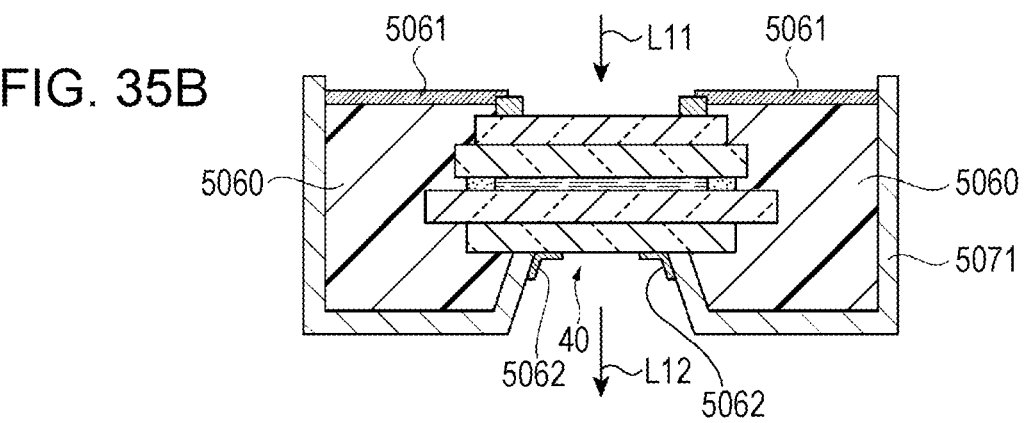

In the process shown in FIG. 35B, the first resin 5061 is attached (applied) so as to cover the surface of the mold 5060 between the support seal 5041 and the frame 5071. Furthermore, the second resin 5062 is attached (applied) so as to cover a portion at which the first light-transmitting plate 56 is brought into contact with the frame 5071.

Figure 35C:
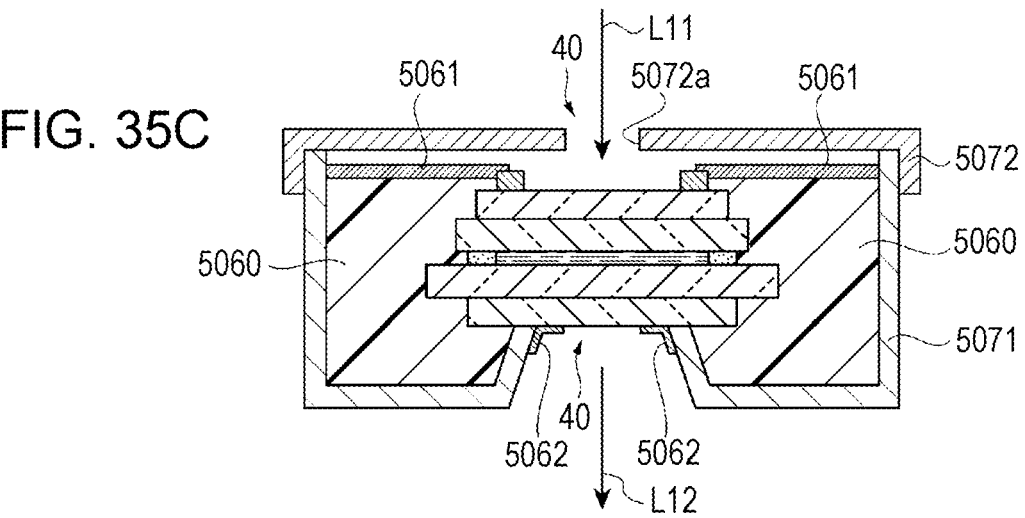

In the process shown in FIG. 35C, the hook 5072 is placed over and fixed to the frame 5071. The opening hole 5072*a* is formed at the center of the hook 5072 as described above. Therefore, it is possible to limit the range of the light which is incident on the image display region 40*a*.

As described above in detail, it is possible to achieve the following advantages by the liquid crystal device 5000, the method of manufacturing the liquid crystal device 5000, and the electronic apparatus according to this embodiment.

(1) According to the liquid crystal device 5000 in the fifth embodiment, the mold 5060 covers the region in the circumference of the liquid crystal panel 40 from the surface of the first light-transmitting plate 56 on the opposite side to the liquid crystal layer 450 to the surface of the second light-transmitting plate 57 on the opposite side to the liquid crystal layer 450, which are surrounded by the frame 5071, and therefore, it is possible to extend the length of the interface between the liquid crystal panel 40 and the mold 5060. For this reason, it is possible to suppress entry of moisture into the liquid crystal layer 450 via the interface and the sealing material 407.

In addition, since the first resin 5061 is arranged on the surface of the mold 5060 in the region where the frame 5071 is opened, in other words, on the surface of the exposed mold 5060, it is possible to suppress entry of moisture into the mold 5060.

In addition, since the second resin 5062 is arranged at the portion where the first light-transmitting plate 56 is brought into contact with the frame 5071, it is possible to suppress entry of moisture into the mold 5060. As a result, it is possible to suppress entry of moisture into the liquid crystal layer 450 via the mold 5060 and the sealing material 407.

(2) According to the method of manufacturing the liquid crystal device 5000 in the fifth embodiment, the mold 5060 is supplied between the frame 5071 and the liquid crystal panel 40, and therefore, it is possible to cover the circumference of the liquid crystal panel 40 with the mold 5060. Specifically, it is possible to cover the region from the surface of the first light-transmitting plate 56 on the opposite side to the liquid crystal layer 450 to the surface of the second light-transmitting plate 57 on the opposite side to the liquid crystal layer 450 with the mold 5060. Therefore, it is possible to extend the length of the interface between the substrates and the mold 5060 and to thereby suppress entry of moisture into the liquid crystal layer 450 via the interface and the sealing material 407.

In addition, since the first resin 5061 and the second resin 5062 are arranged on the surface of the mold 5060 in the region where the frame 5071 is opened, in other words, the surface of the exposed mold 5060 and the contact portion between the first light-transmitting plate 56 and the frame 5071, it is possible to suppress entry of moisture into the mold 5060. As a result, it is possible to suppress entry of moisture into the liquid crystal layer 450 via the mold 5060 and the sealing material 407.

(3) According to the electronic apparatus in the fifth embodiment, the above liquid crystal device 5000 is provided therein, and therefore, it is possible to provide an electronic apparatus capable of improving display quality and suppressing deterioration in the liquid crystal layer 450.

Modification Example 19

The liquid crystal device 5000 is not limited to the above configuration in which the hook 5072 is arranged, and may be configured of the liquid crystal panel 40, the mold 5060, and the frame 5071 without arranging the hook 5072. In addition, the liquid crystal device 5000 may have a configuration in which the first light-transmitting plate 56 and the second light-transmitting plate 57 are not included.

Modification Example 20

The invention is not limited to the above configuration in which the support seal 5041 is arranged on the second light-transmitting plate 57, any configuration is applicable as long as the mold resin 5060b does not flow into the image display region 40a, and a passivation film may be formed into a convex shape, for example.

Modification Example 21

As for electronic apparatuses on which the liquid crystal device 5000 is mounted as described above, it is possible to use the liquid crystal device for various electronic apparatuses such as an electrical view finder (EVF), a mobile mini projector, a head-up display, a smart phone, a mobile phone, a mobile computer, a digital camera, a digital video camera, a display, a vehicle-mounted device, an audio device, an exposure device, and an illumination device as well as the projection-type display apparatus 1.

Modification Example 22

The invention is not limited to the application of the liquid crystal device 5000 as the electro-optic device as described above, and the electro-optic device may be applied to an organic EL device, a plasma display, or an electronic paper (EPD), for example. In a case of a liquid crystal device, for example, an electro-optic material is liquid crystal. In a case of an electronic paper, the electro-optic material is an electrophoretic material.

Configurations of the invention are not limited to the aforementioned embodiments, and modifications can be appropriately made without departing from the gist and the idea of the invention described in claims and the entire specification, which are also included in the technical scope of the invention.

The entire disclosure of Japanese Patent Application No. 2013-254759, filed Dec. 10, 2013 and 2013-254760, filed Dec. 10, 2013 and 2013-254762, filed Dec. 10, 2013 and 2013-254763, filed Dec. 10, 2013 and 2013-254764, filed Dec. 10, 2013 is expressly incorporated by reference herein.

What is claimed is:

1. An electro-optic device comprising:
   an electro-optic panel which includes a first substrate, a second substrate arranged so as to face the first substrate with a sealing material interposed therebetween, and an electro-optic layer sealed in a region surrounded by the sealing material; and
   a mold which covers an outer circumference of the electro-optic panel and holds the electro-optic panel,
   wherein the mold covers a region, which is overlapped with at least a part of the sealing material in a plan view, from an end of the first substrate and an end of the second substrate on a surface of the first substrate on an opposite side to the electro-optic layer and a surface of the second substrate on an opposite side to the electro-optic layer, and
   wherein a surface of the mold has liquid repellency.

2. The electro-optic device according to claim 1, further comprising:
   a frame body which is provided so as to be in direct contact with the first substrate or the second substrate or in indirect contact with the first substrate or the second substrate via a third substrate.

3. The electro-optic device according to claim 1,
   wherein a coating agent with liquid repellency is arranged on the surface of the mold.

4. The electro-optic device according to claim 1,
   wherein a light-blocking hook which includes an opening overlapped with the display region surrounded by the mold is arranged so as to be in contact with the surface of the mold.

5. An electronic apparatus comprising:
   the electro-optic device according to claim 1.

6. An electro-optic device comprising:
   an electro-optic panel which includes a first substrate, a second substrate arranged so as to face the first substrate with a sealing material interposed therebetween, and an electro-optic layer sealed in a region surrounded by the sealing material;
   a mold which covers an outer circumference of the electro-optic panel and holds the electro-optic panel;
   a first hook which is arranged between the first substrate and the mold, includes an opening overlapped with a display region of the electro-optic panel, and blocks light; and
   a second hook which is arranged between the second substrate and the mold, includes an opening overlapped with the display region, and blocks light,
   wherein the mold covers a region, which is overlapped with at least a part of the sealing material in a plan view, from an end of the first substrate and an end of the second hook on a surface of the first hook and a surface of the second hook.

7. The electro-optic device according to claim 6, further comprising:
   a third hook which is arranged so as to be in contact with a surface of the mold, includes an opening overlapped with the display region, and blocks light.

8. The electro-optic device according to claim 6, further comprising:
   a third substrate which is provided between the first substrate and the first hook and between the second substrate and the second hook.

9. The electro-optic device according to claim 6, further comprising:
   a frame body which is provided so as to be in contact with the first hook or the second hook.

10. An electro-optic device comprising:
    an electro-optic panel which includes a first substrate, a second substrate arranged so as to face the first substrate with a sealing material interposed therebetween, and an electro-optic layer sealed in a region surrounded by the sealing material;
    a mold which covers an outer circumference of the electro-optic panel and holds the electro-optic panel;
    a first protection member which is arranged between the first substrate and the mold and includes an opening overlapped with a display region; and
    a second protection member which is arranged between the second substrate and the mold and includes an opening overlapped with the display region,
    wherein the mold covers a region, which is overlapped with at least a part of the sealing material in a plan view, from an end of the first substrate and an end of the second substrate on a surface of the first protection member and a surface of the second protection member.

11. The electro-optic device according to claim 10,
    wherein the first protection member is a first support seal, and
    wherein the second protection member is a second support seal.

12. The electro-optic device according to claim 11, further comprising:

a third substrate which is arranged between the first substrate and the first support seal and between the second substrate and the second support seal.

13. An electro-optic device comprising:
an electro-optic panel which includes a first substrate, a second substrate arranged so as to face the first substrate with a sealing material interposed therebetween, and an electro-optic layer sealed in a region surrounded by the sealing material;
a frame which is arranged in a circumference of the electro-optic panel; and
a mold which is arranged between the electro-optic panel and the frame,
wherein
the mold overlaps at least a portion of a first surface of the first substrate on a side of the first substrate opposite to the electro-optic layer, and
the mold overlaps at least a portion of a second surface of the second substrate on a side of the second substrate opposite to the electro-optic layer.

14. The electro-optic device according to claim 13,
wherein a support seal is arranged on the second surface of the second substrate on the side of the second substrate opposite to the electro-optic layer opposite side to the electro optic layer, and
wherein an upper surface of the mold is located between a lower surface and an upper surface of the support seal.

15. The electro-optic device according to claim 13,
wherein a first light-transmitting plate is arranged between the first substrate and the mold, and
wherein a second light-transmitting plate is arranged between the second substrate and the mold.

16. An electro-optic device comprising:
an electro-optic panel which includes a first substrate, a second substrate arranged so as to face the first substrate with a sealing material interposed therebetween, and an electro-optic layer sealed in a region surrounded by the sealing material; and
a mold which is arranged so as to cover a circumference of the electro-optic panel,
wherein
the mold overlaps at least a portion of a first surface of the first substrate on a side of the first substrate opposite to the electro-optic layer, and
the mold overlaps at least a portion of a second surface of the second substrate on a side of the second substrate opposite to the electro-optic layer, and
first resin is arranged so as to cover the mold.

17. The electro-optic device according to claim 16, further comprising:
a frame which is arranged in a circumference of the electro-optic panel,
wherein the mold is arranged between the electro-optic panel and the frame, and
wherein the first resin is arranged so as to cover the mold in a region where the frame is opened.

18. The electro-optic device according to claim 17,
wherein second resin is arranged so as to cover a portion at which the electro-optic panel is in contact with the frame.

19. The electro-optic device according to claim 17,
wherein an end of the frame is arranged so as to be in contact with the first surface of the first substrate on the side of the first substrate opposite to the electro-optic layer,
wherein the other end of the frame is arranged at a higher position than the second surface of the second substrate on the side of the second substrate opposite to the electro-optic layer, and
wherein an upper surface of the mold is located between the other end of the frame and the second surface of the second substrate on the side of the second substrate opposite to the electro-optic layer.

20. The electro-optic device according to claim 17,
wherein a hook which includes an opening hole in a region overlapped with a display region is arranged so as to be in contact with the frame, and
wherein the hook blocks light.

21. An electro-optic device comprising:
an electro-optic panel which includes a first substrate, a second substrate arranged so as to face the first substrate with a sealing material interposed therebetween, and an electro-optic layer sealed in a region surrounded by the sealing material;
a frame which is arranged in a circumference of the electro-optic panel; and
a mold which is arranged between the electro-optic panel and the frame so as to cover a circumference of the electro-optic panel,
wherein the mold covers a region, which is overlapped with at least a part of the sealing material in a plan view, from an end of the first substrate and an end of the second substrate on a surface of the first substrate on an opposite side to the electro-optic layer and on a surface of the second substrate on an opposite side to the electro-optic layer,
wherein first resin is arranged so as to cover the mold in a region where the frame is opened, and
wherein a second resin is arranged so as to cover a portion at which the electro-optic panel is in contact with the frame.

22. An electro-optic device comprising:
an electro-optic panel which includes a first substrate, a second substrate arranged so as to face the first substrate with a sealing material interposed therebetween, and an electro-optic layer sealed in a region surrounded by the sealing material;
a frame which is arranged in a circumference of the electro-optic panel; and
a mold which is arranged between the electro-optic panel and the frame so as to cover a circumference of the electro-optic panel,
wherein the mold covers a region, which is overlapped with at least a part of the sealing material in a plan view, from an end of the first substrate and an end of the second substrate on a surface of the first substrate on an opposite side to the electro-optic layer and on a surface of the second substrate on an opposite side to the electro-optic layer,
wherein first resin is arranged so as to cover the mold in a region where the frame is opened,
wherein an end of the frame is arranged so as to be in contact with a surface of the first substrate on an opposite side to the electro-optic layer,
wherein an other end of the frame is arranged at a higher position than a surface of the second substrate on an opposite side of the electro-optic layer, and
wherein an upper surface of the mold is located between the other end of the frame and the surface of the second substrate on the opposite side to the electro-optic layer.

23. An electro-optic device comprising:
an electro-optic panel which includes a first substrate, a second substrate arranged so as to face the first substrate with a sealing material interposed therebetween, and an electro-optic layer sealed in a region surrounded by the sealing material;
a frame which is arranged in a circumference of the electro-optic panel; and
a mold which is arranged between the electro-optic panel and the frame so as to cover a circumference of the electro-optic panel,
wherein the mold covers a region, which is overlapped with at least a part of the sealing material in a plan view, from an end of the first substrate and an end of the second substrate on a surface of the first substrate on an opposite side to the electro-optic layer and on a surface of the second substrate on an opposite side to the electro-optic layer,
wherein first resin is arranged so as to cover the mold in a region where the frame is opened,
wherein a second resin is arranged so as to cover a portion at which the electro-optic panel is in contact with the frame,
wherein a hook which includes an opening hole in a region overlapped with a display region is arranged so as to be in contact with the frame, and
wherein the hook blocks light.

24. An electro-optic device comprising:
a light modulation panel that has a first substrate and a second substrate; and
a mold which covers an outer circumference of the light modulation panel and holds the light modulation panel,
wherein
the mold covers at least an edge of the first substrate and an edge of the second substrate, and
a surface of the mold has liquid repellency.

* * * * *